United States Patent [19]

Sederberg

[11] Patent Number: 4,821,214

[45] Date of Patent: Apr. 11, 1989

[54] COMPUTER GRAPHICS METHOD FOR CHANGING THE SHAPE OF A GEOMETRIC MODEL USING FREE-FORM DEFORMATION

[75] Inventor: Thomas W. Sederberg, Orem, Utah

[73] Assignee: Brigham Young University, Provo, Utah

[21] Appl. No.: 853,010

[22] Filed: Apr. 17, 1986

[51] Int. Cl.$^4$ .............................................. G06F 15/62
[52] U.S. Cl. .................................. 364/522; 340/720; 364/521
[58] Field of Search ....................... 364/512, 518–522; 340/720, 723

[56] References Cited

U.S. PATENT DOCUMENTS

| 4,275,449 | 6/1981 | Aish | 364/512 |
| 4,549,275 | 10/1985 | Sukonick | 364/521 |
| 4,609,993 | 9/1986 | Shimizu | 364/522 |
| 4,685,070 | 8/1987 | Flinchbaugh | 364/522 |

OTHER PUBLICATIONS

M. S. Casale et al., "An Overview of Analytic Solid Modeling," IEEE Computer Graphics and Applications, pp. 45 to 56 (Feb. 1985).
Farouki et al., "A Hierarchy of Geometric Forms," IEEE CG & A, pp. 51 to 78 (May 1985).
M. E. Mortenson, "Geometric Modeling," Chapter 4, Sections 1-5, pp. 240 to 259 (1985).
Rockwood et al., "Blending Surfaces in Solid Modelling," (1985).
C. Hoffman et al., "Automatic Surface Generation in Computer Aided Design," paper from Department of Computer Science, Cornell University, pp. 1 to 21 (1985).
A. E. Middleditch et al., "Blend Surfaces for Set Theoretic Volume Modeling Systems," Computer Graphics, vol. 19, No. 3, pp. 161 to 170 (1985).
T. W. Sederberg, "Piecewise Algebraic Surface Patches," Computer Aided Geometric Design 2, pp. 53 to 59 (1985).
A. H. Barr, "Global and Local Deformations of Solid Primitives," Computer Graphics, vol. 18, No. 3, pp. 21 to 30 (1984).
E. S. Cobb, "Design of Sculptured Surfaces Using the B-Spline Representation," Department of Computer Science, The University of Utah (1984).
W. Bohm et al., "A Survey of Curve and Surface Methods in CAGD", Computer Aided Geometric Design 1, pp. 1 to 60 (1984).

(List continued on next page.)

Primary Examiner—Gary V. Harkcom
Assistant Examiner—H. R. Herndon
Attorney, Agent, or Firm—Workman, Nydegger Jensen

[57] ABSTRACT

A method of using a computer graphic system for free-form deformation of geometric models. The method is based on the use of a control-point grid which is imposed on the model and which can then be moved by a system designer to specify a deformation to a particular region of the model. Displacement of control points on the grid provides the designer with an intuitive appreciation for the resulting affect in terms of deformation on the specified region of the geometric model. The free-form deformation of the model is accomplished through the use of a trivariate vector rational polynomial in which the displaced control points represent coefficients of the polynomial. The method provides a powerful and highly flexible technique that can be adapted and used in the environment of virtually any presently known solid modeling system, such as CSG or B-rep. The method can be used to deform surface primitives of any type or degree, such as planes, quadrics, parametric surface patches or implicitly defined surfaces. Single or successive deformations can be applied both globally and locally, and local deformations can be imposed using the method of the present invention with any desired degree of derivative continuity. It is also possible to use the method of the present invention to deform a solid geometric model in such a way that its volume is preserved.

17 Claims, 11 Drawing Sheets

OTHER PUBLICATIONS

T. Varady et al., "Design Techniques for the Definition of Solid Objects with Free-Form Geometry," Computer Aided Geometric Design 1, pp. 207 to 225 (1984).

A. A. G. Requicha et al., "Solid Modeling: Current Status and Research Directions," IEEE Computer Graphics & Applications, pp. 25 to 35 (1983).

A. A. G. Requicha et al., "Solid Modeling: A Historical Summary and Contemporary Assessment," IEEE Computer Graphics & Applications, pp. 9 to 24 (1982).

J. A. Brewer et al., "Visual Interaction with Overhauser Curves and Surfaces," Computer Graphics, vol. II, No. 2, pp. 132 to 137 (1977).

R. E. Parent, "A System for Sculpting 3-D Data," Computer Graphics, vol. 11, No. 2, pp. 138 to 147 (1977).

P. Bezier et al., "Mathematical and Practical Possibilities of Unisurf," Computer Aided Geometric Design, pp. 127 to 152 (1974).

M. A. Sabin et al., "Interrogation Techniques for Parametric Surfaces," Computer Graphics '70 Conference, (1970).

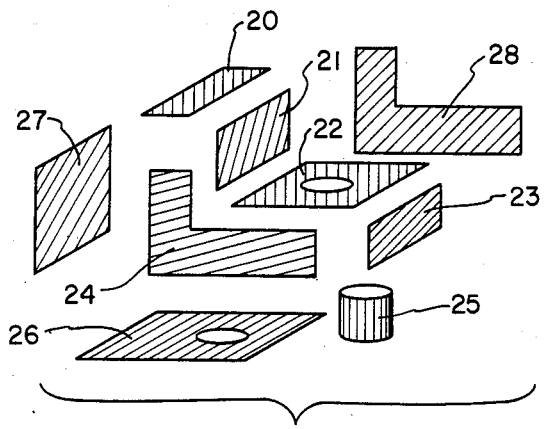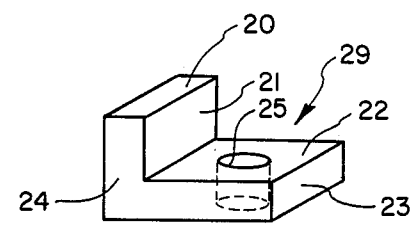
FIG. 1A
(PRIOR ART)
FIG. 1B
(PRIOR ART)
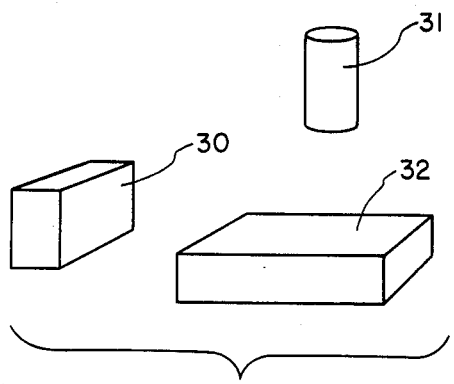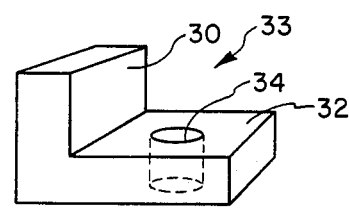
FIG. 2A
(PRIOR ART)
FIG. 2B
(PRIOR ART)
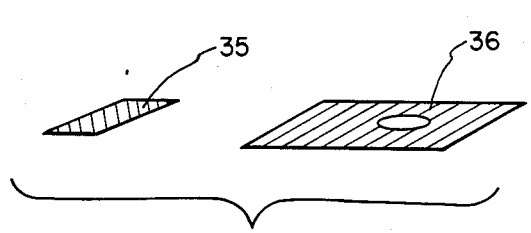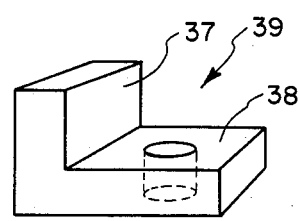
FIG. 3A
(PRIOR ART)
FIG. 3B
(PRIOR ART)

COMPUTER GRAPHICS METHOD FOR CHANGING THE SHAPE OF A GEOMETRIC MODEL USING FREE-FORM DEFORMATION

I. BACKGROUND OF THE INVENTION

A. Field of the Invention

The present invention relates to computer graphic systems that are used for computer aided geometric design, and more particularly, to methods of using a computer graphic system for changing a geometric model that is bounded by free-form surfaces.

B. The Prior Art

With the advent of computers computer aided design (CAD) became a subject of widespread interest. Increasingly, computer keyboards, cursors, CRT's and graphics terminals are replacing pencil and paper, and computer disks and tapes are replacing drawing vaults.

A. A. G. Requicha and H. B. Voelcker have provided a useful survey of the historical development and contemporary assessment of CAD systems. See, "Solid Modeling: A Historical Summary and Contemporary Assessment," *IEEE Computer Graphics and Applications*, Vol. 2 No. 2, March 1982, pp. 9-24 (hereinafter *Solid Modeling I*); see also, "Solid Modeling: Current Status and Research Directions," *IEEE Computer Graphics and Applications*, Oct. 1983, pp. 25-37 (in which the same authors provide an update to their 1982 article, hereinafter referred to as *Solid Modeling II*).

As noted by the above-named authors in *Solid Modeling I*, after the advent in the 1950's and 1960's of interactive computer graphic systems, computerized homogeneous coordinate (projective) geometry for manipulating graphic designs and NC programming languages, CAD systems generally began to develop in four areas. One of the earliest of these four areas was the development of what is known as "wireframes." In the wireframe graphic system, internal geometric data, which initially consisted of simple lists of lines and arcs, could be scanned by application programs and used to plot drawings and photomasks and to produce point-to-point NC code for drilling and punching. Later on, the two-dimensional lines and arcs of such wireframe systems were replaced with three-dimensional space curves which could be projected computationally to produce multiple orthographic, isometric and perspective views. Basically, the wireframe system was and is a collection of lines and curved segments representing an object's edges.

As further noted in *Solid Modeling I*, while clearly useful, the three-dimensional wireframe systems of today exhibit serious deficiencies. Models produced using a wireframe system may be ambiguous, that is to say, the object may represent any one of several possible objects defined by the same set of edges. Another deficiency is that wireframe systems tolerate or permit "nonsense objects" to be produced, such as objects where an edge is missing and which therefore do not correspond to any real life possibility. Another deficiency is that objects with curved surfaces which are attempted using wireframe systems result in profile lines or silhouettes that are viewpoint-dependent artifacts rather than physical edges. And fourth, such systems require a large amount of low level data to describe an object that may be relatively simple.

A second type of CAD system which has been developed and refined since the 1960's are those which use polygonal schemes. In this type of system graphic rendering is the primary object of the system. CAD systems which rely on such polygonal schemes must typically address what the authors in *Solid Modeling I* term the "visibility problem." In essence, these systems address the problem of how one can determine computationally and represent graphically those portions of an object that are visible from a specified viewpoint. Such systems typically solve the visibility problem by representing objects with polyhedra having hundreds or thousands of polygonal faces (or facets) and by using algorithms which perform smoothing and spacial sorting operations that typically involve face and edge comparisons and determination of hidden lines and surfaces.

A third major area of CAD system development in those systems which may be used to generate and manipulate sculptured surfaces. The emphasis in this area has been on the accurate representation of surfaces, and on the tailoring of such representations to meet various functional and aesthetic criteria. However, as the authors in *Solid Modeling I* note, surprisingly little attention has been paid to computer methods for possessing sculptured surfaces: namely, displaying and efficiently computing curves of intersection, testing closedness (e.g., to determine whether a surface may qualify as a boundary of a solid), etc.

In short, while nonetheless useful, CAD systems which employ polygonal schemes or sculptured surfaces, like wireframes, suffer from some significant disadvantages, particularly in that such systems are informationally incomplete.

A fourth area of CAD system development, called solid modeling, is directed to systems and methods focused on informationally complete representations of solids, or in other words representations that permit in principle any well defined geometrical property of any represented object to be calculated automatically. Solid modeling CAD systems have to date been based on principally three types of systems: boundary representation systems, constructive solid geometry systems, and sweep-based systems, or various hybrid combinations of these three systems.

FIG. 1A represents a typical boundary representation (B-rep) system. In this type of system the boundary surfaces of the model are individually represented, as illustrated at 20-28. The B-rep scheme defines a solid model such as that generally indicated at 29 in FIG. 1B by keeping account of the boundary surfaces 20-28, edges, and vertices along with adjacency information.

Constructive solid geometry (CSG) systems typically rely on the use of Boolean logic (union (AND), difference (NOT) and intersection (EXCLUSIVE OR)) to combine basic solid shapes (called primitives). As shown in FIG. 2A, by adding the primitives illustrated at 30 and 32 and then subtracting the primitive 31 from the result, the solid model generally indicated at 33 in FIG. 2B (which consists of a solid L-shaped object with a hole 34) can be produced, similar to the model 29 produced using the B-rep scheme illustrated in FIG. 1A.

A third prior art approach which is known is the use of sweep-based systems. In these systems, as generally illustrated in FIG. 3A, by translating the plane 35 in a vertical direction the portion 37 (see FIG. 3B) of the model can be generated, whereas by vertically translating the plane 36 having the hole in the middle of it, portion 38 of the object can be formed. Thus, by adding the shapes generated from sweeping planes 35 and 36 the complete model 39 is produced.

Most of the research recently directed toward development of solid geometric modeling systems has taken the approach of incorporating existing free-form surface modeling systems (e.g., sculptured surface techniques) into the standard type of solid modeling systems such as B-rep, CSG and sweep-based systems. However, this forced marriage has caused other problems. For example, one such problem arises in computing the curve of intersection of two free-form surface patches. It can be shown, for example, that such a curve cannot, in general, be expressed precisely using parametric equations. Indeed, for two bicubic patches, the curve of intersection is generally degree 324. In contrast, two quadric surfaces intersect in a curve of degree 4, which can be expressed exactly using parametric equations.

Another significant problem resulting from this forced marriage arises in representing the topology of a free-form surface patch which has been intersected with a second patch. For example, a bicubic patch has four sides, but after intersection it may have three sides, five or more sides, or even a hole in the middle.

For these and other reasons, solid geometric modeling systems have been slow to use surfaces which are more complex than quadrics. What has long been overlooked is that a fresh approach to the problem of solid free-form geometric modeling might avoid many of the problems which have arisen from attempting to marry the present free-form surface modeling systems to current solid modeling technology. Indeed, as noted by Requicha and Voelcker in *Solid Modeling II*, as recently as 1983, notwithstanding a proliferation of activity in the area of solid modeling systems, the basic approach has remained the same. See, for example, the systems represented in Table I at page 26 of *Solid Modeling II*.

Thus, what is needed in the art is a computer graphics method for modeling solid objects which addresses and substantially overcomes many of the problems and limitations which presently exist under state of the art technology. Indeed, as noted by the authors in *Solid Modeling I*, development of more powerful solid geometric modeling CAD systems "will remove a major roadblock to flexible automation and permit the single 'A' in CAD/CAM to represent 'Automated' rather than 'Assisted.'"

II. PRINCIPAL OBJECTS AND BRIEF SUMMARY OF THE INVENTION

In view of the present state of the art, it is a principal object of the present invention to provide a method of using a conventional computer graphic system for changing the shape of any solid geometric model using free-form deformation.

Another important object of the present invention is to provide a method of using a computer graphic system for free-form deformation of geometric solids which can be applied locally, globally and with derivative continuity.

Still another important object of the present invention is to provide a method of using a computer graphic system for free-form deformation of solid models which can be used with free-form surfaces of any formulation or degree.

Another important object of the present invention is to provide a method of using a computer graphic system for free-form deformation of solid models which permits a system user to intuitively anticipate in a qualitative sense a desired change to be made to a model, and which is thus easy to use and can be combined with virtually any conventional solid modeling scheme, such as B-rep or CSG systems.

Still another important object of the present invention is to provide a method of using a computer graphic system for free-form deformation of geometric solids which will provide an indication of the degree of volume change imparted to the solid model, as well as providing a capability for preserving volume.

Still another important object of the present invention is to provide a method of using a computer graphic system for free-form deformation of geometric models which can, in addition to solid modeling, be applied to sculptured surfaces or polygonal models, and which also permits parametric curves and surfaces to remain parametric following the applied deformation.

Other important objects of the present invention are to provide a method of using a computer graphic system for free-form deformation of geometric models which can be used for aesthetic surfaces, many fairing surfaces and most functional surfaces.

These and other objects and features are realized in the present invention, which will be more particularly described in reference to the drawings, detailed description of the invention and the claims as contained herein.

Briefly summarized, the present invention comprises a method of using a computer graphic system for free-form deformation of geometric models, including both solid models and sculptured or polygonal surfaces. The method can be implemented on virtually any standard computer graphic system. The method of the present invention can be used to deform surface primitives of any type of degree, such as planes, quadrics, parametric surface patches, or implicitly defined surfaces. The method involves the use of a control-point grid imposed on the model and which can then be moved by the system designer with an intuitive appreciation for the resulting effect in terms of deformation on the geometric model. Using the control-point grid, the deformation can be applied either globally or locally, and local deformations can be applied with any degree of derivative continuity.

III. BRIEF DESCRIPTION OF THE DRAWINGS

Reference is next made to a brief description of the drawings, in which FIGS. 1A, 1B, 2A, 2B, 3A and 3B are schematic diagrams used to illustrate prior art solid modeling systems, as previously explained in the background section of the specification.

IV. DETAILED DESCRIPTION OF THE PRESENT INVENTION

Reference is next made to a detailed description of the presently preferred method of the present invention as illustrated in the accompanying drawings, in which like parts are designated with like numerals throughout.

A. The Method of Free-Form Deformation

Figure 4:
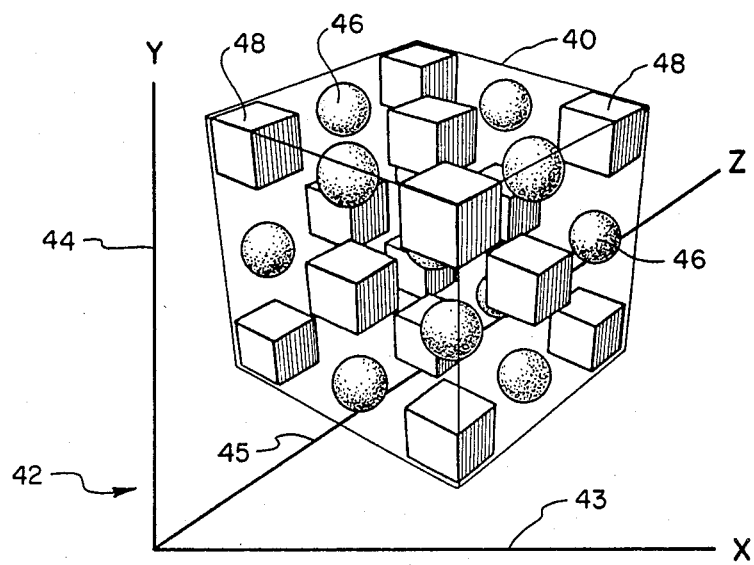
FIG. 4 is a schematic diagram of a solid geometric model that is defined in reference to a global coordinate system.
Figure 5:
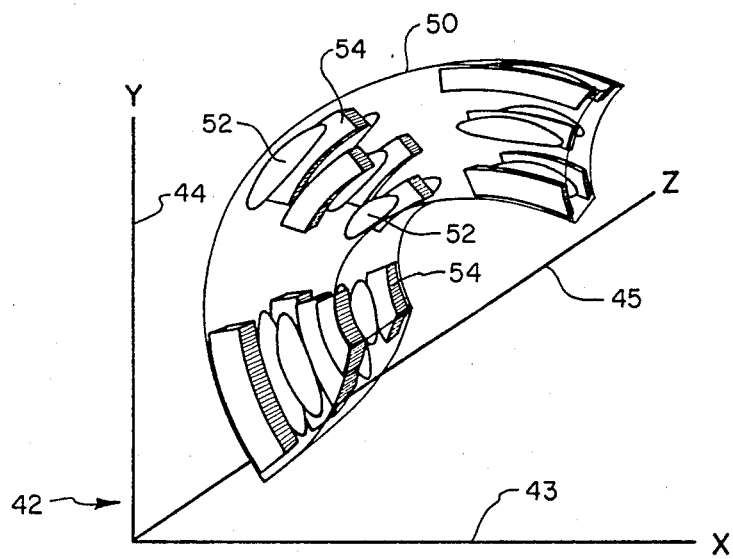
FIG. 5 is a schematic representation of the solid geometric model of FIG. 4 after the model has been changed by applying a free-form deformation, the changed model being defined in reference to the same global coordinate system.

Reference is first made to FIGS. 4 and 5. FIG. 4 illustrates a solid geometric model, in this case a square object 40 that may be envisioned as made, for example, from clear, flexible plastic material. As hereinafter more fully described, the solid geometric object 40 may be defined in reference to a global coordinate system generally designated at 42. The global coordinate system 42 is comprised of three axes, X, Y and Z, as illustrated at 43–45, respectively. The geometric data defining the object 40 may comprise points whose coordinates are defined in terms of the X, Y and Z axes of the global coordinate system 42, and/or functions which define parametric curves or surfaces in the case of non-planar objects, or surfaces defined by implicit equations. It will, of course, be appreciated that the functions which define such parametric curves or surfaces will also be expressed in terms of the X, Y and Z axes of the global coordinate system.

As further illustrated in FIG. 4, embedded in the solid geometric object 40 are several additional objects such as the spheres 46 and cubes 48. Spheres 46 and cubes 48 may also be envisioned as made from flexible materials so that they deform along with the object 40 in which they are embedded.

FIG. 2 illustrates a desired free-form deformation that is to be applied to the object 40 so that after it is changed the object will appear as illustrated at 50. FIG. 5 also illustrates how the embedded spheres and cubes will similarly be deformed as illustrated at 52 and 54, respectively, in a manner that is intuitively consistent with the motion of the plastic of the deformed object 50.

Figure 6A:
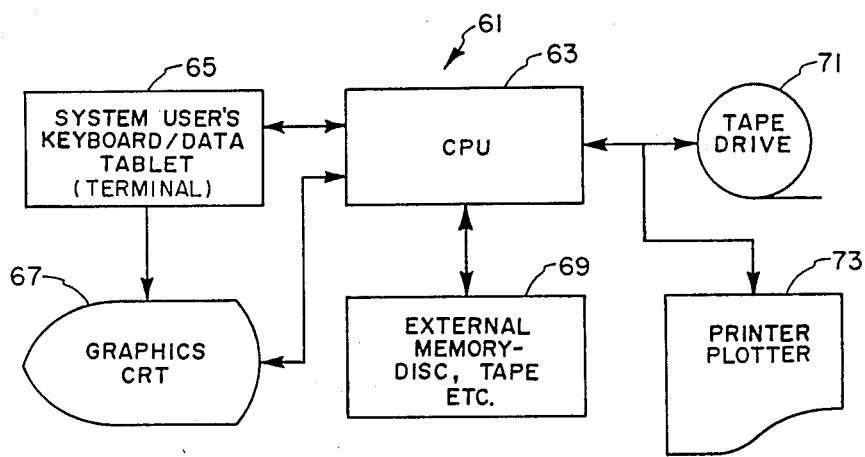
FIG. 6A is a functional block diagram that schematically illustrates a conventional computer graphic system.
Figure 6B:
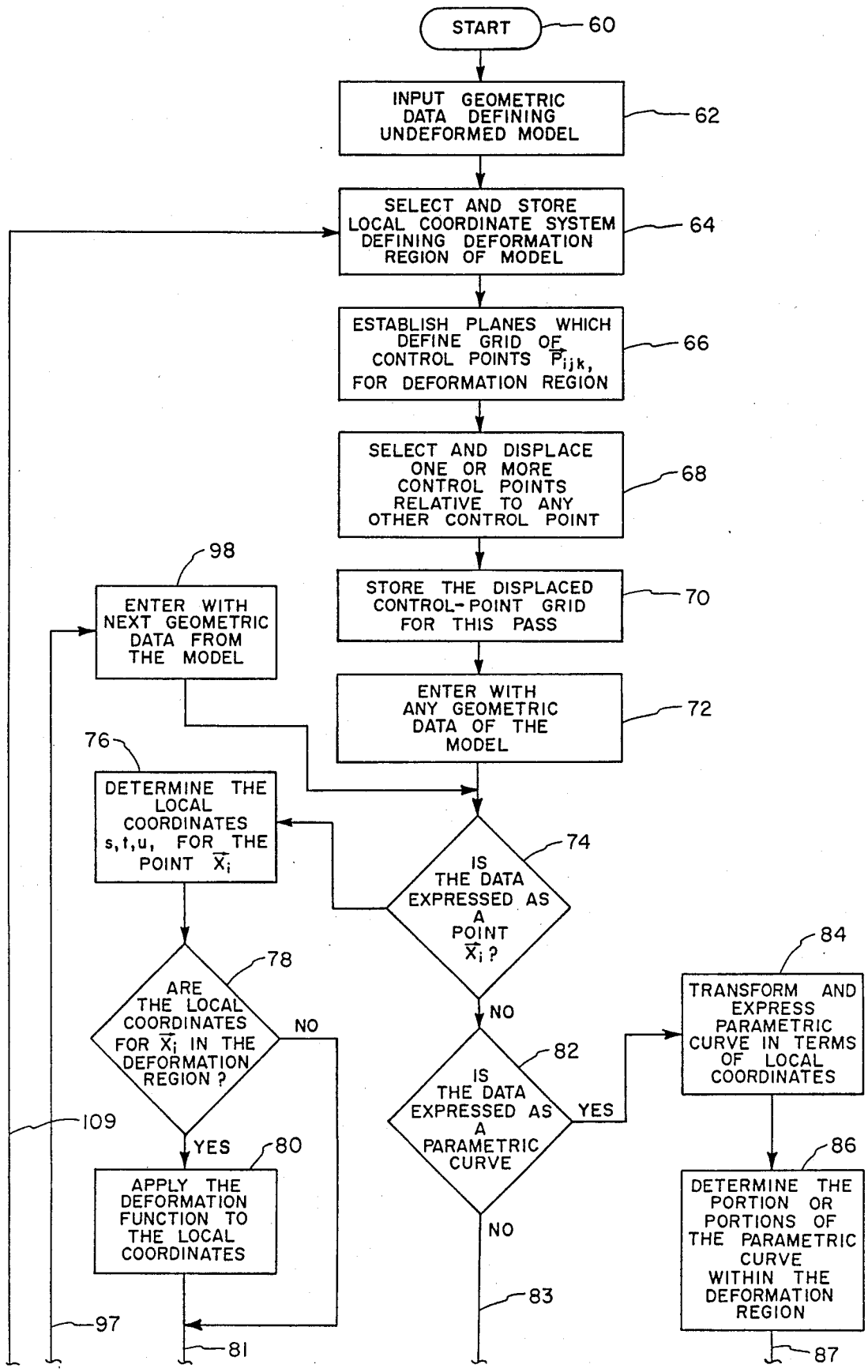
FIGS. 6B and 6C are flowcharts illustrating one presently preferred embodiment of the method for using the computer graphic system of FIG. 6A for changing the shape of a geometric model using free-form deformation.
Figure 6C:
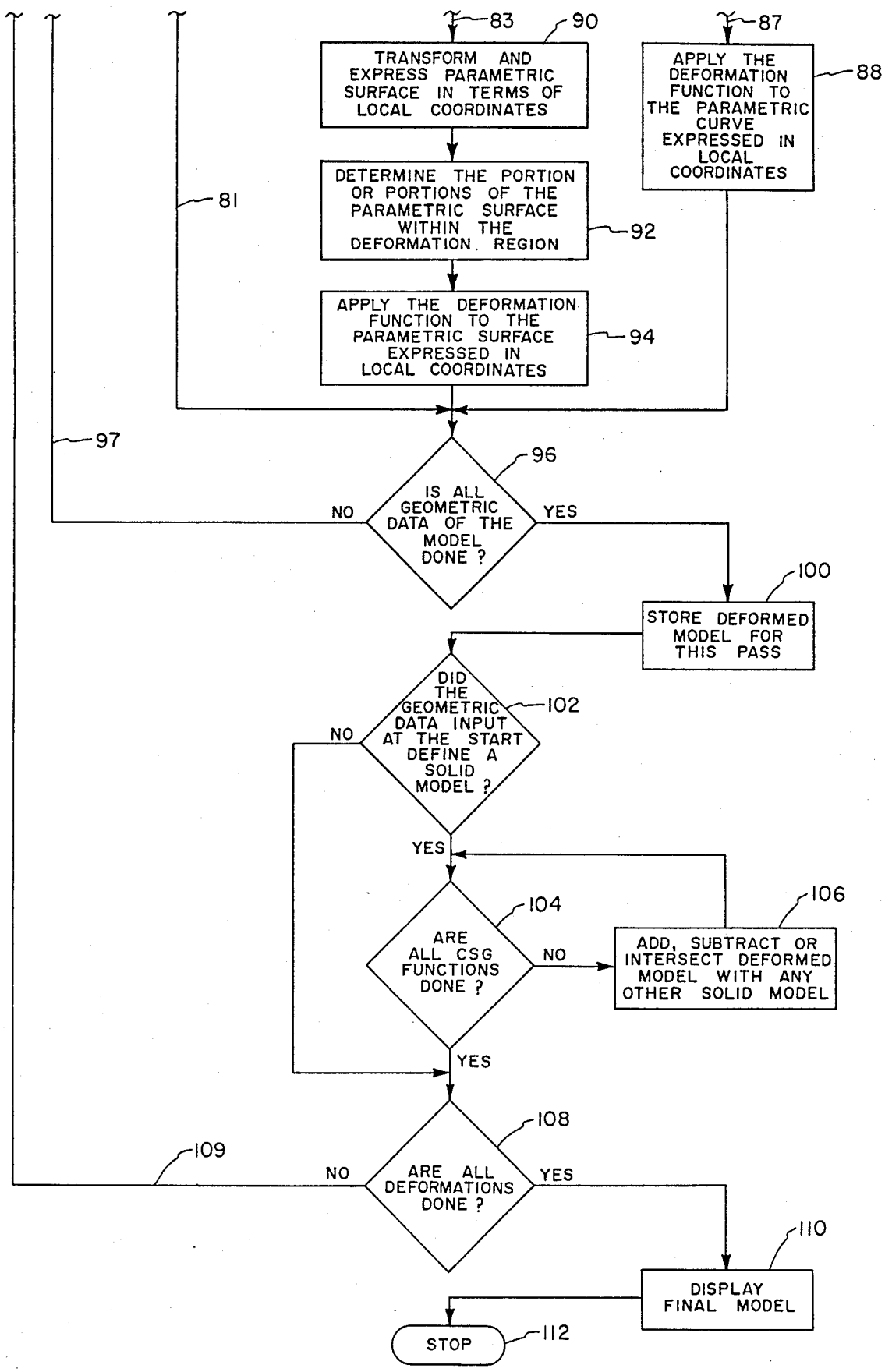

Reference is next made to FIGS. 6A–6C which generally illustrate how a conventional computer graphic system can be used to change the shape of a geometric model, such as illustrated in FIGS. 4 and 5, using the method of the present invention to accomplish free-form deformation of the object.

Typically, any conventional computer graphic system can be operated using the method of the present invention. As illustrated in FIG. 6A, the computer graphic system will comprise a central processing unit (CPU) 63 electronically interconnected to a keyboard or data tablet 65. The keyboard or data tablet 65 is used by a designer to enter the geometric data initially entered and stored by the CPU 63 which defines the geometric model that is to be changed using the method of the present invention. As used herein, the term "geometric data" means that data which is entered and stored by the CPU so as to define any geometric model, including both solids and sculptured or polygonal surfaces, in reference to a global coordinate system. The geometric data may comprise a plurality of data points whose coordinates are expressed in terms of the global coordinate system, or any function (expressed in terms of the coordinate axes of the global coordinate system) which defines parametric curves or free-form surfaces of the geometric model.

Also, typically included in the computer graphic system 61 will be a graphics CRT 67 which may comprise a colored or monochromatic graphics terminal on which the geometric model is depicted during the design process. The graphics CRT 67 is interconnected to the keyboard/data tablet 65 and to the CPU 63. As the geometric model is changed during the design process, it is depicted on the graphics CRT 67 and when finished may be stored on external storage media such as illustrated by the tape drive 71 or output on a printer/plotter 73. External memory 69, which is connected to CPU 63, typically will contain programmed instructions which embody the method of the present invention, which is loaded into the internal memory (not shown) of the CPU for execution when operating the computer graphic system 61 according to the method of the present invention.

The method of the present invention for using the computer graphic system 61 to change a geometric model using free-form deformation may be best understood with reference to FIGS. 6B and 6C. As shown at FIG. 6B, computer graphic system 61 is turned on and the system is initialized. The system user then uses the keyboard or data tablet at the user terminal 65 to begin inputting the geometric data which defines the undeformed geometric model, for example object 40 of FIG. 4, including in the illustrated example the spheres 46 and cubes 48 embedded in the object 40. The undeformed object 40 as well as the spheres and cubes embedded in the object are then depicted by CPU 63 on the graphics CRT 67 using any known technique such as B-rep or CSG. The model 40 could also be created using a conventional model generation program.

The system user than proceeds to step 64. A local coordinate system is selected and input at the user terminal, and stored by CPU 63. As hereinafter more fully explained, the local coordinate system will define a region of the object 40 that is to be deformed. The deformation region may encompass all of the object, as will be illustrated in FIGS. 7A-7C, or a portion of the object as illustrated and later explained in reference to FIGS. 8A-8F.

Figure 7A:
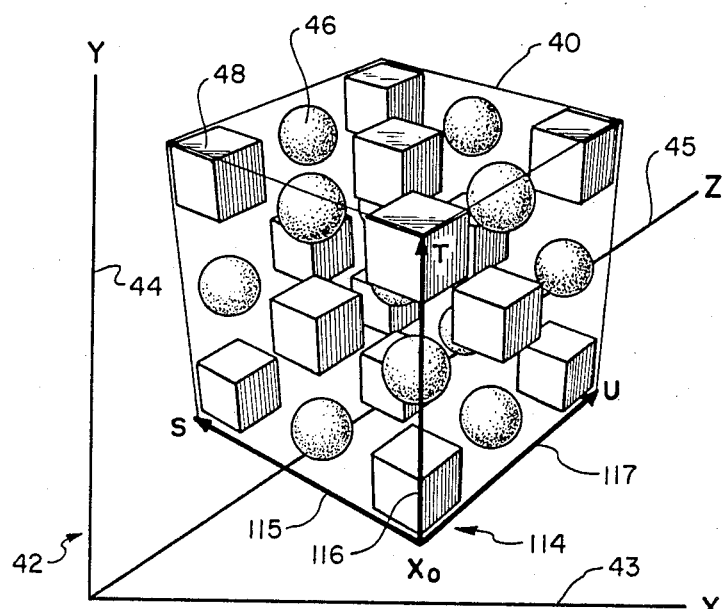
FIGS. 7A–7C are schematic diagrams of a solid geometric model and a local coordinate system that is used to define a control-point grid for applying one or more selected deformations to the geographic model according to the method of the present invention.

For example, as shown in FIG. 7A a local coordinate system may be defined by taking any point $X_0$ (letters shown in bold-face type represent vectors) from which three local coordinate axes, S, T and U are then established. In FIG. 7A the S axis is illustrated at 115, and the T and U axes are illustrated at 116 and 117, respectively. The overall local coordinate system is generally indicated at 114 in FIG. 7A. The vector for any point X located within the local coordinate system can be defined in reference to the local coordinate system 114 by the vector equation:

$$x = X_0 + sS + tT + uU, \qquad (1)$$

where $X_0$ is the origin of the local coordinate system, S, T and U are unit vectors in the S axis, T axis and U axis coordinate directions, and s, t and u represent the scalar magnitude in each of those directions. The s, t and u coordinates of any point X can be found from linear algebra from the vector solution to the equations:

$$s = \frac{T \times U \cdot (X - X_0)}{T \times U \cdot S} \qquad (2)$$

$$t = \frac{S \times U \cdot (X - X_0)}{S \times U \cdot T}$$

$$u = \frac{S \times T \cdot (X - X_0)}{S \times T \cdot U}$$

It will also be appreciated that any point that is located within the deformation region defined by the local coordinate system 114 must meet the condition where s, t and u are each greater than zero and less than one.

After the system user has input to the CPU 63 the local coordinate system that defines the deformation region of the model, the system user next implements step 66 (FIG. 6B) of the method. In this step the system user inputs at the keyboard or data tablet 65 information which generates on the CRT 67 a set of planes that are used to define a grid or lattice of control points (hereinafter control-point grid). The control-point grid encompasses the deformation region of the model.

Figure 7B:
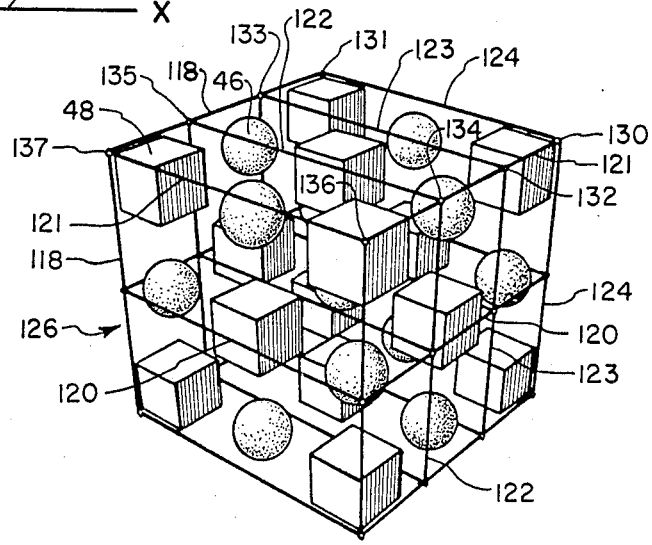

In the presently preferred embodiment, 1+1 planes are established in the S axis direction, m+1 planes are established in the T axis direction and n+1 planes are established in the U axis direction, where l, m and n represent the degrees of a trivariate vector rational polynomial function that is used as a deformation function, as hereinafter defined. For example, as illustrated in FIG. 7B one plane is defined by the lines 118 that are orthogonal to the S coordinate axis; two planes are defined by the lines 120 and 121, respectively, that are orthogonal to the T coordinate axis; and three planes are defined by the lines 122-124 that are orthogonal to the U coordinate axis.

The control points are formed at the intersections of the planes. For example in FIG. 7B there are 24 such control points which make up the overall control-point grid generally designated at 126. Eight of the control points are located on the edges of the upper most plane defined by the lines 121 orthogonal to the T coordinate axis, as illustrated at reference numerals 130-137. To simplify the illustration the remaining sixteen control points have not been numbered.

The position of each control point on the control-point grid 126 may be defined in reference to the local coordinate system 114 by the vector $P_{ijk}$, which is given by the following equation:

$$P_{ijk} = X_0 + \frac{i}{l} S + \frac{j}{m} T + \frac{k}{n} U \qquad (3)$$

where i, j and k are iteration variables that are used to define the number of deformations that are applied to the model.

With reference again to FIGS. 6B, once the control-point grid 126 is defined the system user than implements step 68. At this step, using the keyboard or data tablet 65 and the graphic illustration of the object with the control-point grid 126 in place (such as shown in FIG. 7B) as displayed on the CRT 67, the system user selects and displaces one or more of the control points of the grid relative to any other control point on the grid. The deformation that is to be applied in the deformation region of the model is specified by moving the control points from their undisplaced grid positions.

Figure 7C:
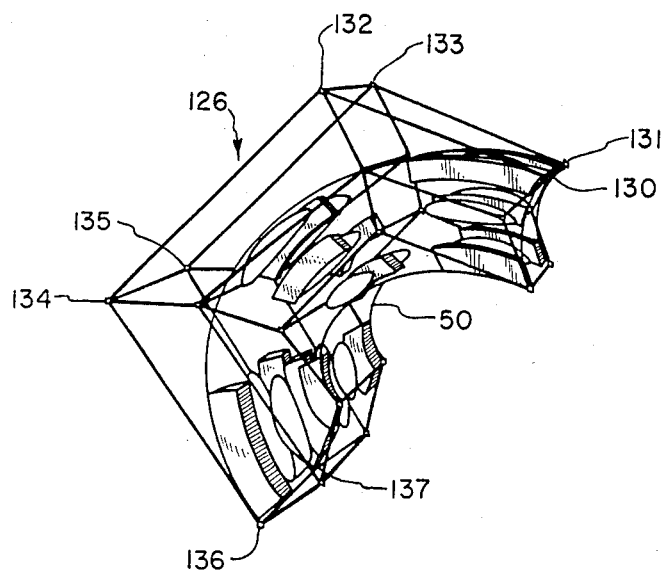

Since the desired deformation is specified by moving the control points, which is visually perceived at the CRT 67, this provides the system user with an intuitive appreciation for the qualitative character of the deformation that will be applied to the object. For example, if the solid geometric object 40 as shown in FIG. 4 is to be deformed so that it will appear as illustrated at 50 in FIG. 5, the control-point grid 126 of FIG. 7B would be displaced by moving the control points to the positions shown in FIG. 7C. Accordingly, as shown in FIG. 7C the control points 130-136 as well as all of the other control points would be displaced relative to control point 137, or relative to some other control point. Of course, if all the control points of the control-point grid are simultaneously moved so that none of them are displaced relative to the others, the result is simply translation or rotation of the object rather than deformation of it.

Referring again to FIG. 6B, after a deformation has been specified by displacing one or more of the control points relative to any other control point of the grid, CPU 63 stores the displaced control-point grid for this pass through the method and then CPU 63 commences to automatically execute in turn, each of the steps commencing with step 72 and continuing through step 96 (FIG. 6C).

At step 72 CPU 63 retrieves the geometric data for the model and then moves through a pair of decisional steps as represented at steps 74 and 82 of the method. At step 74 CPU 63 determines whether the geometric data is expressed in terms of a point $X_i$ where $i$ represents the first pass through the method. If the data is expressed as a point $X_i$, CPU 63 then moves to step 76 and determines the local coordinates s, t and u for the point $X_i$. These coordinates are determined from the vector solutions represented by equations 2 described above. CPU 63 then moves to step 78 to determine whether the local coordinates for the point $X_i$ are within the deformation region defined by the local coordinate system. As previously mentioned, this is accomplished by simply determining whether s, t and u are greater than zero and less than one. If so, CPU 63 then moves to step 80 and applies the deformation function to the local coordinates of the point $X_i$.

The deformation function as defined in connection with the method of the present invention may comprise any trivariate vector rational polynomial for mapping the retrieved geometric data for the model from the local coordinate system into the global coordinate system, where the displaced control points of the control-point grid are coefficients of the polynomial. For example, in one presently preferred embodiment the deformation function is given by a trivariate tensor product Bernstein polynomial and the deformed position $X_{ffd}$ for the point $X_i$ is determined by CPU 63 in step 80 by evaluating the vector-valued trivariate Bernstein polynomial in accordance with the following equation:

$$X_{ffd} = \sum_{i=o}^{l} \binom{l}{i}(1-s)^{l-i} s^i \left[ \sum_{j=o}^{m} \binom{m}{j}(1-t)^{m-j} t^j \left[ \sum_{k=o}^{n} \binom{n}{k}(1-u)^{n-k} u^k P_{ijk} \right] \right] \quad (4)$$

where $X_{ffd}$ is a vector containing the global coordinates of the point $X_i$ after it has been displaced according to the specified deformation, and where $P_{ijk}$ is a vector containing the local coordinates of the displaced control point used to specify the deformation.

Once the deformation specified by the displaced control points has been applied to the retrieved geometric data in this manner, CPU 63 then moves as indicated at line 81 to step 96 where the CPU 63 determiines whether all geometric data for the model has been retrieved and processed in accordance with the specified deformation. If not, CPU 63 returns as indicated at line 97 to step 98 where it then retrieves and enters again with further geometric data that is to be processed.

If CPU 63 determines at step 78 that the local coordinates for the point $X_i$ are outside of the deformation region, CPU 63 simply skips step 80 and moves directly to step 96 as described above. If CPU 63 determines at step 74 that the retrieved geometric data is not expressed as a point CPU 63 then determines at step 82 whether the data is expressed in terms of a function which defines a parametric curve. If so, CPU 63 then moves to step 84 and transforms and expresses the function in terms of the local coordinate system. CPU 63 then determines that portion or portions of the parametric curve, as defined by the function, which are within the deformation region. CPU 63 then moves from step 86 as indicated at line 87 to step 88 (FIG. 6C) where the deformation function is applied to the parametric curve expressed in terms of local coordinates. CPU 63 then moves to step 96 where it determines whether all of the geometric data has been retrieved and processed as described above.

Referring back to step 82 of FIG. 6B, if CPU 63 determines at that step that the data is not expressed as a parametric curve then CPU 63 moves as indicated at line 83 to step 90 shown in FIG. 6C. At step 90 CPU 63 determines that the retrieved geometric data must be in the form of a function which defines a parametric surface, and then transforms and expresses the parametric surface in terms of the local coordinate system. CPU 63 then moves to step 92 where it determines the portion or portions of the parametric surface that are within the deformation region, and then applies the deformation function as indicated at step 94 to the parametric surface so as to determine the deformed position for the geometric data.

At step 96 if CPU 63 determines that all of the geometric data for the model has been completed, CPU 63 then stores the deformed position of all processed geometric data (step 100), as determined from the deformation function. CPU 63 next determines at step 102 whether the geometric data which was input at step 62 defined a solid model. If so, CPU 63 then moves to step 104 where it determines whether all CSG functions for the deformed model have been completed. If not, CPU 63 moves to step 106 and then using Boolean logic, adds, subtracts or intersects other solid primitives with the deformed model to effect further change.

Steps 104 and 106 are optional and are not, strictly speaking, essential to the method of free-form deformation. Steps 104 and 106 have been included merely to illustrate how the method of free-form deformation can be combined with CSG or other solid modeling techniques.

Once all CSG functions have been completed, CPU 63 then moves from step 104 to step 108 where it determines whether all deformations have been completed. If all deformations have been completed CPU 63 may then store and/or display the final changed model, such as illustrated at 50 in FIG. 5.

At step 102, if the geometric data input at the start did not define a solid model, CPU 63 simply skips step 104 and then moves directly to step 108 as described above.

At step 108, it is possible to apply successive hierarchal deformations to the same deformation region, or to define other deformation regions of the model. In either case CPU 63 returns as indicated at line 109 back to step 64 where a new local coordinate system is selected so as to define the next deformation region that is to be used to change the model. An example of how the method may be used to accomplish both multiple local and hierarchal deformations of an object is illustrated in FIGS. 8A-8F.

Figure 8A:
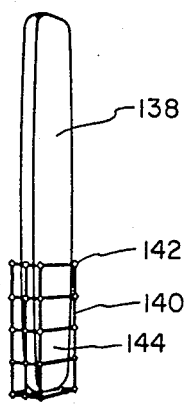
FIGS. 8A–8F are schematic diagrams which illustrate how selective deformations can be applied to an object both globally and in localized regions of an object in connection with the design, for example, of a telephone handset.
Figure 8B:
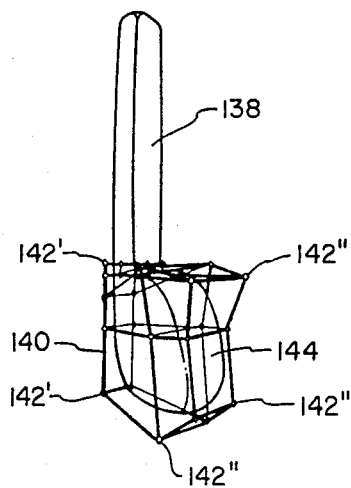
Figure 8C:
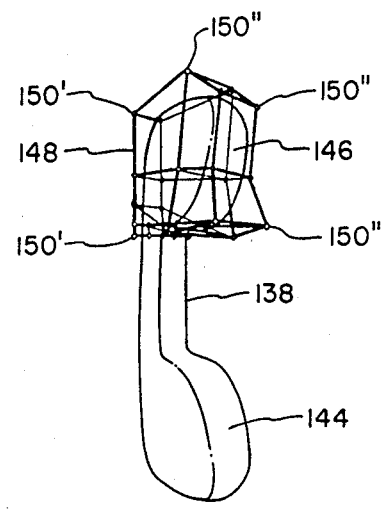

In FIG. 8A, an elongated, generally rectangular bar is illustrated at 138. The bar 138 is defined by geometric data input at the keyboard or data tablet 65 as described above, and will be depicted by the CPU 63 on the graphics CRT 67. In accordance with the method of free-form deformation as described in reference to FIGS. 6B-6C, a system user may first define a control-point grid 140 which encompasses a lower portion 144 of the bar 138. As shown in FIG. 8B, control points 142" are displaced relative to other control points 142' which are held stationary on the grid. Following the method as described in steps 70 through 96 of FIGS. 6B-6C, CPU 63 produces on the CRT 67 the illustration shown in FIG. 8B. The system user can then define a second control-point grid 148 which encompasses an upper portion 146 of the bar 138 (FIG. 8C).

Figure 8D:
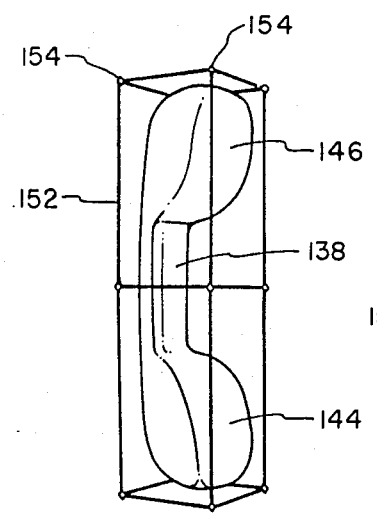

By displacing the control points 150″ of the second control-point grid 148 while holding one or more other control points 150′ stationary, the upper portion 146 of bar 138 can be deformed in a manner similar to that previously accomplished for the lower portion 144. As shown in FIG. 8D, the system user can then perform a global hierarchal deformation on the entire object using a third control-point grid at 152. Grid 152 is "hierarchal" in the sense that it encompasses a prior deformation region and therefore imposes another deformation on the previous one.

Figure 8E:
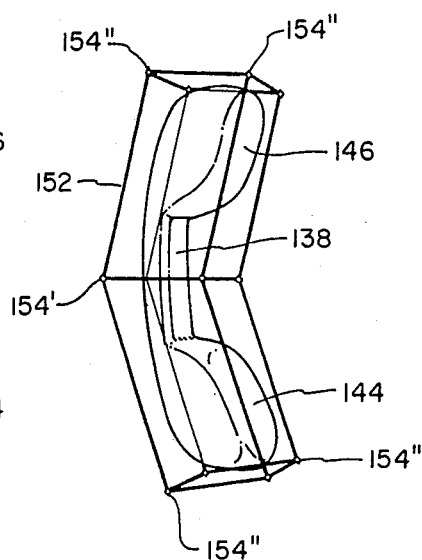
Figure 8F:
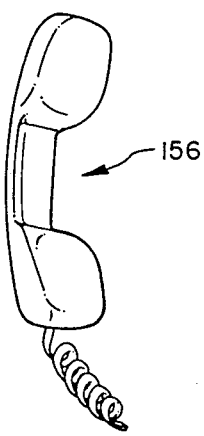

By displacing the control points 154″ in relation to control point 154′ a global deformation can be accomplished so as to impart a slight curvature to the overall object as shown in FIG. 8E. The result, as shown in FIG. 8F is a telephone handset which has been developed using a series of local and hierarchal deformations, successively applied to the object.

B. Point Classification for Geometric Solids

Figure 10:
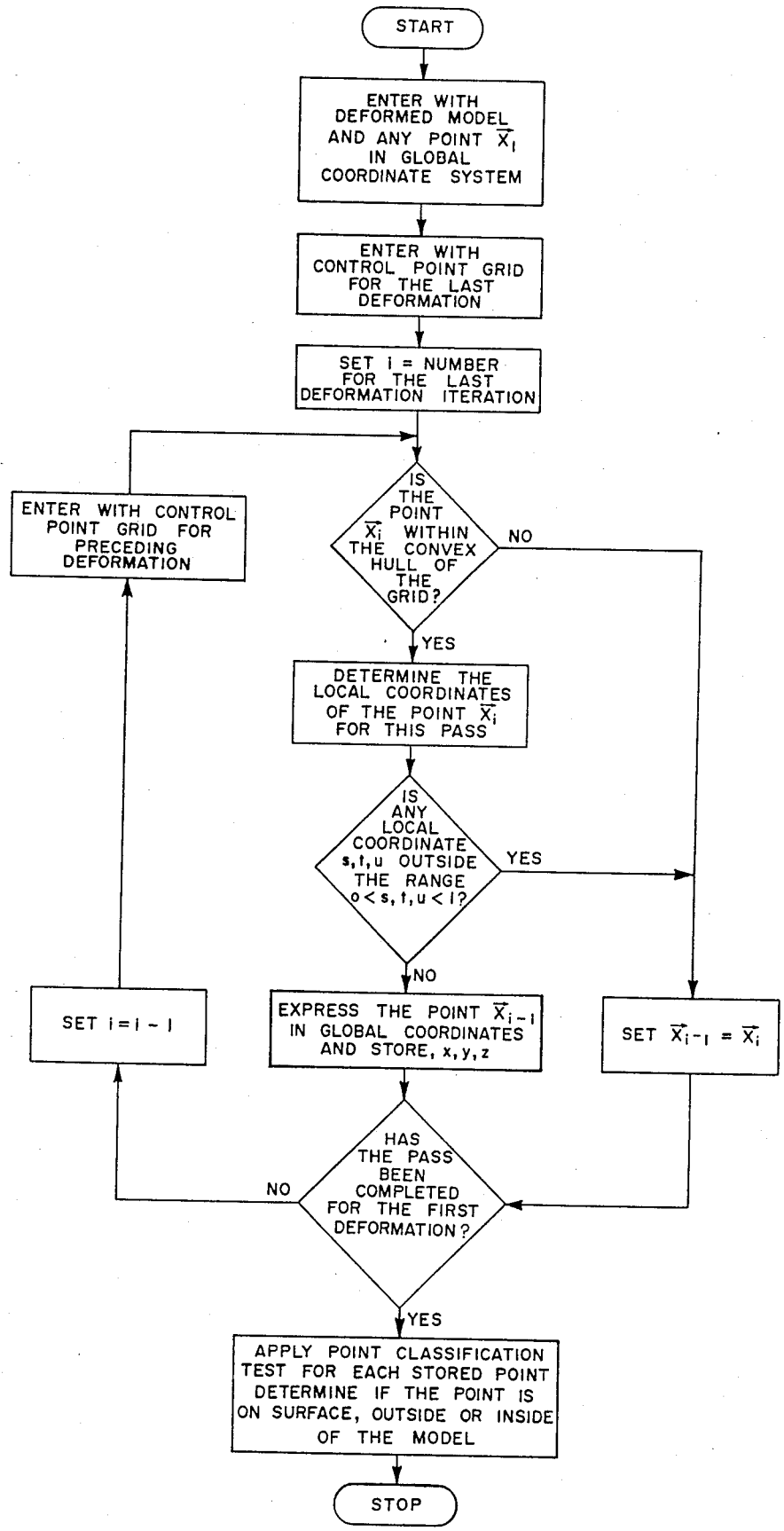
FIG. 10 is a flowchart which illustrates one presently preferred method for performing point classificaton for a solid geometric model that has been changed using the method of the present invention.

In the case where a solid geometric model is being deformed using the method of the present invention for free-form deformation, the resulting changed solid, in order to be informationally complete, will require the CPU 63 to perform a point classification test to determine which points of the global coordinate system are either on the solid model or within the solid model, as changed. Only by performing this test can be informationally complete representation of the changed solid be obtained, which would then permit determination of such useful information as the mass properties of the solid, including the ability to determine amounts of inertia, center of gravity, mass, volume or other similar characteristics dependent upon such mass properties. Computer methods for implementing such point classification tests are well known in the art, and one presently preferred method as adapted for use in connection with the method of free-form deformation as described in FIGS. 6B-6C is generally illustrated in FIG. 10.

Starting at step 170, the computer graphic system 61 is turned on and initialized, and CPU 63 then moves to step 172 where it retrieves and enters with the deformed model output as a result of the method employed using the steps shown in FIGS. 6B-6C. CPU 63 also enters at step 172 with any point $X_i$ from the global coordinate system. CPU 63 then moves to step 174 where it enters with the control-point grid that was stored at step 100 (FIG. 6C) for the last deformation performed on the model. CPU 163 initializes the iteration parameter i by setting i equal to the number for the last (e.g., highest) deformation iteration. In other words, if five passes were made through the method CPU 63 would set i equal to five.

CPU 63 then moves to the step 178 where it determines whether the point $X_i$ is within the convex hull of the control-point grid. The convex hull is defined as that space which includes the set of all possible points which could be the center of mass for the control-point grid, assuming that any arbitrary mass is assigned to each point of the grid. Another way of visualizing the convex hull is to think of a totally elastic sheet stretched over the control-point grid, with the space inside of the elastic sheet defining the convex hull.

Once CPU 63 has determined whether the point $X_i$ is within the convex hull of the control-point grid as displaced for the particular iteration in question, CPU 63 then moves to step 188 to determine the local coordinates of the point $X_i$, and then moves to step 190 where it determines whether any of the local coordinates for the point $X_i$ are greater than zero or less than one. If not, the point is within the deformation region and the point must then be expressed in reference to the global coordinates x, y and z of the global coordinate system, as indicated at step 192. The process represented by steps 178, 188, 190 and 192 is generally referred to in the art as inversion, that is to say, mapping the geometric data which represents the object as deformed from local coordinates back into global coordinates.

A closed form inversion equation for a trivariate polynomial does not generally exist. In other words, it is not generally possible to express the undeformed local coordinates (s,t,u) as rotational polynomial functions of the deformed global coordinates (x,y,z). This forces an iterative solution to the inversion problem, and principally two methods can be used: subdivision and a numerical solution such as Newton's method.

In the case of a curve, two sets of control points specify two contiguous pieces of the curve. The control points define a convex hull that encases the curve. If a point is not inside the convex hull, then it is guaranteed not to lie on that segment of the curve. After repeated subdivisions, a curve segment can be approximated by a line segment and the parameter value of the point can be closely approximated using linear interpolation. Surfaces are subdivided in two parameter directions and the classification of a point on the surface is similar to the method used for cuves. A surface is subdivided until it approximates a plane, at which time the parameters of the point can be computed by solving a quadratic equation or by further subdivision.

Extending this method to the deformation volumes, subdivision of the grid is performed in all three local coordinate directions. A point is potentially in the volume if it is contained within the convex hull of the control points. Repetition of the subdivision process generates control-point grids covering successively finer regions. Eventually, a region of approximately small volume is found which contains the point, and its (s,t,u) coordinates are bounded by the (s,t,u) range of the region.

The inversion problem can be solved numerically by evaluating a system of three trivariate polynomials: $x = f_1(s,t,u)$, $y = f_2(s,t,u)$ and $z = f_3(s,t,u)$. From the local coordinate system, one can use the fact that a point is inside the deformation region if s, t and u are all between zero and one. Newton's method will converge quadratically provided that a sufficiently accurate starting value is known and the inverse of the Jacobian matrix at the starting point exists.

Referring again to steps 178 and 190 (FIG. 10) of the inversion process, if CPU 63 determines at step 178 that the point $X_i$ is not within the convex hull or if CPU 63 determines later on at step 190 that the local coordinates for the point $X_i$ are outside of the deformation region, CPU 63 simply moves to step 180 where it defines the point $X_{i-1}$ as equal to the point $X_i$ and then returns to step 182. At step 182 CPU 63 determines whether the pass has been completed for the first deformation and if not then decrements the iteration variable i as indicated at step 184, and then moves to step 186 where the control-point grid for the preceding deformation is retrieved and the inversion process is then begun anew.

At step 182, when CPU 63 determines that the inversion has been completed for each successive control-point grid that was used to achieve the overall deformation for an object, CPU 63 then moves to step 194 where it determines whether each point which was expressed in global coordinates and stored at step 192 is on the surface, outside or inside of the deformed model, and then stores this information. At this point, the model is informationally complete and the CPU 63 may stop as indicated at step 196 and return for further processing of data such as determination of the volume or other characteristics based on the mass properties of the model.

Figure 9A:
FIGS. 9A–9C are schematic diagrams which illustrate a geometric model constructed from polygons, and which can be deformed using a control-point grid in accordance with the method of the present invention.
Figure 9B:
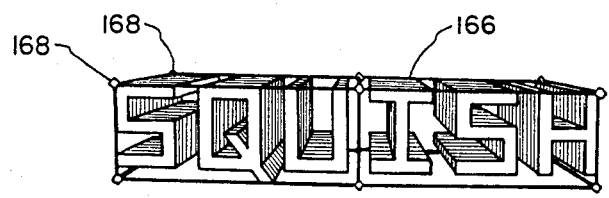
Figure 9C:
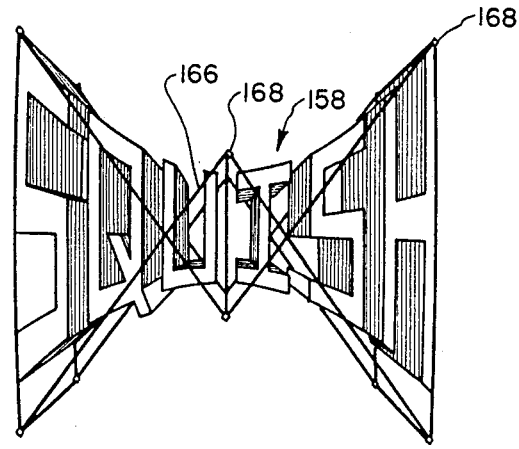

C. Illustrations of the Advantages and Versatility of the Method of the Present Invention From the foregoing, it should not be assumed that the method of free-form deformation as described above is limited solely to use with solid geometric models. The method of the present invention can be used with respect to virtually any geometric model. For example, FIGS. 9A–9C are illustrative of how the method might be used to achieve deformation of polygonal data. In FIG. 9A, the word "squish" is formed by a composite of rectangular polygons such as illustrated in the letter "s" at reference numerals 160–164. As shown in FIG. 9B, a control-point grid 166 can be positioned in accordance with the method of the present invention to encompass the graphic representation of the block letters. Then, by displacing the control points 168 using the steps previously described in FIGS. 6B–6C, the polygonal data defining the block letters can be deformed as illustrated in FIG. 9C. It should be noted that only the polygon vertices are transformed by the method of free-form deformation, while maintaining the polygon connectivity.

Another important characteristic of the method of free-form deformation as described above is that a deformed parametric surface remains a parametric surface. This can be easily demonstrated since if the parametric surface is given by $x=f(\alpha,\beta)$, $y=(\alpha,\beta)$ and $z=h(\alpha,\beta)$ and the free-form deformation is given by $X_{ffd}=X(x,y,z)$, then the deformed parametric surface patch is given by $X_{ffd}(\alpha,\beta)=X(f(\alpha,\beta),h(\alpha,\beta))$. This is a simple composition.

An important corollary to this is that parametric curves remain parametric under the method of free-form deformation described herein. This is illustrated in the photographs of FIGS. 11A and 11B, which were prepared by simulation using MOVIE.BYU, a graphics software program commercially available from Brigham Young University of Provo, Utah.

Figure 11A:
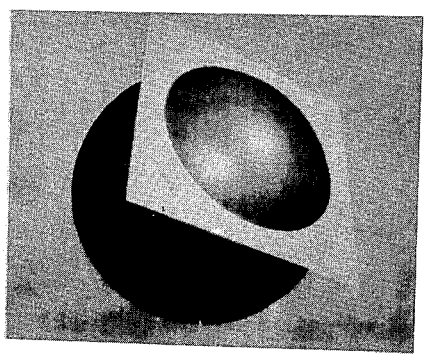
FIGS. 11A–11B are photogrphs taken from a computer simulation of the present invention, showing how a deformed parametric surface remains parametric even after deformation when using the method of the present invention.
Figure 11B:
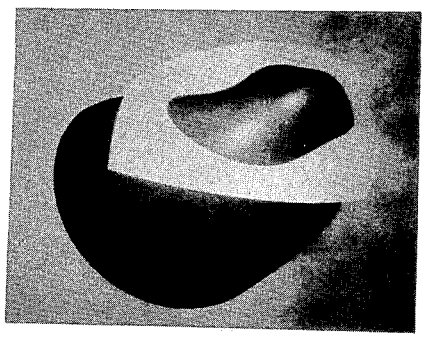

In FIG. 11A, the curve of intersection between the sphere and plane is a circle, which can be expressed parametrically in terms of quadratic rational polynomials. In FIG. 11B, the deformed circle is still a parametric curve. This fact suggests important possibilities for solid modeling. For example, if one applies the method of free-form deformation of the present invention in a CSG modeling environment only after all Boolean operations are performed, and the primitive surfaces are planes or quadrics, then all intersection curves would be parametric.

Quadrics and planes make excellent primitives because they possess both implicit and parametric equations. The parametric equation enables rapid computation of points on the surface, and the implicit equation provides the simple point classification test described in FIG. 10—e.g., is a point inside, outside, or on the surface?

The versatility of the method of free-form deformation of the present invention may be further illustrated by the simulated results as shown in the photographs of FIGS. 12–17, which were each developed using MOVIE.BYU.

It is possible to apply two or more deformations in a piecewise manner so as to maintain cross-boundary derivative continuity. To illustrate, continuity is discussed in terms of a local surface parametrization. This covers the general case, since all surfaces possess a local parametrization.

Denote the local parameters by v,w and the surface by $(s,t,u)=(s(v,w),t(v,w),u(v,w))$. Imagine two adjacent deformation regions $X_1(s_1,t_1,u_1)$ and $X_2(s_2,t_2,u_2)$ which share a common boundary $s_1=s_2=0$. The first derivatives of the deformed surface of the object can be found using the chain rule:

$$\frac{\partial X_1(v,w)}{\partial v} = \frac{\partial X_1}{\partial s} \cdot \frac{\partial s}{\partial v} + \frac{\partial X_1}{\partial t} \cdot \frac{\partial t}{\partial v} + \frac{\partial X_1}{\partial u} \cdot \frac{\partial u}{\partial v}$$

$$\frac{\partial X_1(v,w)}{\partial w} = \frac{\partial X_1}{\partial s} \cdot \frac{\partial s}{\partial w} + \frac{\partial X_1}{\partial t} \cdot \frac{\partial t}{\partial w} + \frac{\partial X_1}{\partial u} \cdot \frac{\partial u}{\partial w}$$

Note that $$\frac{\partial s}{\partial v}, \frac{\partial t}{\partial v}, \frac{\partial u}{\partial v}, \frac{\partial s}{\partial w}, \frac{\partial t}{\partial w} \text{ and } \frac{\partial u}{\partial w}$$

are all independent of the deformation. Thus, sufficient conditions for first derivative continuity are that $$\frac{\partial X_1(0,t,u)}{\partial s} = \frac{\partial X_2(0,t,u)}{\partial s}, \frac{\partial X_1(0,t,u)}{\partial t} =$$

$$\frac{\partial X_2(0,t,u)}{\partial t}, \frac{\partial X_1(0,t,u)}{\partial u} = \frac{\partial X_2(0,t,u)}{\partial u}.$$

These conditions (and those for higher derivative continuity can be shown to be straight-forward extensions of the continuity conditions for Bezier curves and tensor product Bezier surfaces. Continuity is denoted by $G^k$, which means that two adjacent deformation regions are geometrically continuous to the $k^{th}$ derivative.

Figure 12:
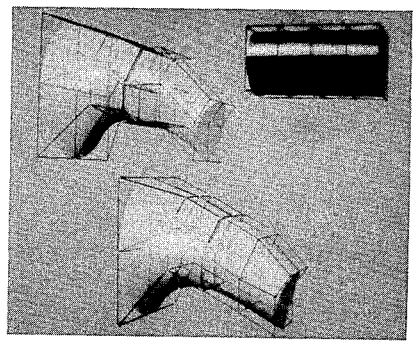
FIG. 12 is a photograph taken from a computer simulation of the method of the present invention which illustrates how the method can be used to apply two or more deformations in a piecewise manner so as to maintain cross-boundary derivative continuity.

Consider the two adjacent undeformed control-point grids in the upper right corner of the photograph in FIG. 12. The two grids have a plane of control points in common, and are generated by the same simplex. The two deformation regions controlled by these grids are $G^0$ if the common control points remain coincident, as shown in reference to the deformed object in the upper left corner of the photograph in FIG. 12. Sufficient conditions for $G^1$ are illustrated in reference to the grids shown on the object at the bottom of FIG. 12.

A special case of continuity conditions enables a local, isolated deformation to be performed using the method of the present invention. In this case, imagine that the neighboring grid for a deformation region with which one desires to maintain $G^k$ is simply an undeformed grid. Consider the problem of maintaining $G^k$ along the plane where one face of the control-point grid intersects the geometric model. It is easy to show that sufficient conditions for a $G^k$ local deformation are simply that the control points on the k planes adjacent to the interface plane are not moved. This is illustrated in the simulated results shown in the photographs of FIGS. 13A and 13B. Of course, $G^k$ can be maintained across more than one face by imposing these conditions for each face that the surface intersects.

Figure 13A:
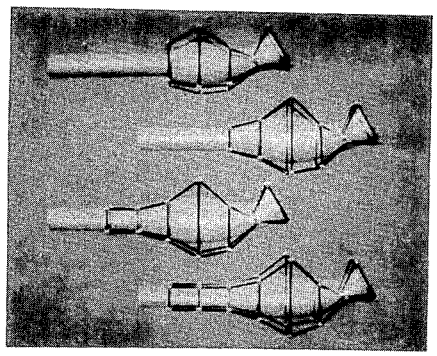
FIGS. 13A–13B are photographs taken from a computer simulation of the method of the present invention which are used to illustrate a special case of continuity conditions where local deformations are applied in succession to an object.
Figure 13B:
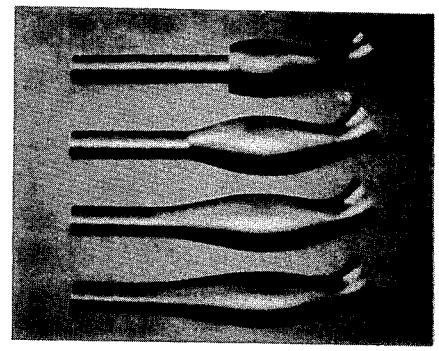

This local application of adjacent deformations lends to the method of the present invention a capability which makes the technique strongly analogous to sculpting with clay (see FIG. 13B). These local deformations can be applied hierarchically, which imparts exceptional flexibility and ease of use of the technique.

Another advantage obtained when using the method of the present invention is control over the volume change that a solid geometric model experiences when deformed. The volume change imposed on each differential element of the model is given by the Jacobian of the deformation function. If the deformation function is given by
$$F(x,y,z)=(F(x,y,z),G(x,y,z),H(x,y,z))$$

then the Jacobian is the determinant $$Jac(F) = \begin{vmatrix} \frac{\partial F}{\partial x} & \frac{\partial F}{\partial y} & \frac{\partial F}{\partial z} \\ \frac{\partial G}{\partial x} & \frac{\partial G}{\partial y} & \frac{\partial G}{\partial z} \\ \frac{\partial H}{\partial x} & \frac{\partial H}{\partial y} & \frac{\partial H}{\partial z} \end{vmatrix}$$

If the volume of any differential element before deformation is dx·dy·dz, then after deformation, its volume is Jac(F(x,y,z))·dx·dy·dz. The volume of the entire deformed solid is simply the triple integral of this differential volume over the volume enclosed by the undeformed surface. Thus, if a bound is obtained on Jac(F) over the region of deformation, then a bound is also obtained on the volume change. Such a bound is conveniently provided if Jac(F) is expressed as a trivariate Bernstein polynomial. Then, the largest and smallest polynomial coefficients provide upper and lower bounds on the volume change.

Figure 14A:
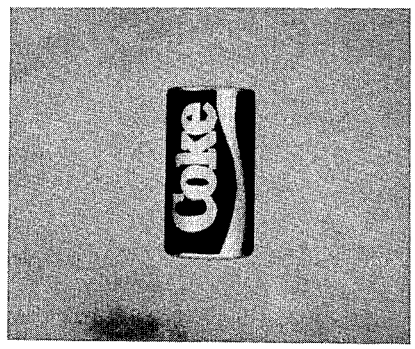
FIGS. 14A and 14B are photographs taken from a computer simulation of the method of the present invention which are used to illustrate how deformation of an object can be applied while preserving the volume of the object.
Figure 14B:
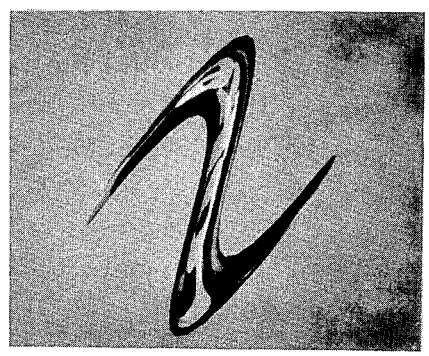

A fascinating and useful result is that there exists a family of volume preserving deformation functions, which means Jac(F)≡1. Any solid model will retain its original volume under such a transformation. The simulated results shown in the photographs of FIGS. 14A–14B illustrate a 12 oz. Coke ® can before and after application of a volume-preserving deformation function. The deformed can still holds exactly 12 oz.

Figure 15A:
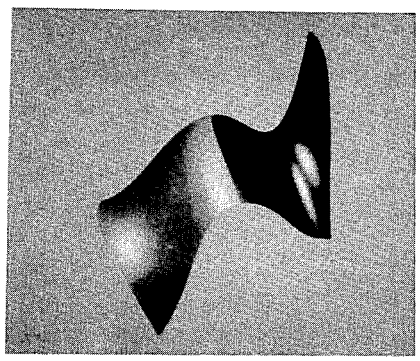
FIGS. 15A and 15B are photographs of a computer simulation of the method of the present invention which are used to illustrate how the method can be applied to a seam between two bicubic patches.
Figure 15B:
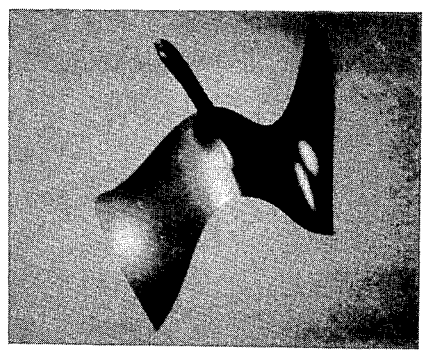

The simulated results shown in FIGS. 15A and 15B dramatize the "lump of clay" metaphor. Two slope-continuous bicubic patches have a free-form deformation applied which straddles the common boundary of the two patches. The resulting "tongue" is slope-continuous with both patches, and the seam along the tongue is also slope-continuous. Each half of the tongue is itself a parametric surface. This example illustrates another important characteristic of the method of the present invention, namely, that the method depends very little on the underlying surface patch topology.

Figure 16:
FIG. 16 is a photograph taken from a computer simulation of the method of the present invention illustrating a trophy whose handles were created by applying a single free-form deformation to a cylinder, the handles then being joined to the surface of revolution (the trophy) using a Boolean sum.

The simulated result shown in the photograph of FIG. 16 shows a trophy whose handles would be created by applying a single free-form deformation to a cylinder. The handles would then be joined to the surface of revolution (the trophy) using a Boolean sum. Again, the handles are modeled as solids. Since the underlying cylinder primitive has both a parametric and an implicit formulation, the handle surface has a parametric expression as well.

Figure 17A:
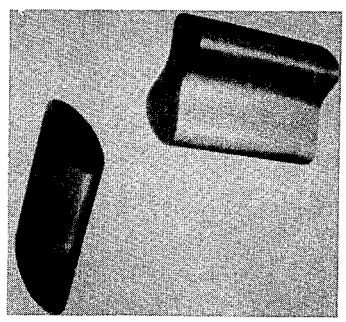
FIGS. 17A–17B are photographs taken from a computer simulation of the method of the present invention which serve to illustrate how the method can be used to design a fairing or duct surface.
Figure 17B:
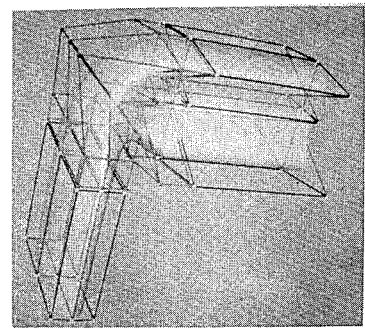
Figure 17C:
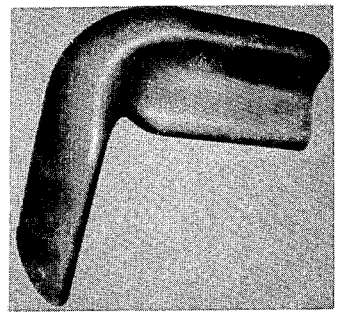

The simulated results shown in the photographs of FIGS. 17A–17C show how the present invention can be used to produce a fairing or duct surface. The two cylinders shown in FIG. 17A, one with an elliptical cross-section, and the other with a peanut-shaped cross-section, may be both formed using the present method of free-form deformation as applied to circular cylinders. The transitional duct surface bounded by the middle (green) control-point grid (FIG. 17B) may be also created by applying the present method of free-form deformation to a circular cylinder, so as to be $G^1$ with the two adjacent pieces each bounded by the end (red) control-point grids (FIG. 17B). The final result is shown in FIG. 17C.

D. Operational Example of the Method of the Present Invention

Figure 18:
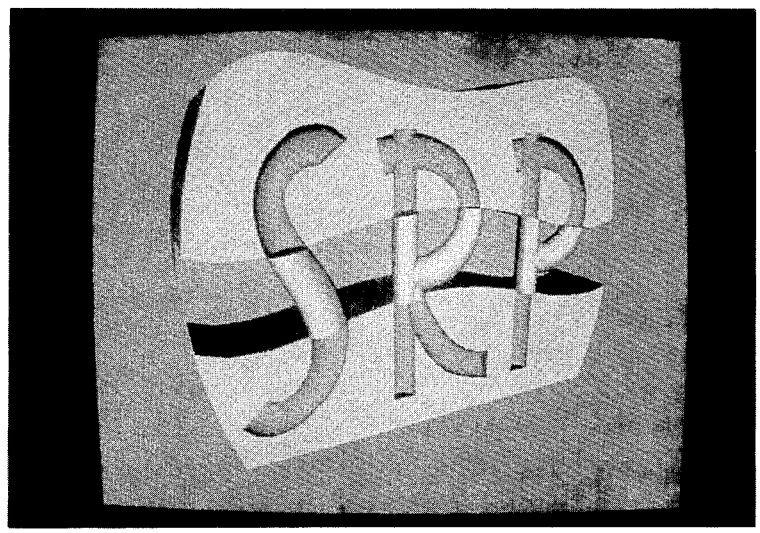
FIG. 18 is a photograph showing a result obtained using a computer graphic system that was operated using the method of the present invention as implemented by the program listing of Appendix A.

Attached hereto at Appendix A, incorporated herein by reference, is an example of a computer program listing written in ANSI Fortran which serves to illustrate one way in which the method of the present invention was implemented to control a conventional computer graphic system. It should be recognized that the system and method of the present invention are not intended to be limited by the program listing contained in Appendix A, which is merely an illustrative example, and that the method could be implemented using virtually any language other than Fortran or using other Fortran-based programs. An example of results actually obtained using the Fortran listing of Appendix A is illustrated in the photograph of FIG. 18. The results obtained in the photograph of FIG. 18 were derived by running the program on a VAX 11/780 computer system.

A computer graphic system was developed incorporating the method of free-form deformation as described above in a CSG modeling environment. An adaptive subdivision algorithm, subdividing in $R^3$ space, was used to generate surfaces of deformed primitives. The visibility of the primitives as specified by the Boolean combinations of a CSG tree was resolved in a scan line hidden surface removal algorithm.

FIG. 18 illustrates a result obtained from using the method as incorporated in the CSG environment described above. The CSG tree for this figure contained fifteen primitives, although seven were multiple instances. Two primitive types were used: a cylinder, for the letters, and a block. The base block was differenced with the letters and the "waved" block. The letters were also intersected with the "waved" block and unioned with the base block. Five different deformations were used, one for each of the following: base block, "waved" block, letter S, arch of the letter R (also used for the P) and the foot of the R.

V. SUMMARY AND SCOPE OF THE INVENTION

In summary, the method of the present invention for free-form deformation of geometric models provides a powerful and highly flexible technique that can be adapted and used with virtually any solid modeling system, such as CSG or B-rep. The method of the present invention can be used to deform surface primitives of any type or degree, such as planes, quadrics, parametric surface patches or implicitly-defined surfaces. Single or successive deformations can be applied both globally and locally and local deformations can be imposed using the method of the present invention with any desired degree of derivative continuity. It is also possible to use the method of the present invention to deform a solid geometric model in such a way that its volume is preserved.

While the method of the present invention has been described in the context of the presently preferred embodiment and the examples illustrated and described herein, the invention may be embodied in other specific ways or in other specific forms without departing from its spirit or essential characteristics. Therefore, the described embodiments and examples are to be considered in all respects only as illustrative and not restrictive. The scope of the invention is, therefore, indicated by the appended claims rather than by the foregoing description, and all changes which come within the meaning and range of equivalency of the claims are to be embraced within their scope.

Feb 10 19:30 1986    amain.f Page 1

```
      program csg
c
c***************************************************************
c
c     program csg
c
c***************************************************************
c
c     subroutines called
c        cleard  - clears display
c        color   - set light and color parameters
c        hidset  - sets Watkins as hidden method
c        initd   - initialize deformations
c        initds  - initialize display
c        initlc  - initialize light and color parameters
c        initp   - initialize basic primitive definition
c        initv   - initialize viewing parameters
c        inthid  - initialize hidden parameters
c        solset  - sets Solidview as hidden method
c        subch   - set adaptive subdivision parameters
c        tree    - traverses the CSG tree and processes the elements
c        tree2   - traverses the CSG tree and creates primitive order
c        window  - controls 3D viewing options
c        readin  - analyzes user input
c        readf   - reads input files
c
c***************************************************************
c
c     variables used
c
c***************************************************************
c
      common /hidm/ solid
      common /devi/ input,output
      common /enter/ n1,n2,key,xnum,k1,k2
      common /line/ sview,tekt,linec
      common /tekto/ iunt
      common /text0/ nchar
      common /tranar/ tran,lastt
      common /view/ nxl,nxr,nyb,nyt,zf,zb,ivf,vmat
      character*1 ivrd
      dimension key(10),xnum(40),ivrd(40)
      dimension tran(4,4,12),vmat(4,4)
      logical solid,sview,tekt
      integer output
c
      data ivrd/'D','I','S','P',   'H','E','L','P',   'E','X','I','T',
     1 'C','L','E','A','W','I','N','D','C','O','L','O',
     2 'S','O','L','I','W','A','T','K','S','U','B','D',
     3 'R','E','A','D'/
      n=40
c
c     initialize I/O unit numbers, default viewing, light and color para-
c        meters, basic primitive definitions and Lexidata display
c
      input=5
      output=6
      write(output,300)
      call initv
      call initlc
      call initp
      call initds(i)
      call inthid
c
c     option prompt
c
10    continue
      write(output,310)
      n1=1
      n2=0
      call readin(ivrd,n)
      if(nchar.eq.0) go to 790
      lit=(key(1)+3)/4
```

```
c
c   lit=1 disp  lit=2 help  lit=3 exit  lit=4 clea  lit=5 wind  lit=6 colo
c   lit=7 soli  lit=8 watk  lit=9 subd  lit=10 read
c
      goto(20,40,799,60,80,100,120,140,160,180),lit
      go to 790
c
c   display
c
  20  continue
      if (solid) then
        if (tekt) then
          call opnfil('Tekt',iunit,-1,ierror)
          if (ierror) 20,790,30
  30      continue
          iunt=iunit
          write(iunit,350)
          call initt
          call tree
          call anmode
          call clsfil(iunit)
        else
          call tree
        end if
      else
        call bgnhid
        call tree
        call tree2
        write(output,330)
        call hidden
        write(output,340)
      end if
      go to 790
c
c   help
c
  40  continue
      write(output,320)
      go to 790
c
c   clear display
c
  60  continue
      call setbgd
      call cleard
      go to 790
c
c   3D viewing (wind)
c
  80  continue
      call window
      go to 790
c
c   color
c
 100  continue
      call color
      go to 790
c
c   solidview
c
 120  continue
      call solset
      go to 790
c
c   watkins
c
 140  continue
      call hidset
      go to 790
c
c   adaptive subdivision
c
 160  continue
      call subch
      go to 790
c
c   read option
c
 180  continue
      call readf
c
c   initialize deformations and assign viewing matix to last
c     transformation
c
      call initd
      lastt=lastt+1
      do 200 i=1,4
        do 190 j=1,4
          tran(i,j,lastt)=vmat(i,j)
 190    continue
 200  continue
      go to 790
```

```
c
 790   continue
       go to 10
c
c   exit command
c
 799   continue
 300   format(//,'<CSG System>',/,/,
      1        '<Initialization in process...>',/)
 310   format('<CSG> ',$)
 320   format('<Available commands:',/,
      1       '    CLEA - Clear display,',/,
      2       '    COLO - Set light and color parameters,',/,
      3       '    DISP - Display tree,',/,
      4       '    EXIT - Quit program,',/,
      5       '    READ - Read in tree, deform. & transf. files,',/,
      6       '    SOLI - Set Solidview as hidden method (default),',/,
      7       '    SUBD - Set adaptive subdivison parameters,',/,
      8       '    WATK - Set Watkins as hidden method,',/,
      9       '    WIND - Set viewing parameters>')
 330   format('<Calling hidden...')
 340   format('...done>')
 350   format('@document(language tektronix)')
c
       end subroutine appdef(x,y,z,noi)
c
c****************************************************************
c
c  subroutine appdef - passes xyz point thru a deformation, that is a
c                      deformation being a trivariate Bernstein polynomial
c
c****************************************************************
c
c  subroutine called by
c     prim - processes a primitive
c
c****************************************************************
c
c  variables used
c     x,y,z = coordinate to be deformed
c     no    = deformation number
c
c****************************************************************
c
       common /defar/ idefd,defs,defx,defy,defz,aco,lastd
       dimension defs(0:3,3,10),defx(0:9,0:9,0:9,10),defy(0:9,0:9,0:9,10)
       dimension aco(13,10),idefd(3,10),defz(0:9,0:9,0:9,10)
       dimension x2(0:9,0:9),y2(0:9,0:9),z2(0:9,0:9)
c
c   determine if point is inside of deformation area
c
       no=abs(noi)
       rx=((x*aco(1,no)+y*aco(2,no)+z*aco(3,no))-aco(11,no))/aco(10,no)
       ry=((x*aco(4,no)+y*aco(5,no)+z*aco(6,no))-aco(12,no))/aco(10,no)
       rz=((x*aco(7,no)+y*aco(8,no)+z*aco(9,no))-aco(13,no))/aco(10,no)
       if((rx.le.1.0.and.rx.ge.0.0).and.(ry.le.1.0.and.ry.ge.0.0)
      1    .and.(rz.le.1.0.and.rz.ge.0.0)) then
         nx=idefd(1,no)
         ny=idefd(2,no)
         nz=idefd(3,no)
c
c  pass point thru trivariate bernstein polynomial
c
         do 20 ix=0,nx
           do 20 iy=0,ny
             x2(ix,iy)=defx(ix,iy,nz,no)
             y2(ix,iy)=defy(ix,iy,nz,no)
             z2(ix,iy)=defz(ix,iy,nz,no)
             do 10 i=nz-1,0,-1
               x2(ix,iy)=rz*x2(ix,iy)+defx(ix,iy,i,no)
               y2(ix,iy)=rz*y2(ix,iy)+defy(ix,iy,i,no)
               z2(ix,iy)=rz*z2(ix,iy)+defz(ix,iy,i,no)
 10          continue
 20      continue
c
         do 40 ix=0,nx
           do 30 i=ny-1,0,-1
             x2(ix,i)=ry*x2(ix,i+1)+x2(ix,i)
             y2(ix,i)=ry*y2(ix,i+1)+y2(ix,i)
             z2(ix,i)=ry*z2(ix,i+1)+z2(ix,i)
 30        continue
 40      continue
c
         do 50 i=nx-1,0,-1
           x2(i,0)=rx*x2(i+1,0)+x2(i,0)
           y2(i,0)=rx*y2(i+1,0)+y2(i,0)
           z2(i,0)=rx*z2(i+1,0)+z2(i,0)
 50      continue
c
```

```
          x=x2(0,0)
          y=y2(0,0)
          z=z2(0,0)
        else
          print*,'not in; rx,ry,rx:',rx,ry,rx
        end if
c
      return
      end
      subroutine break(n1,n2,iprim)
c
c*****************************************************************
c
c  subroutine break - calls the correct subroutine to subdivide two
c                     triangles into four
c
c*****************************************************************
c
c  subroutine called by
c     subdiv - recursively subdivides triangles
c
c*****************************************************************
c
c  subprograms called
c     break1 - subdivides spheres
c     break2 - subdivides cylinders
c     break3 - subdivides boxes
c
c*****************************************************************
c
c  variables used
c     n1    = input triangle to be subdivided
c     n2    = second input triangle to be subdivided
c     iprim = primitive number
c
c*****************************************************************
c
c  branch to the correct primitive subdividing routine
c
      if (iprim.eq.1) then
        call break1(n1,n2)
      else if (iprim.eq.2) then
        call break2(n1,n2)
      else if (iprim.eq.3) then
        call break3(n1,n2)
      end if
c
      return
      end
      subroutine break1(n1,n2)
c
c*****************************************************************
c
c  subroutine break1 - subdivides two triangles into four
c                      for primitive #1 - SPHERES
c
c*****************************************************************
c
c  subroutine called by
c     break - branches to correct subdividing routine
c
c*****************************************************************
c
c  subprograms called
c     sphnod - finds sphere nodes
c
c*****************************************************************
c
c  variables used
c     n1     = input triangle to be subdivided
c     n2     = second input triangle to be subdivided
c     itriar = triangle information array
c     rnodes = node information array
c     lastel = last triangle made
c     lastno = last node made
c
c*****************************************************************
c
      common /latest/ lastel,lastno
      common /ntriar/ itriar,rnodes,node,trind
      dimension itriar(8000,10),rnodes(8000,9),node(8000,13),
     1 trind(8000,3)
c
      if (n1.eq.-1) n1=lastel
c
c  make the new node
c
      lastno=lastno+1
      rnodes(lastno,7)=(rnodes(itriar(n1,2),7)+rnodes(itriar(n1,3),7))/2
      rnodes(lastno,8)=(rnodes(itriar(n1,2),8)+rnodes(itriar(n1,3),8))/2
      rnodes(lastno,9)=(rnodes(itriar(n1,2),9)+rnodes(itriar(n1,3),9))/2
      call sphnod(rnodes(lastno,1),rnodes(lastno,2),rnodes(lastno,3),
     1 rnodes(lastno,7),rnodes(lastno,8),rnodes(lastno,9))
c
```

```
      lastel1=lastel+1
      lastel2=lastel+2
c
c  add triangles to new node and update old node info
c
      node(lastno,1)=4
      node(lastno,2)=n1
      node(lastno,3)=n2
      node(lastno,4)=lastel1
      node(lastno,5)=lastel2
      node(itriar(n1,1),1)=node(itriar(n1,1),1)+1
      node(itriar(n1,1),(node(itriar(n1,1),1)+1))=lastel1
      node(itriar(n2,1),1)=node(itriar(n2,1),1)+1
      node(itriar(n2,1),(node(itriar(n2,1),1)+1))=lastel2
      no=itriar(n2,3)
      do 10 i=2,node(no,1)+1
        if (node(no,i).eq.n2) then
          node(no,i)=lastel2
          go to 20
        end if
  10  continue
  20  continue
      no=itriar(n1,3)
      do 30 i=2,node(no,1)+1
        if (node(no,i).eq.n1) then
          node(no,i)=lastel1
          go to 40
        end if
  30  continue
  40  continue
c
c  reconstruct n1 and make a new triangle
c
      itemp1=lastno
      itemp2=itriar(n1,1)
      itemp3=itriar(n1,2)
      itemp4=lastel1
      itemp5=itriar(n1,4)
      itemp6=lastel2
      itriar(lastel1,1)=lastno
      itriar(lastel1,2)=itriar(n1,3)
      itriar(lastel1,3)=itriar(n1,1)
      itriar(lastel1,4)=itriar(n1,5)
      itriar(lastel1,5)=itriar(n1,6)
      itriar(lastel1,6)=n1
c
c  whatever used to neighbor n1 on the 3rd side now has lastel1 as its
c  neighbor instead of n1
c
      if (itriar(itriar(n1,6),4).eq.n1) then
        itriar(itriar(n1,6),4)=lastel1
      else if (itriar(itriar(n1,6),5).eq.n1) then
        itriar(itriar(n1,6),5)=lastel1
      else
        itriar(itriar(n1,6),6)=lastel1
      end if
      itriar(n1,1)=itemp1
      itriar(n1,2)=itemp2
      itriar(n1,3)=itemp3
      itriar(n1,4)=itemp4
      itriar(n1,5)=itemp5
      itriar(n1,6)=itemp6
c
c  reconstruct n2 and make a new triangle
c
      itemp1=lastno
      itemp2=itriar(n2,1)
      itemp3=itriar(n2,2)
      itemp4=lastel2
      itemp5=itriar(n2,4)
      itemp6=lastel1
      itriar(lastel2,1)=lastno
      itriar(lastel2,2)=itriar(n2,3)
      itriar(lastel2,3)=itriar(n2,1)
      itriar(lastel2,4)=itriar(n2,5)
      itriar(lastel2,5)=itriar(n2,6)
      itriar(lastel2,6)=n2
c
c  whatever used to neighbor n2 on the 3rd side now has lastel2 as its
c  neighbor instead of n2
c
      if (itriar(itriar(n2,6),4).eq.n2) then
        itriar(itriar(n2,6),4)=lastel2
      else if (itriar(itriar(n2,6),5).eq.n2) then
        itriar(itriar(n2,6),5)=lastel2
      else
        itriar(itriar(n2,6),6)=lastel2
      end if
      itriar(n2,1)=itemp1
      itriar(n2,2)=itemp2
      itriar(n2,3)=itemp3
```

```
      itriar(n2,4)=itemp4
      itriar(n2,5)=itemp5
      itriar(n2,6)=itemp6
      lastel=lastel2
c
      return
      end
c
      subroutine sphnod(x1,y1,z1,x3,y3,z3)
c
c***********************************************************************
c
c  subroutine sphnod - finds nodes on the sphere (radius of 1)
c
c***********************************************************************
c
c  subroutine called by
c     break1 - subdivides sphere primitives
c
c***********************************************************************
c
c  variables used
c     x1,y1,z1 = coordinate on sphere primitive
c     x3,y3,z3 = coordinate on defining box
c
c***********************************************************************
c
      rlength=sqrt(x3**2+y3**2+z3**2)
      x1=x3/rlength
      y1=y3/rlength
      z1=z3/rlength
      return
      end subroutine break2(n1,n2)
c
c***********************************************************************
c
c  subroutine break2 - subdivides two triangles into four
c                      for primitive #2 - CYLINDERS
c
c***********************************************************************
c
c  subroutine called by
c     break - branches to correct subdividing routine
c
c***********************************************************************
c
c  subprograms called
c     cylnod - finds nodes on the cylinder
c
c***********************************************************************
c
c  variables used
c     n1     = input triangle to be subdivided
c     n2     = second input triangle to be subdivided
c     itriar = triangle information array
c     rnodes = node information array
c     lastel = last triangle made
c     lastno = last node made
c
c***********************************************************************
c
      common /latest/ lastel,lastno
      common /ntriar/ itriar,rnodes,node,trind
      dimension itriar(8000,10),rnodes(8000,9),node(8000,13),
     1 trind(8000,3)
c
      if (n1.eq.-1) n1=lastel
      lastel1=lastel+1
      lastel2=lastel+2
c
c  make the new node
c
      lnm=lastno+1
      rnodes(lnm,7)=(rnodes(itriar(n1,2),7)+rnodes(itriar(n1,3),7))/2.
      rnodes(lnm,8)=(rnodes(itriar(n1,2),8)+rnodes(itriar(n1,3),8))/2.
      rnodes(lnm,9)=(rnodes(itriar(n1,2),9)+rnodes(itriar(n1,3),9))/2.
      call cylnod(rnodes(lnm,1),rnodes(lnm,2),rnodes(lnm,3),
     1 rnodes(lnm,7),rnodes(lnm,8),rnodes(lnm,9))
c
c  create two nodes if it is a top or bottom edge node
c
      if ((itriar(n1,7).eq.2).and.(itriar(n2,7).eq.2)) then
         lastno=lastno+2
         rnodes(lastno,7)=rnodes(lnm,7)
         rnodes(lastno,8)=rnodes(lnm,8)
         rnodes(lastno,9)=rnodes(lnm,9)
         rnodes(lastno,1)=rnodes(lnm,1)
         rnodes(lastno,2)=rnodes(lnm,2)
```

```
            rnodes(lastno,3)=rnodes(lnm,3)
            node(lnm,1)=2
            node(lnm,2)=n1
            node(lnm,3)=lastel1
            node(lastno,1)=2
            node(lastno,2)=n2
            node(lastno,3)=lastel2
c
c    get the correct normal according to the off point of the triangle
c
c           if (abs(rnodes(itriar(n1,1),8)).lt.0.99999) then
c              rnodes(lastno,4)=0.0
c              rnodes(lastno,5)=rnodes(lastno,8)
c              rnodes(lastno,6)=0.0
c           else
c              rnodes(lnm,4)=0.0
c              rnodes(lnm,5)=rnodes(lnm,8)
c              rnodes(lnm,6)=0.0
c              rnodes(lastno,4)=rnodes(lastno,1)
c              rnodes(lastno,5)=0.0
c              rnodes(lastno,6)=rnodes(lastno,3)
c           end if
         else
            lastno=lnm
            node(lastno,1)=4
            node(lastno,2)=n1
            node(lastno,3)=n2
            node(lastno,4)=lastel1
            node(lastno,5)=lastel2
         end if
c
c    update old node triangle info
c
         node(itriar(n1,1),1)=node(itriar(n1,1),1)+1
         node(itriar(n1,1),(node(itriar(n1,1),1)+1))=lastel1
         node(itriar(n2,1),1)=node(itriar(n2,1),1)+1
         node(itriar(n2,1),(node(itriar(n2,1),1)+1))=lastel2
         no=itriar(n2,3)
         do 10 i=2,node(no,1)+1
            if (node(no,i).eq.n2) then
               node(no,i)=lastel2
               go to 20
            end if
10       continue
20       continue
         no=itriar(n1,3)
         do 30 i=2,node(no,1)+1
            if (node(no,i).eq.n1) then
               node(no,i)=lastel1
               go to 40
            end if
30       continue
40       continue
c
c    reconstruct n1 and make a new triangle
c
         if (itriar(n1,7).eq.2) then
            itemp1=lnm
         else
            itemp1=lastno
         end if
         itemp2=itriar(n1,1)
         itemp3=itriar(n1,2)
         itemp4=lastell
         itemp5=itriar(n1,4)
         itemp6=lastel2
         if (itriar(n1,7).eq.2) then
            itriar(lastel1,1)=lnm
         else
            itriar(lastel1,1)=lastno
         end if
         itriar(lastel1,2)=itriar(n1,3)
         itriar(lastel1,3)=itriar(n1,1)
         itriar(lastel1,4)=itriar(n1,5)
         itriar(lastel1,5)=itriar(n1,6)
         itriar(lastel1,6)=n1
c
c    whatever used to neighbor n1 on the 3rd side now has lastell as its
c    neighbor instead of n1
c
         if (itriar(itriar(n1,6),4).eq.n1) then
            itriar(itriar(n1,6),4)=lastell
         else if (itriar(itriar(n1,6),5).eq.n1) then
            itriar(itriar(n1,6),5)=lastell
         else
            itriar(itriar(n1,6),6)=lastell
         end if
         itriar(n1,1)=itemp1
         itriar(n1,2)=itemp2
         itriar(n1,3)=itemp3
         itriar(n1,4)=itemp4
         itriar(n1,5)=itemp5
         itriar(n1,6)=itemp6
```

```
c
c   reconstruct n2 and make a new triangle
c
      itemp1=lastno
      itemp2=itriar(n2,1)
      itemp3=itriar(n2,2)
      itemp4=lastel2
      itemp5=itriar(n2,4)
      itemp6=lastel1
      itriar(lastel2,1)=lastno
      itriar(lastel2,2)=itriar(n2,3)
      itriar(lastel2,3)=itriar(n2,1)
      itriar(lastel2,4)=itriar(n2,5)
      itriar(lastel2,5)=itriar(n2,6)
      itriar(lastel2,6)=n2
c
c   whatever used to neighbor n2 on the 3rd side now has lastel2 as its
c   neighbor instead of n2
c
      if (itriar(itriar(n2,6),4).eq.n2) then
         itriar(itriar(n2,6),4)=lastel2
      else if (itriar(itriar(n2,6),5).eq.n2) then
         itriar(itriar(n2,6),5)=lastel2
      else
         itriar(itriar(n2,6),6)=lastel2
      end if
      itriar(n2,1)=itemp1
      itriar(n2,2)=itemp2
      itriar(n2,3)=itemp3
      itriar(n2,4)=itemp4
      itriar(n2,5)=itemp5
      itriar(n2,6)=itemp6
      lastel=lastel2
c
c   set values that keep track of edge nodes
c
      if (itriar(n1,7).eq.0) then
         itriar(lastel1,7)=0
      else if (itriar(n1,7).eq.1) then
         itriar(n1,7)=2
         itriar(lastel1,7)=0
      else if (itriar(n1,7).eq.2) then
         itriar(n1,7)=3
         itriar(lastel1,7)=1
      else if (itriar(n1,7).eq.3) then
         itriar(n1,7)=0
         itriar(lastel1,7)=2
      else if (itriar(n1,7).eq.4) then
         itriar(n1,7)=2
         itriar(lastel1,7)=2
      end if
      if (itriar(n2,7).eq.0) then
         itriar(lastel2,7)=0
      else if (itriar(n2,7).eq.1) then
         itriar(n2,7)=2
         itriar(lastel2,7)=0
      else if (itriar(n2,7).eq.2) then
         itriar(n2,7)=3
         itriar(lastel2,7)=1
      else if (itriar(n2,7).eq.3) then
         itriar(n2,7)=0
         itriar(lastel2,7)=2
      else if (itriar(n2,7).eq.4) then
         itriar(n2,7)=2
         itriar(lastel2,7)=2
      end if
c
      return
      end
c
      subroutine cylnod(x1,y1,z1,x3,y3,z3)
c
c***************************************************************
c
c   subroutine cylnod - finds nodes for a cylinder centered around origin
c                       (height=2) and radius of 1
c
c***************************************************************
c
c   subroutine called by
c      break2 - subdivides cylinder primitives
c
c***************************************************************
c
c   variables used
c      x1,y1,z1 = coordinate on cylinder primitive
c      x3,y3,z3 = coordinate on defining box
c
c***************************************************************
```

```
c
      logical xneg,zneg
c
      xv=abs(x3)
      zv=abs(z3)
c
c  check if node is along y axis
c
      if ((xv.lt.0.0000001).and.(zv.lt.0.0000001)) then
         x1=0.0
         y1=y3
         z1=0.0
         return
      end if
      xs=x3**2
      zs=z3**2
      den=1.0/(sqrt(xs+zs))
c
c  for the sides (including top and bottom edge)
c
      if ((xv.gt.0.99999).or.(zv.gt.0.99999)) then
         x1=x3*den
         y1=y3
         z1=z3*den
c
c  for the top and bottom
c
      else
         if (x3.lt.0) then
            xneg=.true.
         else
            xneg=.false.
         end if
         if (z3.lt.0) then
            zneg=.true.
         else
            zneg=.false.
         end if
         if (xv.gt.zv) then
            x1=xs*den
            z1=xv*zv*den
         else
            x1=xv*zv*den
            z1=zs*den
         end if
         if (xneg) x1=-x1
         if (zneg) z1=-z1
         y1=y3
      end if
      return
      end subroutine break3(n1,n2)
c
c**********************************************************************
c
c  subroutine break3 - subdivides two triangles into four
c                      for primitive #3 - BOX
c
c**********************************************************************
c
c  subroutine called by
c     break - branches to correct subdividing routine
c
c**********************************************************************
c
c  variables used
c     n1     = input triangle to be subdivided
c     n2     = second input triangle to be subdivided
c     itriar = triangle information array
c     rnodes = node information array
c     lastel = last triangle made
c     lastno = last node made
c
c**********************************************************************
c
      common /latest/ lastel,lastno
      common /ntriar/ itriar,rnodes,node,trind
      dimension itriar(8000,10),rnodes(8000,9),node(8000,13),
     1 trind(8000,3)
c
      if (n1.eq.-1) n1=lastel
      lastel1=lastel+1
      lastel2=lastel+2
c
c  make the new node
c
      lnm=lastno+1
      rnodes(lnm,7)=(rnodes(itriar(n1,2),7)+rnodes(itriar(n1,3),7))/2.
      rnodes(lnm,8)=(rnodes(itriar(n1,2),8)+rnodes(itriar(n1,3),8))/2.
      rnodes(lnm,9)=(rnodes(itriar(n1,2),9)+rnodes(itriar(n1,3),9))/2.
```

```
              rnodes(lnm,1)=rnodes(lnm,7)
              rnodes(lnm,2)=rnodes(lnm,8)
              rnodes(lnm,3)=rnodes(lnm,9)
c
c     normal for new node is the same as the normal of the off node
c
c             rnodes(lnm,4)=rnodes(itriar(n1,1),4)
c             rnodes(lnm,5)=rnodes(itriar(n1,1),5)
c             rnodes(lnm,6)=rnodes(itriar(n1,1),6)
c
c     create extra node if it is an edge node
c
              if ((itriar(n1,7).eq.2).and.(itriar(n2,7).eq.2)) then
                 lastno=lnm+1
                 rnodes(lastno,1)=rnodes(lnm,1)
                 rnodes(lastno,2)=rnodes(lnm,2)
                 rnodes(lastno,3)=rnodes(lnm,3)
c                rnodes(lastno,4)=rnodes(itriar(n2,1),4)
c                rnodes(lastno,5)=rnodes(itriar(n2,1),5)
c                rnodes(lastno,6)=rnodes(itriar(n2,1),6)
                 rnodes(lastno,7)=rnodes(lnm,7)
                 rnodes(lastno,8)=rnodes(lnm,8)
                 rnodes(lastno,9)=rnodes(lnm,9)
                 node(lnm,1)=2
                 node(lnm,2)=n1
                 node(lnm,3)=lastel1
                 node(lastno,1)=2
                 node(lastno,2)=n2
                 node(lastno,3)=lastel2
              else
                 lastno=lnm
                 node(lastno,1)=4
                 node(lastno,2)=n1
                 node(lastno,3)=n2
                 node(lastno,4)=lastel1
                 node(lastno,5)=lastel2
              end if
c
c     update old node triangle info
c
              node(itriar(n1,1),1)=node(itriar(n1,1),1)+1
              node(itriar(n1,1),(node(itriar(n1,1),1)+1))=lastel1
              node(itriar(n2,1),1)=node(itriar(n2,1),1)+1
              node(itriar(n2,1),(node(itriar(n2,1),1)+1))=lastel2
              no=itriar(n2,3)
              do 10 i=2,node(no,1)+1
                 if (node(no,i).eq.n2) then
                    node(no,i)=lastel2
                    go to 20
                 end if
 10           continue
 20           continue
              no=itriar(n1,3)
              do 30 i=2,node(no,1)+1
                 if (node(no,i).eq.n1) then
                    node(no,i)=lastel1
                    go to 40
                 end if
 30           continue
 40           continue
c
c     reconstruct n1 and make a new triangle
c
              if (itriar(n1,7).eq.2) then
                 itemp1=lnm
              else
                 itemp1=lastno
              end if
              itemp2=itriar(n1,1)
              itemp3=itriar(n1,2)
              itemp4=lastel1
              itemp5=itriar(n1,4)
              itemp6=lastel2
              if (itriar(n1,7).eq.2) then
                 itriar(lastel1,1)=lnm
              else
                 itriar(lastel1,1)=lastno
              end if
              itriar(lastel1,2)=itriar(n1,3)
              itriar(lastel1,3)=itriar(n1,1)
              itriar(lastel1,4)=itriar(n1,5)
              itriar(lastel1,5)=itriar(n1,6)
              itriar(lastel1,6)=n1
c
c     whatever used to neighbor n1 on the 3rd side now has lastel1 as its
c     neighbor instead of n1
c
              if (itriar(itriar(n1,6),4).eq.n1) then
                 itriar(itriar(n1,6),4)=lastel1
              else if (itriar(itriar(n1,6),5).eq.n1) then
                 itriar(itriar(n1,6),5)=lastel1
              else
```

```
            itriar(itriar(n1,6),6)=lastel1
          end if
          itriar(n1,1)=itemp1
          itriar(n1,2)=itemp2
          itriar(n1,3)=itemp3
          itriar(n1,4)=itemp4
          itriar(n1,5)=itemp5
          itriar(n1,6)=itemp6
c
c   reconstruct n2 and make a new triangle
c
          itemp1=lastno
          itemp2=itriar(n2,1)
          itemp3=itriar(n2,2)
          itemp4=lastel2
          itemp5=itriar(n2,4)
          itemp6=lastel1
          itriar(lastel2,1)=lastno
          itriar(lastel2,2)=itriar(n2,3)
          itriar(lastel2,3)=itriar(n2,1)
          itriar(lastel2,4)=itriar(n2,5)
          itriar(lastel2,5)=itriar(n2,6)
          itriar(lastel2,6)=n2
c
c   whatever used to neighbor n2 on the 3rd side now has lastel2 as its
c   neighbor instead of n2
c
          if (itriar(itriar(n2,6),4).eq.n2) then
            itriar(itriar(n2,6),4)=lastel2
          else if (itriar(itriar(n2,6),5).eq.n2) then
            itriar(itriar(n2,6),5)=lastel2
          else
            itriar(itriar(n2,6),6)=lastel2
          end if
          itriar(n2,1)=itemp1
          itriar(n2,2)=itemp2
          itriar(n2,3)=itemp3
          itriar(n2,4)=itemp4
          itriar(n2,5)=itemp5
          itriar(n2,6)=itemp6
          lastel=lastel2
c
c   set values that keep track of edge nodes
c
          if (itriar(n1,7).eq.0) then
            itriar(lastel1,7)=0
          else if (itriar(n1,7).eq.1) then
            itriar(n1,7)=2
            itriar(lastel1,7)=0
          else if (itriar(n1,7).eq.2) then
            itriar(n1,7)=3
            itriar(lastel1,7)=1
          else if (itriar(n1,7).eq.3) then
            itriar(n1,7)=0
            itriar(lastel1,7)=2
          else if (itriar(n1,7).eq.4) then
            itriar(n1,7)=2
            itriar(lastel1,7)=2
          end if
          if (itriar(n2,7).eq.0) then
            itriar(lastel2,7)=0
          else if (itriar(n2,7).eq.1) then
            itriar(n2,7)=2
            itriar(lastel2,7)=0
          else if (itriar(n2,7).eq.2) then
            itriar(n2,7)=3
            itriar(lastel2,7)=1
          else if (itriar(n2,7).eq.3) then
            itriar(n2,7)=0
            itriar(lastel2,7)=2
          else if (itriar(n2,7).eq.4) then
            itriar(n2,7)=2
            itriar(lastel2,7)=2
          end if
c
          return
          end
          subroutine calint(icol,iflag)
c
c***********************************************************************
c
c   subroutine calint - calculates color intensities from normal
c
c***********************************************************************
c
c   subroutine called by
c       prim - processes each primitive
c
c***********************************************************************
c
c   subroutines called
c       getrgb - gets color RGB info from a normal
```

```
c
c****************************************************************
c
c   variables used
c       icol  = color number
c       iflag = 0 for smooth shading, 1 for flat
c       solid = true if hidden method is Solidview
c
c****************************************************************
c
      common /ccomp/ diff,hexp,high,col,icmax,ncol
      common /hidm/  solid
      common /latest/ lastel,lastno
      common /line/   sview,tekt,linec
      common /ntriar/ itriar,rnodes,node,trind
      dimension itriar(8000,10),rnodes(8000,9),node(8000,13),
     1 trind(8000,3)
      dimension col(10,3),icmax(10)
      logical solid,sview,tekt,high
c
c  flat shading
c
c    first - if Solidview, then always flat
c
      if (solid) then
        if (sview) then
          ir=nint(15.0*col(icol,1))
          ig=nint(15.0*col(icol,3))
          ib=nint(15.0*col(icol,2))
          linec=ir*256+ig*16+ib
          if (linec.eq.0) linec=1
        else
          do 10 i=1,lastel
            if (trind(i,1).lt.99.0) then
              call getrgb(icol,trind(i,1),trind(i,2),trind(i,3),
     1                    rr,rg,rb)
              ir=nint(15.0*rr)
              ig=nint(15.0*rg)
              ib=nint(15.0*rb)
              itriar(i,8)=ir*256+ig*16+ib
              if (itriar(i,8).eq.0) itriar(i,8)=1
            end if
10        continue
        end if
c
c  flat chosen
c
      else if (iflag.eq.1) then
        do 20 i=1,lastel
          if (trind(i,1).lt.99.0) then
            call getrgb(icol,trind(i,1),trind(i,2),trind(i,3),rr,rg,rb)
            ir=nint(255.0*rr)
            ig=nint(255.0*rg)
            ib=nint(255.0*rb)
            itriar(i,8)=ig*2**16+ib*2**8+ir
          end if
20      continue
c
c  smooth shading - average normals
c
      else if (iflag.eq.0) then
        do 40 i=1,lastno
          xs=0.0
          ys=0.0
          zs=0.0
          do 30 j=2,node(i,1)+1
            itr=node(i,j)
            if (trind(itr,1).lt.99.0) then
              xs=xs+trind(itr,1)
              ys=ys+trind(itr,2)
              zs=zs+trind(itr,3)
            end if
30        continue
          dno=sqrt(xs*xs+ys*ys+zs*zs)
          if (abs(dno).lt.0.000001) then
            node(i,10)=-1
          else
            call getrgb(icol,xs/dno,ys/dno,zs/dno,rr,rg,rb)
            ir=nint(255.0*rr)
            ig=nint(255.0*rg)
            ib=nint(255.0*rb)
            node(i,10)=ig*2**16+ib*2**8+ir
          end if
40      continue
      end if
c
      return
      end
```

```
      subroutine cleard
c
c*******************************************************************
c
c  subroutine cleard - clears display
c
c*******************************************************************
c
c  subroutine called by:
c
c*******************************************************************
c
c  subprograms called:
c       dsbloc = lexidata library routine for sending data block
c                (in this routine it is used as a call to dscsl and dsclr)
c
c*******************************************************************
c
c  variables used:
c       isend = lexidata function codes and information to clear screen
c
c*******************************************************************
c
      integer*2 isend(9),icou
      data isend/56,68,26,2,0,0,27,3,-1/,icou/9/
c
c  call dsbloc to clear screen
c
      call dsbloc(isend,icou)
c
      return
      end subroutine clipeg(nove,iver,ico,ivern)
c
c*******************************************************************
c
c  subroutine clipeg    -   clips polygons a plane at a time using
c                           sutherland-hodgman polygon clipping algorithm
c
c*******************************************************************
c
c  subroutine called by:
c       polout  performs trivial acceptance or rejection of polygons
c
c*******************************************************************
c
c  subprograms called:
c       compin - computes intersection of polygon edge and clipping plane
c       polvie - outputs polygons or lines for display
c
c*******************************************************************
c
c  variables used:
c       ico    = current polygon vertex count
c       iver   = array of polygon vertex information
c       ivern  = final clipped polygon vertex array
c       iplane = current clipping plane
c       kxmax  = maximum x coordinate
c       kymax  = maximum y coordinate
c       kzmax  = maximum z coordinate
c       nover  = number of polygon vertices
c
c*******************************************************************
c
      common /solres/ kxmax,kymax,kzmax,kxmin,kymin,kzmin
      dimension iver(24),iqv(8,3),ipv(8,3),is(3),in(3),ivern(24)
c
c  buffer incoming variables
c
      nover=nove
      do 10 i=1,nover
        j=i*3
        ipv(i,1)=iver(j-2)
        ipv(i,2)=iver(j-1)
        ipv(i,3)=iver(j)
   10 continue
c
c  sutherland-hodgman algorithm clips each polygon against each plane
c   - doing it one plane at a time forming a new polygon with each clip.
c   loop around the vertices of the polygon saving interior vertices,
c   calculating and saving vertices that are from the intersection of
c   a polygon edge and clipping plane, and discarding vertices that
c   are exterior of the clipping plane.
c
      iplane=0
      do 40 ilo=1,3
        iplane=iplane+1
c
```

```
c   clip against x=kxmin, y=kymin, z=kzmin planes
c
        if(ilo.eq.1) kmin=kxmin
        if(ilo.eq.2) kmin=kymin
        if(ilo.eq.3) kmin=kzmin
        ico=0
        is(1)=ipv(1,1)
        is(2)=ipv(1,2)
        is(3)=ipv(1,3)
        if(is(ilo).ge.kmin) then
           iqv(1,1)=is(1)
           iqv(1,2)=is(2)
           iqv(1,3)=is(3)
           ico=1
        end if
        do 20 i=2,nover
           if((is(ilo).ge.kmin.and.ipv(i,ilo).lt.kmin).or.
      1       (is(ilo).lt.kmin.and.ipv(i,ilo).ge.kmin)) then
              call compin(is,ipv,i,iplane,in,kmin)
              ico=ico+1
              iqv(ico,1)=in(1)
              iqv(ico,2)=in(2)
              iqv(ico,3)=in(3)
              iqv(ico,ilo)=kmin
           end if
           is(1)=ipv(i,1)
           is(2)=ipv(i,2)
           is(3)=ipv(i,3)
           if(is(ilo).ge.kmin) then
              ico=ico+1
              iqv(ico,1)=is(1)
              iqv(ico,2)=is(2)
              iqv(ico,3)=is(3)
           end if
20      continue
        if((is(ilo).ge.kmin.and.ipv(1,ilo).lt.kmin).or.
      1    (is(ilo).lt.kmin.and.ipv(1,ilo).ge.kmin)) then
           call compin(is,ipv,1,iplane,in,kmin)
           ico=ico+1
           iqv(ico,1)=in(1)
           iqv(ico,2)=in(2)
           iqv(ico,3)=in(3)
           iqv(ico,ilo)=kmin
        end if
        nover=ico
        iplane=iplane+1
c
c   clip against kxmax, kymax, kzmax planes
c
        if(ilo.eq.1) kmax=kxmax
        if(ilo.eq.2) kmax=kymax
        if(ilo.eq.3) kmax=kzmax
        ico=0
        is(1)=iqv(1,1)
        is(2)=iqv(1,2)
        is(3)=iqv(1,3)
        if(is(ilo).le.kmax) then
           ipv(1,1)=is(1)
           ipv(1,2)=is(2)
           ipv(1,3)=is(3)
           ico=1
        end if
        do 30 i=2,nover
           if((is(ilo).ge.kmax.and.iqv(i,ilo).lt.kmax).or.
      1       (is(ilo).lt.kmax.and.iqv(i,ilo).ge.kmax)) then
              call compin(is,iqv,i,iplane,in,kmax)
              ico=ico+1
              ipv(ico,1)=in(1)
              ipv(ico,2)=in(2)
              ipv(ico,3)=in(3)
              ipv(ico,ilo)=kmax
           end if
           is(1)=iqv(i,1)
           is(2)=iqv(i,2)
           is(3)=iqv(i,3)
           if(is(ilo).le.kmax) then
              ico=ico+1
              ipv(ico,1)=is(1)
              ipv(ico,2)=is(2)
              ipv(ico,3)=is(3)
           end if
30      continue
        if((is(ilo).ge.kmax.and.iqv(1,ilo).lt.kmax).or.
      1    (is(ilo).lt.kmax.and.iqv(1,ilo).ge.kmax)) then
           call compin(is,iqv,1,iplane,in,kmax)
           ico=ico+1
           ipv(ico,1)=in(1)
           ipv(ico,2)=in(2)
           ipv(ico,3)=in(3)
```

```
              ipv(ico,ilo)=kmax
           end if
           nover=ico
   40   continue
c
c   return new clipped polygon
c
        if(ico.eq.0) return
        do 50 i=1,ico
           j=i*3
           ivern(j-2)=ipv(i,1)
           ivern(j-1)=ipv(i,2)
           ivern(j)  =ipv(i,3)
   50   continue
c
        return
        end subroutine cnorm(it)
c
c*******************************************************************
c
c   subroutine cnorm - calculates normal for triangle it
c
c*******************************************************************
c
c   subroutine called by
c       prim - processes each primitive
c
c*******************************************************************
c
c   variables used
c       it    = triangle number
c       trind = triangle normals for each primitive
c
c*******************************************************************
c
        common /ntriar/ itriar,rnodes,node,trind
        dimension itriar(8000,10),rnodes(8000,9),node(8000,13),
      1 trind(8000,3)
c
c   calculate normal
c
        v1=rnodes(itriar(it,2),1)-rnodes(itriar(it,1),1)
        v2=rnodes(itriar(it,2),2)-rnodes(itriar(it,1),2)
        v3=-(rnodes(itriar(it,2),3)-rnodes(itriar(it,1),3))
        w1=rnodes(itriar(it,3),1)-rnodes(itriar(it,1),1)
        w2=rnodes(itriar(it,3),2)-rnodes(itriar(it,1),2)
        w3=-(rnodes(itriar(it,3),3)-rnodes(itriar(it,1),3))
        xn=v2*w3-w2*v3
        yn=w1*v3-v1*w3
        zn=v1*w2-w1*v2
c
c   normalize (it is possible for there not to be a normal - triangle
c   degenerates into a line from a deformation - in this case set
c   X component of the normal to 100.0)
c
        dno=sqrt(xn*xn+yn*yn+zn*zn)
        if (abs(dno).lt.0.000001) then
           trind(it,1)=100.0
        else
           trind(it,1)=xn/dno
           trind(it,2)=yn/dno
           trind(it,3)=zn/dno
        end if
c
        return
        end
        subroutine color
c
c*******************************************************************
c
c   subroutine color - controls the light and color parameters
c
c*******************************************************************
c
c   subroutine called by
c       main
c
c*******************************************************************
c
c   subroutines called
c       readin - analyzes user input
c       setbgd - sets background color
c
c*******************************************************************
c
c   variables used
c       bgr,bgg,bgb = RGB components of the background color
c       col   = RGB color info array
c       diff  = diffuse light component
c       hexp  = highlight exponent
```

```
c      high  = logical, true if highlights are to be calculated
c      hx,hy,hz = highlight source direction
c      icmax = points to which RGB component is the highest intensity
c      ncol  = number of colors
c      xli,yli,zli = light source direction
c
c*****************************************************************
c
       common /devi/ input,output
       common /enter/ n1,n2,key,xnum,k1,k2
       common /text0/ nchar
c
       common /lights/ xli,yli,zli,hx,hy,hz
       common /ccomp/ diff,hexp,high,col,icmax,ncol
       common /bgrdc/ bgr,bgg,bgb
       dimension col(10,3),icmax(10)
       character*1 ivrd
       dimension key(10),xnum(40),ivrd(36)
       integer output
       logical high
       data ivrd/'D','I','F','F',  'L','I','G','H',  'B','A','C','K',
      1'C','O','L','O', 'H','I','G','H',  'E','X','I','T',
      2'L','S','#','#', 'H','E','L','P',  'Y','#','#','#'/
       n=36
c
c  prompt for color option
c
 10    continue
       write(output,310)
       n1=1
       n2=0
       call readin(ivrd,n)
       if(nchar.eq.0) go to 290
       lit=(key(1)+3)/4
c
c  lit=1  diff      lit=2  ligh      lit=3  back      lit=4  colo
c  lit=5  high      lit=6  exit      lit=7  inqu (1s) lit=8  help
c
       goto(20,40,60,80,100,299,120,140),lit
       go to 290
c
c  diffuse option
c
 20    continue
       write(output,320)
       n1=0
       n2=1
       call readin(ivrd,n)
       if (nchar.ne.0) then
         if ((xnum(1).gt.0.0).and.(xnum(1).lt.1.0)) diff=xnum(1)
       end if
       go to 290
c
c  light option
c
 40    continue
       write(output,330)
       n1=0
       n2=1
       call readin(ivrd,n)
       if(nchar.ne.0) then
         xli=xnum(1)
         yli=xnum(2)
         zli=xnum(3)
c
c  normalize light source direction
c
         sxli=xli*xli
         syli=yli*yli
         dli=sqrt(sxli+syli+zli*zli)
         xli=xli/dli
         yli=yli/dli
         zli=zli/dli
c
c  define highlight source - half way between light source and eye
c   (after conversion to eye coord. - eye direction is (0,0,1))
c
         div=sqrt(sxli+syli+(zli+1)**2)
         hx=xli/div
         hy=yli/div
         hz=(zli+1)/div
       end if
       go to 290
c
c  background option
c
 60    continue
       write(output,340)
```

```
            n1=0
            n2=1
            call readin(iwrd,n)
            if(nchar.ne.0) then
              if ((xnum(1).ge.0.0).and.(xnum(1).le.1.0)) bgr=xnum(1)
              if ((xnum(2).ge.0.0).and.(xnum(2).le.1.0)) bgb=xnum(2)
              if ((xnum(3).ge.0.0).and.(xnum(3).le.1.0)) bgg=xnum(3)
            end if
            go to 290
c
c   color option
c
  80    continue
        write(output,350)
        n1=0
        n2=1
        call readin(iwrd,n)
        if(nchar.ne.0) then
          if (xnum(1).ge.1.0) ncol=nint(xnum(1))
        end if
        write(output,351)
  90    continue
        write(output,352)
        n1=0
        n2=1
        call readin(iwrd,n)
        if ((nchar.ne.0).and.(xnum(1).ge.1.0)) then
          noc=nint(xnum(1))
          if ((xnum(2).ge.0.0).and.(xnum(2).le.1.0)) col(noc,1)=xnum(2)
          if ((xnum(3).ge.0.0).and.(xnum(3).le.1.0)) col(noc,2)=xnum(3)
          if ((xnum(4).ge.0.0).and.(xnum(4).le.1.0)) col(noc,3)=xnum(4)
c
c   find max color intensity
c
          rmax=max(col(noc,1),col(noc,2),col(noc,3))
          if (rmax.eq.col(noc,1)) then
            icmax(noc)=1
          else if (rmax.eq.col(noc,2)) then
            icmax(noc)=2
          else if (rmax.eq.col(noc,3)) then
            icmax(noc)=3
          else
            stop 'did not find icmax'
          end if
          go to 90
        end if
        go to 290
c
c   highlight option
c
 100    continue
        write(output,360)
        n1=1
        n2=0
        call readin(iwrd,n)
        lit=(key(1)+3)/4
        if(lit.eq.9) then
          high=.true.
          write(output,361)
          n1=0
          n2=1
          call readin(iwrd,n)
          if (nchar.ne.0) hexp=xnum(1)
        else
          high=.false.
        end if
        go to 290
c
c   inquire (is) option
c
 120    continue
        write(output,370)
        write(output,374) xli,yli,zli
        if (high) then
          write(output,371) hexp
        else
          write(output,372)
        end if
        write(output,373) diff
        write(output,376)
        do 130 i=1,ncol
          write(output,377) i,col(i,1),col(i,2),col(i,3)
 130    continue
        write(output,375) bgr,bgb,bgg
        go to 290
c
c   help option
c
 140    continue
        write(output,380)
c
```

```
 290  continue
      go to 10
c
c  exit option
c
 299  continue
c
 310  format('<CSG>COLO> ',$)
 320  format('<Enter diffuse component (0.0-1.0)> ',$)
 330  format('<Enter light source direction (X,Y,Z)> ',$)
 340  format('<Enter background color (R,B,G)> ',$)
 350  format('<Enter number of colors> ',$)
 351  format('<Enter color number and color components (R,B,G)>')
 352  format('<n,R,B,G> ',$)
 360  format('<Highlights?> ',$)
 361  format('<Enter highlight exponent> ',$)
 370  format('<Color and light parameters:')
 371  format('  Highlights on with exponent of ',f5.1)
 372  format('  Highlights off')
 373  format('  Diffuse component: ',f5.3)
 374  format('  Light source direction (X,Y,Z): ',3f7.3)
 375  format('  Background color (R,B,G): ',3f7.3,' >')
 376  format('  Color number and color (R,B,G)')
 377  format('      ',i2,'      ',3f7.3)
 380  format('<Available commands:',/,
     1'    BACK - Set background color.',/,
     2'    COLO - Define RGB components for color numbers.',/,
     3'    DIFF - Set diffuse color level.',/,
     4'    EXIT - Exit COLO level,',/,
     5'    HIGH - Set highlights.',/,
     6'    LIGH - Define light direction>')
     7'    LS   - List all light and color parameters.',/,
c
      return
      end
      subroutine compin(is,ipv,no,n,in,iv)
c
c****************************************************************
c
c  subroutine compin  -  computes intersection of polygon edge and
c                        clipping plane
c
c****************************************************************
c
c  subroutine called by:
c      clipeg - clips polygons an plane at a time
c
c****************************************************************
c
c  variables used:
c      is    = coordinates of one end of polygon edge
c      ipv   = coordinates of second end of polygon edge
c      no    = row in polygon array for second polygon edge
c      n     = which screen plane to be clipped against (1-6)
c      in    = calculated intersection point
c      iv    = screen coordinate of clipping plane
c
c****************************************************************
c
      dimension is(3),ipv(8,3),in(3)
c
c  find change of each coordinate
c
      ichx=is(1)-ipv(no,1)
      ichy=is(2)-ipv(no,2)
      ichz=is(3)-ipv(no,3)
c
c  set default case
c
      in(1)=is(1)
      in(2)=is(2)
      in(3)=is(3)
c
c  line is parallel with one of coordinate axes
c
      if(ichx.eq.0.and.ichy.eq.0) return
      if(ichx.eq.0.and.ichz.eq.0) return
      if(ichy.eq.0.and.ichz.eq.0) return
c
c  line is in xz plane
c
      if(ichy.eq.0) then
        sxz=float(ichx)/ichz
        bb=is(1)-(sxz*is(3))
        if(n.le.2) then
          in(3)=(iv-bb)/sxz
          return
        else
          in(1)=sxz*iv+bb
          return
        end if
```

```
              end if
c
c     line is in yz plane
c
          if(ichx.eq.0) then
            syz=float(ichy)/ichz
            bb=is(2)-(syz*is(3))
            if(n.le.4) then
              in(3)=(iv-bb)/syz
              return
            else
              in(2)=syz*iv+bb
              return
            end if
          end if
c
c     line is in xy plane
c
          if(ichz.eq.0) then
            syx=float(ichy)/ichx
            bb=is(2)-(syx*is(1))
            if(n.ge.3) then
              in(1)=(iv-bb)/syx
              return
            else
              in(2)=syx*iv+bb
              return
            end if
          end if
c
c     calculate point of intersection of line and cutting plane
c
          syx=float(ichy)/ichx
          sxz=float(ichx)/ichz
          syz=float(ichy)/ichz
c
c     intersection with x planes
c
          if(n.le.2) then
            by=is(2)-syx*is(1)
            in(2)=syx*iv+by
            bz=is(1)-sxz*is(3)
            in(3)=(iv-bz)/sxz
c
c     intersection with y planes
c
          else if(n.eq.3.or.n.eq.4) then
            by=is(2)-syx*is(1)
            in(1)=(iv-by)/syx
            bz=is(2)-syz*is(3)
            in(3)=(iv-bz)/syz
c
c     intersection with z planes
c
          else
            bx=is(1)-sxz*is(3)
            in(1)=sxz*iv+bx
            by=is(2)-syz*is(3)
            in(2)=syz*iv+by
          end if
c
          return
          end subroutine getrgb(icol,xn,yn,zn,rr,rg,rb)
c
c**********************************************************************
c
c     subroutine getrgb - finds RGB components from a normal
c
c**********************************************************************
c
c     subroutine called by
c         calint - calculates color intensities
c
c**********************************************************************
c
c     variables used
c         icol   = color number
c         xn,yn,zn = normal
c         rr,rg,rb = RGB intensities (0 to 1.0)
c
c**********************************************************************
c
          common /lights/ xli,yli,zli,hx,hy,hz
          common /ccomp/ diff,hexp,high,col,icmax,ncol
          dimension col(10,3),icmax(10),tcol(3)
          logical high
c
```

```
c       perform dot product with normal and light direction to find intensity
c
        dp=xn*xli+yn*yli+zn*zli
        rint=(1.0-diff)*abs(dp)+diff
        tcol(1)=col(icol,1)*rint
        tcol(2)=col(icol,2)*rint
        tcol(3)=col(icol,3)*rint
c
c       calculate highlight intensity
c
        if (high) then
          ds=xn*hx+yn*hy+zn*hz
          hint=max(0.0,ds)
          if (hint.gt.0.0) then
            hint=hint**hexp
            alpha=(1.0-hint)/tcol(icmax(icol))
            if (alpha.lt.0.0) then
              alpha=0.0
            else if (alpha.gt.1.0) then
              alpha=1.0
            end if
            tcol(1)=alpha*tcol(1)+hint
            tcol(2)=alpha*tcol(2)+hint
            tcol(3)=alpha*tcol(3)+hint
          end if
        end if
        rr=tcol(1)
        rb=tcol(2)
        rg=tcol(3)
c
        return end block data
c
c****************************************************************
c
c   block data initializes the primitives
c
c****************************************************************
c
c   variables used
c      itritp = initial triangle info for each primitive
c      rnodtp = initial node info for each primitive
c      ilmpr  = trinagle and node limits for each primitive
c      inodtp = initial node triangle info each primitive
c
c****************************************************************
c
        common /initpr/ itritp,rnodtp,ilmpr,inodtp
        dimension itritp(3,12,7),rnodtp(3,24,9),ilmpr(3,2),inodtp(3,24,7)
c
c   for primitive #1 - sphere
c
        data ilmpr(1,1)/12/, ilmpr(1,2)/8/
c
        data (itritp(1,1,i),i=1,7)/2,3,1,3,7,2,0/,
       1(itritp(1,2,i),i=1,7)/2,1,6,1,8,3,0/
        data (itritp(1,3,i),i=1,7)/2,6,3,2,9,1,0/,
       1(itritp(1,4,i),i=1,7)/4,3,8,7,10,11,0/
        data (itritp(1,5,i),i=1,7)/5,1,8,8,11,12,0/
        data (itritp(1,6,i),i=1,7)/7,6,8,9,12,10,0/
        data (itritp(1,7,i),i=1,7)/4,1,3,11,1,4,0/,
       1(itritp(1,8,i),i=1,7)/5,6,1,12,2,5,0/
        data (itritp(1,9,i),i=1,7)/7,3,6,10,3,6,0/,
       1(itritp(1,10,i),i=1,7)/7,8,3,6,4,9,0/
        data (itritp(1,11,i),i=1,7)/4,8,1,4,5,7,0/,
       1(itritp(1,12,i),i=1,7)/5,8,6,5,6,8,0/
c
        data (rnodtp(1,1,i),i=7,9)/1,-1,1/, (rnodtp(1,2,i),i=7,9)/1,1,1/
        data (rnodtp(1,3,i),i=7,9)/-1,1,1/, (rnodtp(1,4,i),i=7,9)/-1,-1,1/
        data (rnodtp(1,5,i),i=7,9)/1,-1,-1/, (rnodtp(1,6,i),i=7,9)/1,1,-1/
        data (rnodtp(1,7,i),i=7,9)/-1,1,-1/,
       1(rnodtp(1,8,i),i=7,9)/-1,-1,-1/
c
        data (inodtp(1,1,i),i=1,7)/6,1,2,5,7,8,11/
        data (inodtp(1,2,i),i=1,4)/3,1,2,3/
        data (inodtp(1,3,i),i=1,7)/6,1,3,4,7,9,10/
        data (inodtp(1,4,i),i=1,4)/3,4,7,11/
        data (inodtp(1,5,i),i=1,4)/3,5,8,12/
        data (inodtp(1,6,i),i=1,7)/6,2,3,6,8,9,12/
        data (inodtp(1,7,i),i=1,4)/3,6,9,10/
        data (inodtp(1,8,i),i=1,7)/6,4,5,6,10,11,12/
c
c   for primitive #2 - cylinder
c
        data ilmpr(2,1)/12/, ilmpr(2,2)/16/
c
        data (itritp(2,1,i),i=1,7)/2,3,1,3,7,2,1/,
```

```
      1(itritp(2,2,i),i=1,7)/2,1,6,1,8,3,3/
       data (itritp(2,3,i),i=1,7)/10,14,11,2,9,1,4/,
      1(itritp(2,4,i),i=1,7)/4,3,8,7,10,11,3/
       data (itritp(2,5,i),i=1,7)/13,9,16,8,11,12,4/
       data (itritp(2,6,i),i=1,7)/7,6,8,9,12,10,1/
       data (itritp(2,7,i),i=1,7)/4,1,3,11,1,4,1/,
      1(itritp(2,8,i),i=1,7)/5,6,1,12,2,5,3/
       data (itritp(2,9,i),i=1,7)/15,11,14,10,3,6,4/,
      1(itritp(2,10,i),i=1,7)/7,8,3,6,4,9,3/
       data (itritp(2,11,i),i=1,7)/12,16,9,4,5,7,4/,
      1(itritp(2,12,i),i=1,7)/5,8,6,5,6,8,1/
c
       data (rnodtp(2,1,i),i=7,9)/1,-1,1/, (rnodtp(2,2,i),i=7,9)/1,1,1/
       data (rnodtp(2,3,i),i=7,9)/-1,1,1/, (rnodtp(2,4,i),i=7,9)/-1,-1,1/
       data (rnodtp(2,5,i),i=7,9)/1,-1,-1/, (rnodtp(2,6,i),i=7,9)/1,1,-1/
       data (rnodtp(2,7,i),i=7,9)/-1,1,-1/,
      1(rnodtp(2,8,i),i=7,9)/-1,-1,-1/
       data (rnodtp(2,9,i),i=7,9)/1,-1,1/, (rnodtp(2,10,i),i=7,9)/1,1,1/
       data (rnodtp(2,11,i),i=7,9)/-1,1,1/,
      1(rnodtp(2,12,i),i=7,9)/-1,-1,1/
       data (rnodtp(2,13,i),i=7,9)/1,-1,-1/,
      1(rnodtp(2,14,i),i=7,9)/1,1,-1/
       data (rnodtp(2,15,i),i=7,9)/-1,1,-1/,
      1(rnodtp(2,16,i),i=7,9)/-1,-1,-1/
c
       data (inodtp(2,1,i),i=1,5)/4,1,2,7,8/
       data (inodtp(2,2,i),i=1,3)/2,1,2/
       data (inodtp(2,3,i),i=1,5)/4,1,4,7,10/
       data (inodtp(2,4,i),i=1,3)/2,4,7/
       data (inodtp(2,5,i),i=1,3)/2,8,12/
       data (inodtp(2,6,i),i=1,5)/4,2,6,8,12/
       data (inodtp(2,7,i),i=1,3)/2,6,10/
       data (inodtp(2,8,i),i=1,5)/4,4,6,10,12/
       data (inodtp(2,9,i),i=1,3)/2,5,11/
       data (inodtp(2,10,i),i=1,2)/1,3/
       data (inodtp(2,11,i),i=1,3)/2,3,9/
       data (inodtp(2,12,i),i=1,2)/1,11/
       data (inodtp(2,13,i),i=1,2)/1,5/
       data (inodtp(2,14,i),i=1,3)/2,3,9/
       data (inodtp(2,15,i),i=1,2)/1,9/
       data (inodtp(2,16,i),i=1,3)/2,5,11/
c
c   for primitive #3 - box
c
       data ilmpr(3,1)/12/, ilmpr(3,2)/24/
c
       data (itritp(3,1,i),i=1,7)/2,3,1,3,7,2,4/,
      1(itritp(3,2,i),i=1,7)/10,9,6,1,8,3,4/
       data (itritp(3,3,i),i=1,7)/18,14,11,2,9,1,4/,
      1(itritp(3,4,i),i=1,7)/12,19,16,7,10,11,4/
       data (itritp(3,5,i),i=1,7)/21,17,24,8,11,12,4/
       data (itritp(3,6,i),i=1,7)/15,22,8,9,12,10,4/
       data (itritp(3,7,i),i=1,7)/4,1,3,11,1,4,4/,
      1(itritp(3,8,i),i=1,7)/5,6,9,12,2,5,4/
       data (itritp(3,9,i),i=1,7)/7,11,14,10,3,6,4/,
      1(itritp(3,10,i),i=1,7)/23,16,19,6,4,9,4/
       data (itritp(3,11,i),i=1,7)/20,24,17,4,5,7,4/,
      1(itritp(3,12,i),i=1,7)/13,8,22,5,6,8,4/
c
       data (rnodtp(3,1,i),i=1,3)/1,-1,1/, (rnodtp(3,2,i),i=1,3)/1,1,1/
       data (rnodtp(3,3,i),i=1,3)/-1,1,1/, (rnodtp(3,4,i),i=1,3)/-1,-1,1/
       data (rnodtp(3,5,i),i=1,3)/1,-1,-1/, (rnodtp(3,6,i),i=1,3)/1,1,-1/
       data (rnodtp(3,7,i),i=1,3)/-1,1,-1/,
      1(rnodtp(3,8,i),i=1,3)/-1,-1,-1/
       data (rnodtp(3,9,i),i=1,3)/1,-1,1/, (rnodtp(3,10,i),i=1,3)/1,1,1/
       data (rnodtp(3,11,i),i=1,3)/-1,1,1/,
      1(rnodtp(3,12,i),i=1,3)/-1,-1,1/
       data (rnodtp(3,13,i),i=1,3)/1,-1,-1/,
      1(rnodtp(3,14,i),i=1,3)/1,1,-1/
       data (rnodtp(3,15,i),i=1,3)/-1,1,-1/,
      1(rnodtp(3,16,i),i=1,3)/-1,-1,-1/
       data (rnodtp(3,17,i),i=1,3)/1,-1,1/, (rnodtp(3,18,i),i=1,3)/1,1,1/
       data (rnodtp(3,19,i),i=1,3)/-1,1,1/,
      1(rnodtp(3,20,i),i=1,3)/-1,-1,1/
       data (rnodtp(3,21,i),i=1,3)/1,-1,-1/,
      1(rnodtp(3,22,i),i=1,3)/1,1,-1/
       data (rnodtp(3,23,i),i=1,3)/-1,1,-1/,
      1(rnodtp(3,24,i),i=1,3)/-1,-1,-1/
c
c      data (rnodtp(3,1,i),i=4,6)/0,0,1/, (rnodtp(3,2,i),i=4,6)/0,0,1/
c      data (rnodtp(3,3,i),i=4,6)/0,0,1/, (rnodtp(3,4,i),i=4,6)/0,0,1/
c      data (rnodtp(3,5,i),i=4,6)/1,0,0/, (rnodtp(3,6,i),i=4,6)/1,0,0/
c      data (rnodtp(3,7,i),i=4,6)/0,1,0/, (rnodtp(3,8,i),i=4,6)/0,0,-1/
c      data (rnodtp(3,9,i),i=4,6)/1,0,0/, (rnodtp(3,10,i),i=4,6)/1,0,0/
c      data (rnodtp(3,11,i),i=4,6)/0,1,0/, (rnodtp(3,12,i),i=4,6)/-1,0,0/
c      data (rnodtp(3,13,i),i=4,6)/0,0,-1/, (rnodtp(3,14,i),i=4,6)/0,1,0/
c      data (rnodtp(3,15,i),i=4,6)/0,0,-1/, (rnodtp(3,16,i),i=4,6)/-1,0,0/
c      data (rnodtp(3,17,i),i=4,6)/0,-1,0/, (rnodtp(3,18,i),i=4,6)/0,1,0/
c      data (rnodtp(3,19,i),i=4,6)/-1,0,0/, (rnodtp(3,20,i),i=4,6)/0,-1,0/
c      data (rnodtp(3,21,i),i=4,6)/0,-1,0/, (rnodtp(3,22,i),i=4,6)/0,0,-1/
c      data (rnodtp(3,23,i),i=4,6)/-1,0,0/, (rnodtp(3,24,i),i=4,6)/0,-1,0/
c
```

```
      data (rnodtp(3,1,i),i=7,9)/1,-1,1/, (rnodtp(3,2,i),i=7,9)/1,1,1/
      data (rnodtp(3,3,i),i=7,9)/-1,1,1/, (rnodtp(3,4,i),i=7,9)/-1,-1,1/
      data (rnodtp(3,5,i),i=7,9)/1,-1,-1/, (rnodtp(3,6,i),i=7,9)/1,1,-1/
      data (rnodtp(3,7,i),i=7,9)/-1,1,-1/,
     1(rnodtp(3,8,i),i=7,9)/-1,-1,-1/
      data (rnodtp(3,9,i),i=7,9)/1,-1,1/, (rnodtp(3,10,i),i=7,9)/1,1,1/
      data (rnodtp(3,11,i),i=7,9)/-1,1,1/,
     1(rnodtp(3,12,i),i=7,9)/-1,-1,1/
      data (rnodtp(3,13,i),i=7,9)/1,-1,-1/,
     1(rnodtp(3,14,i),i=7,9)/1,1,-1/
      data (rnodtp(3,15,i),i=7,9)/-1,1,-1/,
     1(rnodtp(3,16,i),i=7,9)/-1,-1,-1/
      data (rnodtp(3,17,i),i=7,9)/1,-1,1/, (rnodtp(3,18,i),i=7,9)/1,1,1/
      data (rnodtp(3,19,i),i=7,9)/-1,1,1/,
     1(rnodtp(3,20,i),i=7,9)/-1,-1,1/
      data (rnodtp(3,21,i),i=7,9)/1,-1,-1/,
     1(rnodtp(3,22,i),i=7,9)/1,1,-1/
      data (rnodtp(3,23,i),i=7,9)/-1,1,-1/,
     1(rnodtp(3,24,i),i=7,9)/-1,-1,-1/
c
      data (inodtp(3,1,i),i=1,3)/2,1,7/, (inodtp(3,2,i),i=1,2)/1,1/
      data (inodtp(3,3,i),i=1,3)/2,1,7/, (inodtp(3,4,i),i=1,2)/1,7/
      data (inodtp(3,5,i),i=1,2)/1,8/, (inodtp(3,6,i),i=1,3)/2,2,8/
      data (inodtp(3,7,i),i=1,2)/1,9/, (inodtp(3,8,i),i=1,3)/2,6,12/
      data (inodtp(3,9,i),i=1,3)/2,2,8/, (inodtp(3,10,i),i=1,2)/1,2/
      data (inodtp(3,11,i),i=1,3)/2,3,9/, (inodtp(3,12,i),i=1,2)/1,4/
      data (inodtp(3,13,i),i=1,2)/1,12/, (inodtp(3,14,i),i=1,3)/2,3,9/
      data (inodtp(3,15,i),i=1,2)/1,6/, (inodtp(3,16,i),i=1,3)/2,4,10/
      data (inodtp(3,17,i),i=1,3)/2,5,11/, (inodtp(3,18,i),i=1,2)/1,3/
      data (inodtp(3,19,i),i=1,3)/2,4,10/, (inodtp(3,20,i),i=1,2)/1,11/
      data (inodtp(3,21,i),i=1,2)/1,5/, (inodtp(3,22,i),i=1,3)/2,6,12/
      data (inodtp(3,23,i),i=1,2)/1,10/, (inodtp(3,24,i),i=1,3)/2,5,11/
c
      end subroutine initd
c
c****************************************************************
c
c  subroutine initd - initializes the deformation info (preprocessing)
c
c****************************************************************
c
c  subroutine called by
c      readf - reads input files
c
c****************************************************************
c
c  variables used
c      aco    = nodal preprocess variables
c      defx,defy,defz = deformation arrays
c      defs   = defines deformation area
c      lastd  = last deformation defined
c
c****************************************************************
c
      common /defar/ idefd,defs,defx,defy,defz,aco,lastd
      dimension defs(0:3,3,10),defx(0:9,0:9,0:9,10),defy(0:9,0:9,0:9,10)
      dimension aco(13,10),idefd(3,10),defz(0:9,0:9,0:9,10)
c
c  loop thru all deformations
c
      do 130 k=1,lastd
c
c  nodal preprocess
c
      aco(1,k)=(defs(2,2,k)-defs(0,2,k))*(defs(3,3,k)-defs(0,3,k))
     1        -(defs(2,3,k)-defs(0,3,k))*(defs(3,2,k)-defs(0,2,k))
      aco(2,k)=(defs(3,1,k)-defs(0,1,k))*(defs(2,3,k)-defs(0,3,k))
     1        -(defs(2,1,k)-defs(0,1,k))*(defs(3,3,k)-defs(0,3,k))
      aco(3,k)=(defs(2,1,k)-defs(0,1,k))*(defs(3,2,k)-defs(0,2,k))
     1        -(defs(2,2,k)-defs(0,2,k))*(defs(3,1,k)-defs(0,1,k))
      aco(4,k)=(defs(3,2,k)-defs(0,2,k))*(defs(1,3,k)-defs(0,3,k))
     1        -(defs(3,3,k)-defs(0,3,k))*(defs(1,2,k)-defs(0,2,k))
      aco(5,k)=(defs(1,1,k)-defs(0,1,k))*(defs(3,3,k)-defs(0,3,k))
     1        -(defs(1,3,k)-defs(0,3,k))*(defs(3,1,k)-defs(0,1,k))
      aco(6,k)=(defs(3,1,k)-defs(0,1,k))*(defs(1,2,k)-defs(0,2,k))
     1        -(defs(3,2,k)-defs(0,2,k))*(defs(1,1,k)-defs(0,1,k))
      aco(7,k)=(defs(1,2,k)-defs(0,2,k))*(defs(2,3,k)-defs(0,3,k))
     1        -(defs(1,3,k)-defs(0,3,k))*(defs(2,2,k)-defs(0,2,k))
      aco(8,k)=(defs(1,3,k)-defs(0,3,k))*(defs(2,1,k)-defs(0,1,k))
     1        -(defs(1,1,k)-defs(0,1,k))*(defs(2,3,k)-defs(0,3,k))
      aco(9,k)=(defs(1,1,k)-defs(0,1,k))*(defs(2,2,k)-defs(0,2,k))
     1        -(defs(1,2,k)-defs(0,2,k))*(defs(2,1,k)-defs(0,1,k))
      aco(10,k)=(defs(2,1,k)-defs(0,1,k))*aco(4,k)+(defs(2,2,k)-
     1         defs(0,2,k))*aco(5,k)+(defs(2,3,k)-defs(0,3,k))*aco(6,k)
      aco(11,k)=defs(0,1,k)*aco(1,k)+defs(0,2,k)*aco(2,k)
     1         +defs(0,3,k)*aco(3,k)
      aco(12,k)=defs(0,1,k)*aco(4,k)+defs(0,2,k)*aco(5,k)
     1         +defs(0,3,k)*aco(6,k)
      aco(13,k)=defs(0,1,k)*aco(7,k)+defs(0,2,k)*aco(8,k)
```

```fortran
    1                           +defs(0,3,k)*aco(9,k)
c
c   convert defx, defy and defz arrays from standard to bernstein
c
      nx=idefd(1,k)
      ny=idefd(2,k)
      nz=idefd(3,k)
c
      do 40 ix=0,nx
         do 30 iy=0,ny
            do 20 i=1,nz
               do 10 j=0,i-1
                  defx(ix,iy,i,k)=defx(ix,iy,i,k)-bc(i,j)*defx(ix,iy,j,k)
    1                           /bc(nz,j)
                  defy(ix,iy,i,k)=defy(ix,iy,i,k)-bc(i,j)*defy(ix,iy,j,k)
    1                           /bc(nz,j)
                  defz(ix,iy,i,k)=defz(ix,iy,i,k)-bc(i,j)*defz(ix,iy,j,k)
    1                           /bc(nz,j)
   10          continue
               defx(ix,iy,i,k)=defx(ix,iy,i,k)*bc(nz,i)
               defy(ix,iy,i,k)=defy(ix,iy,i,k)*bc(nz,i)
               defz(ix,iy,i,k)=defz(ix,iy,i,k)*bc(nz,i)
   20       continue
   30    continue
   40 continue
c
      do 80 ix=0,nx
         do 70 iz=0,nz
            do 60 i=1,ny
               do 50 j=0,i-1
                  defx(ix,i,iz,k)=defx(ix,i,iz,k)-bc(i,j)*defx(ix,j,iz,k)
    1                           /bc(ny,j)
                  defy(ix,i,iz,k)=defy(ix,i,iz,k)-bc(i,j)*defy(ix,j,iz,k)
    1                           /bc(ny,j)
                  defz(ix,i,iz,k)=defz(ix,i,iz,k)-bc(i,j)*defz(ix,j,iz,k)
    1                           /bc(ny,j)
   50          continue
               defx(ix,i,iz,k)=defx(ix,i,iz,k)*bc(ny,i)
               defy(ix,i,iz,k)=defy(ix,i,iz,k)*bc(ny,i)
               defz(ix,i,iz,k)=defz(ix,i,iz,k)*bc(ny,i)
   60       continue
   70    continue
   80 continue
c
      do 120 iy=0,ny
         do 110 iz=0,nz
            do 100 i=1,nx
               do 90 j=0,i-1
                  defx(i,iy,iz,k)=defx(i,iy,iz,k)-bc(i,j)*defx(j,iy,iz,k)
    1                           /bc(nx,j)
                  defy(i,iy,iz,k)=defy(i,iy,iz,k)-bc(i,j)*defy(j,iy,iz,k)
    1.                          /bc(nx,j)
                  defz(i,iy,iz,k)=defz(i,iy,iz,k)-bc(i,j)*defz(j,iy,iz,k)
    1                           /bc(nx,j)
   90          continue
               defx(i,iy,iz,k)=defx(i,iy,iz,k)*bc(nx,i)
               defy(i,iy,iz,k)=defy(i,iy,iz,k)*bc(nx,i)
               defz(i,iy,iz,k)=defz(i,iy,iz,k)*bc(nx,i)
  100       continue
  110    continue
  120 continue
c
  130 continue
c
      return
      end
c
      function bc(i,j)
c
c****************************************************************
c
c   function bc - returns the binomial coefficient
c
c****************************************************************
c
      rnum=i
      b=1.0
      den=1.0
      do 10 k=0,j
         btmp=b
         b=b*rnum/den
         rnum=rnum-1.0
         den=den+1.0
   10 continue
      bc=btmp
c
      return
      end
```

```
      subroutine initds(ierro)
c
c*****************************************************************
c
c  subroutine initds - initializes solidview parameters
c
c*****************************************************************
c
c  subroutine called by:
c      main
c
c*****************************************************************
c
c  subprograms called:
c      dsbloc  - Lexidata library routine to send block information
c      dschan  - Lexidata library routine to define write channels
c      dsopn   - Lexidata library routine to open a channel to device
c      dspld   - Lexidata library routine to load and start software
c      ldlut   - load lookup table
c
c*****************************************************************
c
c  variables used
c      ierro = 0 if no error occurred in opening channel to the Lexidata
c
c*****************************************************************
c
      common /devi/ input,output
      common /hidm/ solid
      common /line/ sview,tekt,linec
      common /solres/ kxmax,kymax,kzmax,kxmin,kymin,kzmin
      dimension buff(8)
      integer*2 buff,buffl
      integer output
      logical solid,sview,tekt
      data buff/57,16,0,4095,0,0,0,0/,buffl/8/
c
c  open channel to lexidata
c
      ierro=0
c*****************************************************************
c  dsopn is a host dependent routine                              *
c                                                                 *
      call dsopn(ierr,ichan)
c                                                                 *
c*****************************************************************
      if(ierr.ne.0) then
        write(output,100)
        ierro=1
        return
      end if
c
c  clear channels to solidview
c
c*****************************************************************
c  dspld is a host dependent routine                              *
c                                                                 *
      call dspld(-1)
c                                                                 *
c*****************************************************************
      call dschan(-1,-1,-1)
      call dsbloc(buff,buffl)
c
c  load lookup table
c
      call ldlut
c
c  set default resolution boundaries and hidden surface method
c
      kxmax=639
      kymax=511
      kzmax=4095
      kxmin=0
      kymin=0
      kzmin=0
      solid=.true.
      sview=.false.
      tekt=.false.
c
      return
c
 100  format(' <Error in opening channel to Lexidata>')
      end
      subroutine initlc
c
c*****************************************************************
c
c  subroutine initlc - initializes the light and color parameters
c                      and adaptive subdivision parameters
c
c*****************************************************************
c
```

```
c   subroutine called by
c      main
c
c****************************************************************
c
c   variables used
c      bgr,bgg,bgb = RGB components of the background color
c      col   = RGB color info array
c      diff  = diffuse light component
c      facn  = normal factor - minimum cosine between two normals
c      hexp  = highlight exponent
c      high  = logical, true if highlights are to be calculated
c      hx,hy,hz = highlight source direction
c      icmax = points to which RGB component is the highest intensity
c      isfac = screen factor - largest difference in pixels
c      minsub = minimum number of subdivisions (a neg. value - it
c               is the absolute number of subdivisions)
c      ncol  = number of colors
c      xli,yli,zli = light source direction
c
c****************************************************************
c
      common /adapt/ facn,isfac,minsub
      common /lights/ xli,yli,zli,hx,hy,hz
      common /ccomp/ diff,hexp,high,col,icmax,ncol
      common /bgrdc/ bgr,bgg,bgb
      dimension col(10,3),icmax(10)
      logical high
c
c   set default adaptive subdivision parameters
c
      minsub=-2
      facn=0.7
      isfac=50
c
c   set default light source
c
      xli=0.0
      yli=0.0
      zli=1.0
      hx=0.0
      hy=0.0
      hz=1.0
c
c   set diffuse default and highlight defaults
c
      diff=0.25
      hexp=10.0
      high=.true.
c
c   define default color information
c
      bgr=0.07
      bgg=0.5
      bgb=1.0
      ncol=1
      col(1,1)=0.7
      col(1,2)=0.7
      col(1,3)=0.7
      icmax(1)=1
c
      return
      end
      subroutine initp
c
c****************************************************************
c
c   subroutine initp - initialize primitives
c
c****************************************************************
c
c   subroutine called by
c      main
c
c****************************************************************
c
c   variables used
c      itritp = initial triangle info for each primitive
c      rnodtp = initial node info for each primitive
c
c****************************************************************
c
      common /initpr/ itritp,rnodtp,ilmpr,inodtp
      dimension itritp(3,12,7),rnodtp(3,24,9),ilmpr(3,2),inodtp(3,24,7)
c
c   sphere primitive
c
      do 10 i=1,8
         call sphnod(rnodtp(1,i,1),rnodtp(1,i,2),rnodtp(1,i,3),
     1        rnodtp(1,i,7),rnodtp(1,i,8),rnodtp(1,i,9))
   10 continue
c
```

```
c   cylinder primitive
c
      do 20 i=1,16
        call cylnod(rnodtp(2,i,1),rnodtp(2,i,2),rnodtp(2,i,3),
     1       rnodtp(2,i,7),rnodtp(2,i,8),rnodtp(2,i,9))
 20   continue
c
c   redo normals for multiple nodes on top and bottom edge
c
c     do 30 i=9,16
c        rnodtp(2,i,4)=0.0
c        rnodtp(2,i,5)=rnodtp(2,i,8)
c        rnodtp(2,i,6)=0.0
c 30  continue
c
c   (Note: cube is all defined in block data)
c
      return
      end subroutine initv
c
c*******************************************************************
c
c   subroutine initv - initializes the viewing parameters
c
c*******************************************************************
c
c   subroutine called by
c      main
c
c*******************************************************************
c
c   subroutines called
c      scalef - sets the scale factors for sreen conversion
c      viewtr - sets up the viewing transformation 4X4
c
c*******************************************************************
c
c   variables used
c      xa,ya,za = look at location
c      xe,ye,ze = look from location
c      aax = horizontal aperature angle
c      aay = vertical aperature angle
c      ivf = 0 for orthogonal; = 1 for perspective projection
c      nxl = X screen coordinate of left side of viewport
c      nxr = X screen coordinate of right side of viewport
c      nyb = Y screen coordinate of bottom of viewport
c      nyt = Y screen coordinate of top of viewport
c      xc1 = X coordinate of lower left window corner
c      xc2 = X coordinate of upper right window corner
c      yc1 = Y coordinate of lower left window corner
c      yc2 = Y coordinate of upper right window corner
c      zf  = front clipping plane
c      zb  = back clipping plane
c
c*******************************************************************
c
      common /view/ nxl,nxr,nyb,nyt,zf,zb,ivf,vmat
      common /wind/ xe,ye,ze,xa,ya,za,xc1,yc1,xc2,yc2,aax,aay
      dimension vmat(4,4)
c
c  initialize screen space (viewport)
c  and Z values for front and back clipping planes
c
      nxl=64
      nxr=575
      nyb=511
      nyt=0
      zf=0.5
      zb=400
c
c  initialize look at and look from
c
      xa=0.
      ya=0.
      za=0.
      xe=0.
      ye=0.
      ze=200.
c
c  set perspective angles for perspective viewing
c  and define window for orthogonal viewing
c
      aax=26.56
      aay=26.56
      xc1=-100.
      xc2=100.
      yc1=-100.
      yc2=100.
c
```

```
c   initialize viewing 4X4, set viewing to orthogonal and
c   set viewing scale factors
c
      call viewtr
      ivf=0
      call scalef
c
      return
      end subroutine inqv
c
c*********************************************************************
c
c   subroutine inqv - prints the 3D viewing parameters
c
c*********************************************************************
c
c   subroutine called by
c      window - controls selection of 3D viewing parameters
c
c*********************************************************************
c
c   variables used
c      xa,ya,za = look from position
c      xe,ye,ze = look at position
c      aax = horizontal aperature angle
c      aay = vertical aperature angle
c      ivf = 0 for orthogonal; = 1 for perspective projection
c      nxl = X screen coordinate of left side of viewport
c      nxr = X screen coordinate of right side of viewport
c      nyb = Y screen coordinate of bottom of viewport
c      nyt = Y screen coordinate of top of viewport
c      xc1 = X coordinate of lower left window corner
c      xc2 = X coordinate of upper right window corner
c      yc1 = Y coordinate of lower left window corner
c      yc2 = Y coordinate of upper right window corner
c      zf  = front clipping plane
c      zb  = back clipping plane
c
c*********************************************************************
c
      common /devi/ input,output
      common /view/ nxl,nxr,nyb,nyt,zf,zb,ivf,vmat
      common /wind/ xe,ye,ze,xa,ya,za,xc1,yc1,xc2,yc2,aax,aay
      dimension vmat(4,4)
      integer output
c
      write(output,80) xe,ye,ze,xa,ya,za
      write(output,90) nxl,nyb,nxr,nyt
      write(output,95) zf,zb
      if(ivf.eq.0)then
        write(output,105)
        write(output,100) xc1,xc2,yc1,yc2
      end if
      if(ivf.eq.1)then
        write(output,110)
        write(output,115) aax,aay
      end if
c
 80   format('<Look from: X=',f7.2,' Y=',f7.2,' Z=',f7.2,/,
     1'     look at: X=',f7.2,' Y=',f7.2,' Z=',f7.2,'>')
 90   format('<Viewport screen space: lower left corner= ',2i4,/,
     1'      -              upper right corner=',2i4,'>')
 95   format('<Z clipping planes: min=',f7.2,' max=',f8.2,'>',/)
 100  format('<Window: ',f6.1,' > X >',f6.1,', ',f6.1,' > Y >',f6.1,'>')
 105  format('<Orthogonal projection>')
 110  format('<Perspective projection>')
 115  format('<Aperature angle: horiz.=',f6.3,' vert.=',f6.3,'>')
c
      return
      end subroutine ldlut
c
c*********************************************************************
c
c   subroutine ldlut - loads the Lexidata lookup table
c
c*********************************************************************
c
c   subroutine called by
c      initds - initializes display
c
c*********************************************************************
c
c   subprograms called
c      dsllu - Lexidata library routine that loads lookup table ramps
c
c*********************************************************************
```

```
c
c  variables used
c      ib     = relative blue address in lut
c      ig     = relative green address in lut
c      ir     = relative red address in lut
c      intval = maximum usable intensity value for lut
c               (255 for 8-out lut, 15 for 4-out lut)
c      lutmax = maximum number of relative lut addresses
c      rinc   = increment for lut intensity value
c
c***********************************************************************
c
c  set display variables for 12 bit frame buffer
c
      lutmax=4096
      intval=255
      ldiv=256
      lsdiv=16
c
c  reserve first location for background (increment ir,ig,ib by 1)
c
      ir=lutmax+1
      ig=2*lutmax+1
      ib=3*lutmax+1
      rinc=(intval/(lsdiv-1.0))
c
c  load red table first
c
      ist=0
      rinct=0.0
      do 10 i=1,lsdiv
        if(i.eq.1)then
          call dsllu(ir,ist,ir+ldiv-2,ist)
          ir=ir+ldiv-1
        else
          call dsllu(ir,ist,ir+ldiv-1,ist)
          ir=ir+ldiv
        end if
        rinct=rinct+rinc
        ist=int(rinct+0.5)
  10  continue
c
c  load green table next
c
      do 30 i=1,lsdiv
        ist=0
        rinct=0.0
        do 20 j=1,lsdiv
          if(i.eq.1.and.j.eq.1)then
            call dsllu(ig,ist,ig+lsdiv-2,ist)
            ig=ig+lsdiv-1
          else
            call dsllu(ig,ist,ig+lsdiv-1,ist)
            ig=ig+lsdiv
          end if
          rinct=rinct+rinc
          ist=int(rinct+0.5)
  20    continue
  30  continue
c
c  finally loading blue table
c
      do 40 i=1,ldiv
        if(i.eq.1)then
          call dsllu(ib,0,ib+lsdiv-2,intval)
          ib=ib+lsdiv-1
        else
          call dsllu(ib,0,ib+lsdiv-1,intval)
          ib=ib+lsdiv
        end if
  40  continue
c
      return
      end
      subroutine maket(itn,tmat)
c
c***********************************************************************
c
c  subroutine maket - makes transformation matrices
c
c***********************************************************************
c
c  subroutine called by
c     readf - reads input files
c
c***********************************************************************
c
c  subroutines called
c     readin - analyzes user input
c
c***********************************************************************
c
c  variables used
```

```
c
c*****************************************************************
c      itn  = transformation number
c      tmat = transformation matrix
c
       common /devi/ input,output
       common /enter/ n1,n2,key,xnum,k1,k2
       common /text0/ nchar
       dimension key(10),xnum(40),ivrd(24)
       dimension tmat(4,4)
       character*1 ivrd
       integer output
       data ivrd/'T','R','A','N',  'S','C','A','L',  'R','O','T','A',
      1'X','*','*','*', 'Y','*','*','*',  'Z','*','*','*'/
       data pie/3.141592654/
       nv=24
c
c  write transformation number and initialize matrix
c
       write(output,340) itn
       do 20 i=1,4
          do 10 j=1,4
             tmat(i,j)=0.0
10        continue
20     continue
       tmat(1,1)=1.0
       tmat(2,2)=1.0
       tmat(3,3)=1.0
       tmat(4,4)=1.0
c
c  prompt for kind of transformation (translate, scale or rotate)
c
30     continue
       write(output,300)
       n1=1
       n2=0
       call readin(ivrd,nv)
       if(nchar.eq.0) go to 30
       lit=(key(1)+3)/4
c
c  lit=1   tran      lit=2    scal      lit=3    rota
c
       goto(40,60,80),lit
       go to 30
c
c  translate command
c
40     continue
       write(output,310)
       n1=0
       n2=1
       call readin(ivrd,nv)
       if (k2.ne.0) then
          tmat(4,1)=xnum(1)
          tmat(4,2)=xnum(2)
          tmat(4,3)=xnum(3)
       end if
       return
c
c  scale command
c
60     continue
       write(output,320)
       n1=0
       n2=1
       call readin(ivrd,nv)
       if (k2.ne.0) then
          tmat(1,1)=xnum(1)
          tmat(2,2)=xnum(2)
          tmat(3,3)=xnum(3)
       end if
       return
c
c  rotate command
c
80     continue
       write(output,330)
       n1=1
       n2=1
       call readin(ivrd,nv)
       if ((nchar.ne.0).and.(k2.ne.0)) then
          lit=((key(1)+3)/4)-3
          degr=(xnum(1)*pie)/180.0
          sia=sin(degr)
          coa=cos(degr)
          if (lit.eq.1) then
             tmat(2,2)=coa
             tmat(2,3)=sia
             tmat(3,2)=-sia
             tmat(3,3)=coa
          else if (lit.eq.2) then
```

```
            tmat(1,1)=coa
            tmat(1,3)=-sia
            tmat(3,1)=sia
            tmat(3,3)=coa
         else if (lit.eq.3) then
            tmat(1,1)=coa
            tmat(1,2)=sia
            tmat(2,1)=-sia
            tmat(2,2)=coa
         end if
      end if
c
      return
300   format('<TRANslate, SCALe or ROTAte> ',@)
310   format('<Enter translation values X,Y,Z> ',@)
320   format('<Enter scaling factors X,Y,Z> ',@)
330   format('<Enter axis and angle of rotation> ',@)
340   format('<Transformation number ',i2,'>')
      end
      subroutine ortsc(x,y,z,ix,iy,iz)
c
c***************************************************************
c
c  subroutine  ortsc - converts to screen coord of orthogonal projection
c
c***************************************************************
c
c  subroutine called by
c     prim - processes a primitive
c
c***************************************************************
c
c  variables used
c     kzmax = maximum Z screen resolution
c     x,y,z = coordinate to be converted to screen coordinate
c     ix,iy,iz = converted coordinate
c
c***************************************************************
c
      common /hidm/ solid
      common /view/ nxl,nxr,nyb,nyt,zf,zb,ivf,vmat
      common /scalf/ sf0,sf1,sf2,sf3,sf4,sf5,sf6,sf7,sf8,sf9,sf10,sf11
      common /solres/ kxmax,kymax,kzmax,kxmin,kymin,kzmin
      dimension vmat(4,4)
      logical solid
c
      ix=nint(sf4*x+sf6)
      iy=nint(sf5*y+sf7)
      if (solid) then
         iz=nint(kzmax-sf3*(z-zf))
      else
         iz=nint(sf3*(z-zf))
      end if
c
      return
      end
      subroutine persc(x,y,z,ix,iy,iz)
c
c***************************************************************
c
c  subroutine  persc - performs perspective transformation and converts
c                      to screen coordinates
c
c***************************************************************
c
c  subroutine called by
c     prim   processes a primitive
c
c***************************************************************
c
c  variables used
c     kzmax = maximum Z screen resolution
c     x,y,z = coordinate to be transformed and converted
c     ix,iy,iz = transformed and converted coordinate
c
c***************************************************************
c
      common /hidm/ solid
      common /view/ nxl,nxr,nyb,nyt,zf,zb,ivf,vmat
      common /scalf/ sf0,sf1,sf2,sf3,sf4,sf5,sf6,sf7,sf8,sf9,sf10,sf11
      common /solres/ kxmax,kymax,kzmax,kxmin,kymin,kzmin
      dimension vmat(4,4)
      logical solid
c
c  perform perspective transformation
c
      z1=(z-zf)/(sf0*z)
      x1=x/(sf1*z)
      y1=y/(sf2*z)
c
```

```
c    convert to screen coordinates
c
        ix=nint(sf8*x1+sf10)
        iy=nint(sf9*y1+sf11)
        if (solid) then
          iz=nint(kzmax*(1-z1))
        else
          iz=nint(kzmax*z1)
        end if
c
        return
        end subroutine polout(iflag,it)
c
c***********************************************************
c
c    subroutine polout    performs trivial acceptance or rejection of
c                         polygons and processes polygons that need clipping
c
c***********************************************************
c
c    subroutine called by:
c        prim   processes each primitive
c
c***********************************************************
c
c    subprograms called:
c        clipeg - clips polygons one plane at a time
c        polvie   outputs polygons to display
c
c***********************************************************
c
c    variables used:
c        it      = triangle number
c        iflag   = 0 for smooth shading, 1 for flat
c        kxmax   = maximum x screen coordinate
c        kymax   = maximum y screen coordinate
c        kzmax   = maximum z screen coordinate
c        maxx    = maximum x coordinate of polygon
c        maxy    = maximum y coordinate of polygon
c        maxz    = maximum z coordinate of polygon
c        minx    = minimum x coordinate of polygon
c        miny    = minimum y coordinate of polygon
c        minz    = minimum z coordinate of polygon
c
c***********************************************************
c
        common /solres/ kxmax,kymax,kzmax,kxmin,kymin,kzmin
        common /ntriar/ itriar,rnodes,node,trind
        dimension itriar(8000,10),rnodes(8000,9),node(8000,13),
     1  trind(8000,3)
        dimension iver(24),ivern(24)
        logical nsnip
c
c    return if bad normal
c
        if (trind(it,1).gt.99.0) return
c
        nov=3
        iver(1)=node(itriar(it,1),11)
        iver(2)=node(itriar(it,1),12)
        iver(3)=node(itriar(it,1),13)
        iver(4)=node(itriar(it,2),11)
        iver(5)=node(itriar(it,2),12)
        iver(6)=node(itriar(it,2),13)
        iver(7)=node(itriar(it,3),11)
        iver(8)=node(itriar(it,3),12)
        iver(9)=node(itriar(it,3),13)
c
c    find max/min
c
        maxx=max(iver(1),iver(4),iver(7))
        minx=min(iver(1),iver(4),iver(7))
        maxy=max(iver(2),iver(5),iver(8))
        miny=min(iver(2),iver(5),iver(8))
        maxz=max(iver(3),iver(6),iver(9))
        minz=min(iver(3),iver(6),iver(9))
c
c    trivial acceptance
c
        if(minx.ge.kxmin.and.maxx.le.kxmax.and.
     1     miny.ge.kymin.and.maxy.le.kymax.and.
     2     minz.ge.kzmin.and.maxz.le.kzmax) then
          nsnip=.true.
          call polvie(nov,iver,it,nsnip,iflag)
          return
        end if
c
c    trivial rejection
c
```

```
      if(minx.lt.kxmin.and.maxx.lt.kxmin.or.
     1    minx.gt.kxmax.and.maxx.gt.kxmax.or.
     2    miny.lt.kymin.and.maxy.lt.kymin.or.
     3    miny.gt.kymax.and.maxy.gt.kymax.or.
     4    minz.lt.kzmin.and.maxz.lt.kzmin.or.
     5    minz.gt.kzmax.and.maxz.gt.kzmax) return
c
c  sutherland-hodgman polygon clipping
c
      call clipeg(nov,iver,novn,ivern)
      if (novn.eq.0) return
      nsnip=.false.
      call polvie(novn,ivern,it,nsnip,iflag)
c
      return
      end
      subroutine polvie(nover,iver,it,nsnip,iflag)
c
c***************************************************************
c
c  subroutine polvie - outputs polgons
c
c***************************************************************
c
c  subroutine called by:
c     polout - performs trivial acceptance or rejection of polygons
c
c***************************************************************
c
c  subprograms called:
c     dsbloc - Lexidata library routine
c     packer - packs data for Watkins hidden
c
c***************************************************************
c
c  variables used:
c     it     = triangle number
c     iver   = array of polygon vertex information
c     noprim = primitive number
c     nover  = number of polygon vertices
c
c***************************************************************
c
      common /csgkey/ ikey,ikeyno,noprim
      common /hidm/ solid
      common /line/ sview,tekt,linec
      common /ntriar/ itriar,rnodes,node,trind
      common /polyc/ ipc
      dimension itriar(8000,10),rnodes(8000,9),node(8000,13),
     1 trind(8000,3)
      dimension ikey(100,3)
      dimension iver(24),buf(27),buf2(8)
      integer*2 buf1,buf,buf12,buf2
      logical nsnip,solid,sview,tekt
      data buf(1)/62/,buf12/8/,buf2(1)/64/
c
c  next statement performs a poor mans hidden (fast)
c
      if (trind(it,3).lt.0) return
c
c  Solidview output
c
      if (solid) then
        if (sview) then
          buf2(5)=linec
          do 10 i=1,nover
            j=(i-1)*3
            if (i.eq.nover) then
              k=0
            else
              k=i*3
            end if
          buf2(2)=iver(j+1)
          buf2(3)=iver(j+2)
          buf2(4)=iver(j+3)
          buf2(6)=iver(k+1)
          buf2(7)=iver(k+2)
          buf2(8)=iver(k+3)
          call dsbloc(buf2,buf12)
10      continue
        else if (tekt) then
          ix1=nint((real(iver(1))/639.0)*974.0)+25
          iy1=nint((1.0-(real(iver(2))/511.0))*779.0)
          call movabs(ix1,iy1)
          do 20 i=1,nover-1
            j=i*3
            ix2=nint((real(iver(j+1))/639.0)*974.0)+25
            iy2=nint((1.0-(real(iver(j+2))/511.0))*779.0)
            call drwabs(ix2,iy2)
20        continue
          call drwabs(ix1,iy1)
        else
```

```
              bufl=nover*3+3
              buf(2)=itriar(it,8)
              buf(3)=nover
              do 30 i=1,nover
                j=3*i
                k=(i-1)*3
                buf(j+1)=iver(k+1)
                buf(j+2)=iver(k+2)
                buf(j+3)=iver(k+3)
 30           continue
              call dsbloc(buf,bufl)
            end if
c
c  Watkins hidden output
c
          else
            ip=noprim
c
c  smooth and not clipped
c
            if ((nsmip).and.(iflag.eq.0)) then
              if ((node(itriar(it,1),10).eq.-1).or.
     1            (node(itriar(it,2),10).eq.-1).or.
     2            (node(itriar(it,3),10).eq.-1)) return
              ipc=ipc+1
              do 40 i=1,3
                j=(i-1)*3
                if (i.eq.3) then
                  iend=0
                else
                  iend=i*3
                end if
                k=iend
                if (iver(j+2).lt.iver(k+2)) then
                  k=j
                  j=iend end if
                iy=iver(j+2)+1
                idy=iver(j+2)-iver(k+2)
                ix1=iver(j+1)
                ix2=iver(k+1)
                iz1=iver(j+3)
                iz2=iver(k+3)
                ic1=node(itriar(it,(j/3+1)),10)
                ic2=node(itriar(it,(k/3+1)),10)
                call packer(iy,idy,ix1,ix2,iz1,iz2,ic1,ic2,ipc,ip)
 40           continue
c
c  clipped and/or flat chosen
c
            else
              if (iflag.eq.0) then
                if (node(itriar(it,1),10).eq.-1) return
c
c  pick color of first node for entire polygon (smooth & clipped)
c
                icol=node(itriar(it,1),10)
              else
                icol=itriar(it,8)
              end if
              ipc=ipc+1
              do 50 i=1,nover
                j=(i-1)*3
                if (i.eq.nover) then
                  iend=0
                else
                  iend=i*3
                end if
                k=iend
                if (iver(j+2).lt.iver(k+2)) then
                  k=j
                  j=iend
                end if
                iy=iver(j+2)+1
                idy=iver(j+2)-iver(k+2)
                ix1=iver(j+1)
                ix2=iver(k+1)
                iz1=iver(j+3)
                iz2=iver(k+3)
                call packer(iy,idy,ix1,ix2,iz1,iz2,icol,icol,ipc,ip)
 50           continue
            end if
          end if
c
      return
      end
```

```
      subroutine prim(iptr,itree,itop)
c
c***********************************************************************
c
c  subroutine prim - controls the processing of a primitive
c
c***********************************************************************
c
c  subroutine called by
c     tree -
c     up   -
c
c***********************************************************************
c
c  subroutines called
c     appdef - applies deformation to a node
c     calint - calculates color intensities
c     cnorm  - calculates triangle normals
c     ortsc  - calculates orthogonal projection screen coordinates
c     persc  - calculates perspective screen coordinates
c     polout - triangle output for display
c     subadp - performs the adaptive subdivision
c     subdiv - subdivides a triangular element
c     tdord  - finds the order of deformations and transformations
c
c***********************************************************************
c
c  variables used
c     itree  = stack containing tree path from a primitive to the head
c     minsub = minimum number of subdivisions (a neg. value - it
c              is the absolute number of subdivisions)
c     tnode  = array containing all the nodal info of the CSG tree
c
c***********************************************************************
c
      common /adapt/  facn,isfac,minsub
      common /csgkey/ ikey,ikeyno,noprim
      common /initpr/ itritp,rnodtp,ilmpr,inodtp
      common /latest/ lastel,lastno
      common /ntriar/ itriar,rnodes,node,trind
      common /tnodes/ tnode,nend,nhead
      common /tranar/ tran,lastt
      common /view/   nxl,nxr,nyb,nyt,zf,zb,ivf,vmat
      integer tnode(118)
      dimension ikey(100,3)
      dimension vmat(4,4)
      dimension tran(4,4,12)
      dimension itree(10,2),ntord(20)
      dimension itritp(3,12,7),rnodtp(3,24,9),ilmpr(3,2),inodtp(3,24,7)
      dimension itriar(8000,10),rnodes(8000,9),node(8000,13),
     1 trind(8000,3)
c
c     if ((noprim.eq.2).or.(noprim.eq.9)) then
c        minsub=4
c        isfac=25
c        facn=0
c     else if ((noprim.eq.8).or.(noprim.eq.15)) then
c        minsub=1
c        isfac=60
c        facn=.85
c     else if ((noprim.eq.5).or.(noprim.eq.12)) then
c        minsub=1
c        isfac=18
c        facn=0
c     else if (noprim.eq.1) then
c        minsub=1
c        isfac=80
c        facn=.975
c     else if ((noprim.eq.3).or.(noprim.eq.6).or.(noprim.eq.10)
c    1          .or.(noprim.eq.13)) then
c        minsub=1
c        isfac=200
c        facn=.9
c     else if ((noprim.eq.4).or.(noprim.eq.7).or.(noprim.eq.11)
c    1          .or.(noprim.eq.14)) then
c        minsub=1
c        isfac=23
c        facn=0
c     end if
c
c  find order of deformations and transformations
c
      call tdord(iptr,itree,itop,ntord,nlim)
c
c  load in basic primitive definition
c
      iprim=abs(tnode(iptr))
      lastno=ilmpr(iprim,2)
```

```
          lastel=ilmpr(iprim,1)
          do 20 i=1,lastel
            do 10 j=1,7
              itriar(i,j)=itritp(iprim,i,j)
 10       continue
 20       continue
          do 40 i=1,lastno
            rnodes(i,1)=rnodtp(iprim,i,1)
            rnodes(i,2)=rnodtp(iprim,i,2)
            rnodes(i,3)=rnodtp(iprim,i,3)
            rnodes(i,7)=rnodtp(iprim,i,7)
            rnodes(i,8)=rnodtp(iprim,i,8)
            rnodes(i,9)=rnodtp(iprim,i,9)
            node(i,1)=inodtp(iprim,i,1)
            do 30 j=2,node(i,1)+1
              node(i,j)=inodtp(iprim,i,j)
 30         continue
 40       continue
c
c   subdivide the primitive according to minimum
c
          do 60 j=1,abs(minsub)
            numofs=lastel/2
            do 50 i=1,numofs
              call subdiv(i,iprim)
 50         continue
 60       continue
c
c   pass all nodes thru transformations and deformations
c
          do 80 i=1,lastno
            do 70 j=1,nlim
              num=ntord(j)
              if (num.gt.0) then
                rx=rnodes(i,1)
                ry=rnodes(i,2)
                rz=rnodes(i,3)
                rnodes(i,1)=tran(1,1,num)*rx+tran(2,1,num)*ry+tran(3,1,num)
     1                      *rz+tran(4,1,num)
                rnodes(i,2)=tran(1,2,num)*rx+tran(2,2,num)*ry+tran(3,2,num)
     1                      *rz+tran(4,2,num)
                rnodes(i,3)=tran(1,3,num)*rx+tran(2,3,num)*ry+tran(3,3,num)
     1                      *rz+tran(4,3,num)
              else
                call appdef(rnodes(i,1),rnodes(i,2),rnodes(i,3),num)
              end if
 70         continue
 80       continue
c
c   convert to screen space
c
          if (ivf.eq.0) then
            do 90 i=1,lastno
              call ortsc(rnodes(i,1),rnodes(i,2),rnodes(i,3),node(i,11),
     1                   node(i,12),node(i,13))
 90         continue
          else
            do 100 i=1,lastno
              call persc(rnodes(i,1),rnodes(i,2),rnodes(i,3),node(i,11),
     1                   node(i,12),node(i,13))
 100        continue
          end if
c
c   find all triangle normals and delta X and Y screen coord.
c
          do 110 i=1,lastel
            call cnorm(i)
            is1x=abs(node(itriar(i,1),11)-node(itriar(i,2),11))
            is2x=abs(node(itriar(i,2),11)-node(itriar(i,3),11))
            is3x=abs(node(itriar(i,3),11)-node(itriar(i,1),11))
            itriar(i,9)=max(is1x,is2x,is3x)
            is1y=abs(node(itriar(i,1),12)-node(itriar(i,2),12))
            is2y=abs(node(itriar(i,2),12)-node(itriar(i,3),12))
            is3y=abs(node(itriar(i,3),12)-node(itriar(i,1),12))
            itriar(i,10)=max(is1y,is2y,is3y)
 110      continue
c
c   adaptive subdivision
c
          if (minsub.ge.0) call subadp(iprim,nlim,ntord)
c
c   calculate color for each node (smooth) or triangle (flat)
c
          icol=tnode(iptr+1)
          iflag=tnode(iptr+2)
          call calint(icol,iflag)
c
c   out to display
c
          print*,'number of nodes, triangles: ',lastno,lastel
          do 120 i=1,lastel
```

```
      call polout(iflag,i)
120   continue
c
      return
      end
```

Feb 17 16:07 1986 readf.f Page 1

```
      subroutine readf
c
c*****************************************************************
c
c  subroutine readf - reads tree, deform. & transf files
c                     also allows for input of transf files
c
c*****************************************************************
c
c  subroutine called by
c     main
c
c*****************************************************************
c
c  subroutines called
c     maket  - makes the transformation 4X4
c     readin - analyzes user input
c
c*****************************************************************
c
c  variables used
c
c*****************************************************************
c
      common /devi/ input,output
      common /enter/ n1,n2,key,xnum,k1,k2
      common /text0/ nchar
c
      common /tnodes/ tnode,nend,nhead
      common /defar/ idefd,defs,defx,defy,defz,aco,lastd
      common /tranar/ tran,lastt
      dimension defs(0:3,3,10),defx(0:9,0:9,0:9,10),defy(0:9,0:9,0:9,10)
      dimension aco(13,10),idefd(3,10),defz(0:9,0:9,0:9,10)
      dimension tran(4,4,12)
      dimension key(10),xnum(40),ivrd(28)
      dimension temp(4,4)
      integer tnode(118)
      character*1 ivrd
      integer output
      data ivrd/'T','R','E','E',  'T','R','A','N',  'D','E','F','O',
     1'M','A','K','E',  'E','X','I','T',  'A','L','L','#',
     2'H','E','L','P'/
      n=28
      iread=1
      iwrite=-1
c
c  prompt for read option
c
10    continue
      write(output,310)
      n1=1
      n2=0
      call readin(ivrd,n)
      if(nchar.eq.0) go to 290
      lit=(key(1)+3)/4
c
c  lit=1  tree      lit=2  tran      lit=3  defo      lit=4  make
c  lit=5  exit      lit=6  all       lit=7  help
c
      goto(20,50,90,120,299,160,260),lit
      go to 290
c
c  tree option
c
20    continue
      call opnfil('Tree',iunit,iread,ierror)
      if(ierror) 20,290,30
30    continue
      read(iunit,*) nhead
      read(iunit,*) nend
      do 40 i=1,nend
        read(iunit,*) tnode(i)
40    continue
      call clsfil(iunit)
      go to 290
c
c  tran option
c
50    continue
      call opnfil('Tran',iunit,iread,ierror)
      if(ierror) 50,290,60
60    continue
```

```
            read(iunit,*) lastt
            do 80 k=1,lastt
              do 70 i=1,4
                read(iunit,*) (tran(i,j,k),j=1,4)
70            continue
80          continue
            call clsfil(iunit)
            go to 290
c
c   defo option
c
90      continue
        call opnfil('Defo',iunit,iread,ierror)
        if(ierror) 90,290,100
100     continue
        read(iunit,*) lastd
        do 110 l=1,lastd
          read(iunit,*) ((defs(i,j,1),j=1,3),i=0,3)
          read(iunit,*) idefd(1,1),idefd(2,1),idefd(3,1)
          read(iunit,*) (((defx(i,j,k,1),defy(i,j,k,1),defz(i,j,k,1),
     1              i=0,idefd(1,1)),j=0,idefd(2,1)),k=0,idefd(3,1))
110     continue
        call clsfil(iunit)
        go to 290
c
c   make option
c
120     continue
        call opnfil('Tran',iunit,iwrite,ierror)
        if(ierror) 120,290,130
130     continue
        write(output,320)
        n1=0
        n2=1
        call readin(iwrd,n)
        if ((nchar.ne.0).and.(xnum(1).ge.1.0)) then
          lasttt=nint(xnum(1))
          write(iunit,*) lasttt
          do 150 k=1,lasttt
            call maket(k,temp)
            do 140 i=1,4
              write(iunit,*) (temp(i,j),j=1,4)
140         continue
150       continue
        end if
        call clsfil(iunit)
        go to 290
c
c   all option
c
160     continue
        call opnfil('Tree',iunit,iread,ierror)
        if(ierror) 160,190,170
170     continue
        read(iunit,*) nhead
        read(iunit,*) nend
        do 180 i=1,nend
          read(iunit,*) tnode(i)
180     continue
        call clsfil(iunit)
190     continue
        call opnfil('Tran',iunit,iread,ierror)
        if(ierror) 190,230,200
200     continue
        read(iunit,*) lastt
        do 220 k=1,lastt
          do 210 i=1,4
            read(iunit,*) (tran(i,j,k),j=1,4)
210       continue
220     continue
        call clsfil(iunit)
230     continue
        call opnfil('Defo',iunit,iread,ierror)
        if(ierror) 230,290,240
240     continue
        read(iunit,*) lastd
        do 250 l=1,lastd
          read(iunit,*) ((defs(i,j,1),j=1,3),i=0,3)
          read(iunit,*) idefd(1,1),idefd(2,1),idefd(3,1)
          read(iunit,*) (((defx(i,j,k,1),defy(i,j,k,1),defz(i,j,k,1),
     1              i=0,idefd(1,1)),j=0,idefd(2,1)),k=0,idefd(3,1))
250     continue
        call clsfil(iunit)
        go to 290
c
c   help option
c
260     continue
        write(output,330)
c
290     continue
```

```
      go to 10
c
c   exit option
c
  299 continue
c
  310 format('<CSG-READ> ',$)
  320 format('<Enter number of transformation matrices> ',$)
  330 format('<Available commands>',/,
     1'    ALL  - Read in all files (tree, deform. & transf.)',/,
     2'    DEFO - Read in deformation file',/,
     3'    EXIT - Exit READ level.',/,
     4'    MAKE - Create a transformation file',/,
     5'    TRAN - Read in a transformation file',/,
     6'    TREE - Read in a CSG tree file>')
c
      return
      end
```

Dec 20 14:17 1985 aalias.f Page 1

```
      subroutine aalias(x11,s11,dx11,x22,s22,dx22,iy)
c
c***************************************************************
c
c  subroutine aalias - buffers segment information for anti-
c                      aliasing
c
c***************************************************************
c
c  subroutine called by
c     outseg = outputs segments
c
c***************************************************************
c
c  subprograms called
c     balias = anti-aliasing routine
c
c***************************************************************
c
c  variables used
c     dx1    = beginning slope
c     dx1a   = buffered dx1
c     dx2    = ending slope
c     dx2a   = buffered dx2
c     iflag  = 1 if last segment on scan line, otherwise = 0
c     ivbl   = 0 if background segment
c     ivbla  = buffered ivbl
c     iy     = scan line number
c     x1     = beginning sample point
c     x1a    = buffered x1
c     x2     = ending sample point
c     x2a    = buffered x2
c
c***************************************************************
c
      common/asave/x1a,s1a,dx1a,x2a,s2a,dx2a,ivbla
      common/shower/ies,ivbl,color,xleft,xright,shrl,shrr,saml,
     lsamr,rxvalu,rrange,lsterr,jy,icon,shbl,shbr,shgl,shgr
      dimension s1a(3),s2a(3),s1(3),s2(3),s11(3),s22(3)
      logical ies,lsterr
c
      x1=x11
      x2=x22
      dx1=dx11
      dx2=dx22
      do 01 i=1,3
         s1(i)=s11(i)
         s2(i)=s22(i)
   01 continue
      iflag=0
      if(x1.ge.0.0) then
         call balias(x1,s1,dx1,x2,s2,dx2,iy,iflag)
      endif
      if(iflag.eq.0) then
         x1a=x1
         x2a=x2
         dx1a=dx1
         dx2a=dx2
         ivbla=ivbl
         do 10 i=1,3
            s1a(i)=s1(i)
   10       s2a(i)=s2(i)
      endif
      return
      end
```

Dec 21 19:30 1985 balias.f Page 1

```
      subroutine balias(x1,s1,dx1,x2,s2,dx2,iy,iflag)
```

```
c
c****************************************************************
c
c   subroutine balias - anti-aliasing routine
c
c****************************************************************
c
c   subroutine called by
c       aalias = buffers segment information for antialiasing
c
c****************************************************************
c
c   subprograms called
c       srl     = shaded raster line
c
c****************************************************************
c
c   variables used
c       dx1     = beginning slope of right seg
c       dx2     = ending slope of right seg
c       dx1a    = beginning slope of left seg
c       dx2a    = ending slope of left seg
c       ivbl    = 0 if right seg background
c       ivbla   = 0 if left seg background
c       iy      = scan line number
c       s1,s2   = starting and ending color values of right segment
c       s1a,s2a = starting and ending color values of left segment
c       x1      = beginning x value of right seg
c       x2      = ending x value of right seg
c       x1a     = beginning x value of left seg
c       x2a     = ending x value of left seg
c
c****************************************************************
c
        common/asave/ x1a,s1a,dx1a,x2a,s2a,dx2a,ivbla
        common/neyes/ ixres,iyres,delint
        common/shover/ ies,ivbl,color,xleft,xright,shrl,shrr,saml,
     1samr,rxvalu,rrange,lsterr,jy,icon,shbl,shbr,shgl,shgr
        dimension s1(3),s2(3),s1a(3),s2a(3),ds(3)
        logical ies,lsterr
c
c       set flag if last segment on line
c
        if(x2.ge.ixres) then
           iflag=1
           x2=ixres
           if(dx1.eq.0.0) dx1=0.5
        else
           iflag=0
        endif
c
c       check to see that this segment is not pure background
c
        if(.not.(x1.eq.0.and.iflag.eq.1)) then
c
c           get absolute value of the slope between the two segments
c
            ax1=abs(dx1)
c
c           if the right end of the left segment does not equal the
c           left end of the right segment - set it so it does
c
            if((x2a.ne.x1).and.(dx2a.ne.dx1)) then
               x2a=x1
               dx2a=dx1
            endif
c
c           see if the colors vary between the two segments, we don't
c           want to antialias if they do
c
c           also we don't antialias if the slope is near enough to vertical
c
            do 10 i=1,3
 10         ds(i)=abs(s1(i)-s2a(i))
            if((ax1.le..0001).or.((ds(1).le.1.).and.(ds(2).le.1.).and.
     +         (ds(3).le.1.))) then
c
c              simply output the left segment
c
               jvbl=ivbl
               ivbl=ivbla
               call srl(x1a,s1a(1),s1a(3),s1a(2),x2a,s2a(1),s2a(3),
     *                 s2a(2),iy)
               ivbl=jvbl
c
c           if the slope is greater than 45 degrees then we antialias on
c           a pixel basis
c
            elseif(ax1.le.1.0) then
               fracl=mod(x1,1.0)
               fracr=1.0-fracl
```

```
          x2a=int(x1)
          x1=x2a+1.0
          sr=fracl*s2a(1)+fracr*s1(1)
          sg=fracl*s2a(2)+fracr*s1(2)
          sb=fracl*s2a(3)+fracr*s1(3)
c
c     output the left segment modified slightly on the right end x val
c     then output the fuzzed pixel
c
          jvbl=ivbl
          ivbl=ivbla
          call srl(xla,sla(1),sla(3),sla(2),x2a,s2a(1),s2a(3),
     &             s2a(2),iy)
          ivbl=-1
          call srl(x2a,sr,sb,sg,x1,sr,sb,sg,iy)
          ivbl=jvbl
c
c     for slope less than 45 degrees, we must come up with an intermediat
c     fuzzed segment which is usually greater than one pixel
c
Dec 21 19:30 1985  balias.f Page 3 else
          temx2a=int(x1-ax1*.5)
          temx1=int(temx2a+ax1)
          adif=x2a-xla
          if(adif.lt.1.0)adif=1.0
          cdif=x2-x1
          if(cdif.lt.1.0)cdif=1.0
          rsl=(s2a(1)-sla(1))/adif
          gsl=(s2a(2)-sla(2))/adif
          bsl=(s2a(3)-sla(3))/adif
          rsr=(s2(1)-s1(1))/cdif
          gsr=(s2(2)-s1(2))/cdif
          bsr=(s2(3)-s1(3))/cdif
          if(temx2a.gt.xla) then
              fac=ax1*.5
          else
              temx2a=xla
              fac=adif
          endif
          rs=s2a(1)-(fac*rsl)
          gs=s2a(2)-(fac*gsl)
          bs=s2a(3)-(fac*bsl)
c
c     output the shortened left segment, note that color info on
c     right end is modified appropriately for the shortening
c
          if(fac.ne.adif) then
              jvbl=ivbl
              ivbl=ivbla
              call srl(xla,sla(1),sla(3),sla(2),temx2a,rs,bs,gs,iy)
              ivbl=jvbl
          endif
          if(temx1.lt.x2) then
              fac=ax1*.5
          else
              temx1=int(x2)
              fac=cdif
          endif
          rsl=s1(1)+(fac*rsr)
          gsl=s1(2)+(fac*gsr)
          bsl=s1(3)+(fac*bsr)
c
c     output the fuzzed segment
c
          jvbl=ivbl
          ivbl=-1
          if((temx1-temx2a).le.1) then
              tsr=(rs+rsl)/2.
              tsb=(bs+bsl)/2.
              tsg=(gs+gsl)/2.
              call srl(temx2a,tsr,tsb,tsg,temx1,tsr,tsb,tsg,iy)
          else
              call srl(temx2a,rs,bs,gs,temx1,rsl,bsl,gsl,iy)
          endif
          ivbl=jvbl
          x1=temx1
          s1(1)=rsl
          s1(2)=gsl
          s1(3)=bsl
      endif
c
c     if last segment on the line, output the right segment also
c
      endif
      if(iflag.eq.1) then
          call srl(x1,s1(1),s1(3),s1(2),x2,s2(1),s2(3),s2(2),iy)
      endif
      return
      end
```

Dec 20 14:18 1985 errmsg.f Page 1

```fortran
      subroutine errmsg(i,j)
c
c*****************************************************************
c
c  subroutine errmsg - writes error messages to error output device
c
c*****************************************************************
c
c  subroutine called by
c     clip    = does actual clipping of edges against plane
c     edgmak  = stores polygon edges for later processing
c     getblk  = gets fixed length block of free storage
c     getpnt  = provides next available location in free storage list
c     getvar  = gets variable length block of free storage
c     hidden  = determines visible segments
c     insect  = updates and draws intersection lines
c     intclp  = initializes parameters used in hidden algorithm
c     polmak  = begins new polygon in picture
c     polsnp  = clips polygons against viewing window
c
c*****************************************************************
c
c  subprograms called
c     endfrm  = ends frame,returns to alpha-numeric mode
c
c*****************************************************************
c
c  variables used
c     i       = error message number
c     ibad    = error parameter
c     idvice  = display device number (-1 = tektronix)
c     j       = value defined in error message
c
c*****************************************************************
c
      common/devi/ input,output
      common/qforio/contrs,idvice,ibad,shoshr,lblspc
      logical ibad,contrs,shoshr
      integer output
c
      ibad=.true.
c
c     jump to the error string
c
      go to (100,10,100,100,20,30,40,50,60,100,70,80,
     11100,90,95),i
   10 write(output,110)
      go to 100
   20 write(output,120) j
      go to 100
   30 write(output,130)
      go to 100
   40 write(output,140)
      go to 100
   50 write(output,150)
      go to 100
   60 write(output,160)
      go to 100
   70 write(output,170)
      go to 100
   80 write(output,180) j
      go to 100
   90 write(output,190)
      go to 100
   95 write(output,200)
      continue
  100 return
c
  110 format(' <warning: too many polygons>')
  120 format(' <warning: unclosed polygon',i6,'>')
  130 format(' <warning: i need more free>')
  140 format(' <warning: bad resolution>')
  150 format(' <warning: bad intensity>')
  160 format(' <warning: check your data>')
  170 format(' <warning: zmax.le.0 or zmin>')
  180 format(' <warning: edge stack full - polygon',i6,'>')
  190 format(' <warning: too many intersection lines>')
  200 format(' <warning: increase ntmax dimension>')
      end
```

Feb 18 21:14 1986 getblk.f Page 1

```fortran
      subroutine getblk(index)
c
c*****************************************************************
c
c  subroutine getblk - gets fixed length block of free storage
```

```
c
c*********************************************************************
c
c  subroutine called by
c     hidden = determines visible segments
c
c*********************************************************************
c
c  subprograms called
c     errmsg = writes error messages to error output device
c
c*********************************************************************
c
c  variables used
c     ibad   = error parameter
c     ifree  = free storage
c     ifrept = pointer to block of data in free
c     index  = location of storage
c
c*********************************************************************
c
c  variable dimension information for subroutine getblk
c  (7) maxfre = maximum size of free storage
c               dimension ifree(maxfre)
c
c*********************************************************************
c
      common/core/ifrest,len,ifrept
      common/free/ifree
      common/qforio/contrs,idvice,ibad,shoshr,lblspc
      dimension ifree(475006)
      logical ibad,contrs,shoshr
c
      ibad=.false.
      if(ifrept.eq.0)go to 10
c
c     return the pointer to next available segment block
c
      index=ifrept
      ifrept=ifree(ifrept+1)
      return
   10 call errmsg(6,0)
      return
      end
Dec 20 14:18 1985  getvar.f Page 1 subroutine getvar(index,length)
c
c*********************************************************************
c
c  subroutine getvar - gets variable length block of free storage
c
c*********************************************************************
c
c  subroutine called by
c     packer = packs data into storage block for later use by hidden
c
c*********************************************************************
c
c  subprograms called
c     errmsg = writes error messages to error output device
c
c*********************************************************************
c
c  variables used
c     ibad   = error parameter
c     ifrest = pointer to next available location in free
c     index  = location of storage
c     len    = size of free
c     length = size of storage
c
c*********************************************************************
c
      common/core/ifrest,len,ifrept
      common/qforio/contrs,idvice,ibad,shoshr,lblspc
      logical ibad,contrs,shoshr
c
      ibad=.false.
      index=ifrest
c
c     up the next available location in free
c
      ifrest=ifrest+length
c
c     go home if there is still room left
c
      if(ifrest.lt.len)return
      call errmsg(6,0)
      return
      end
```

```
      subroutine hidden
c
c****************************************************************
c
c  subroutine hidden - determines visible segments and sends them to
c      shading routines
c
c****************************************************************
c
c  subroutine called by
c
c****************************************************************
c
c  subprograms called
c     getblk = gets fixed length block of free storage
c     retblk = returns fixed length block to free storage
c     shov   = evaluates shading information for visible segments
c     unpack = performs the reverse of packer
c
c****************************************************************
c
c  varibles
c     backw  = logical to indicate whether to search backward
c     bgdprv = true if the previous span is background
c     forw   = logical to indicate whether to search forward
c     found  = true if unpack found a non-horizontal edge
c     ibad   = error parameter
c     ibucky = array of pointers to first edge on a scan line
c     idely  = number of scan lines used by a edge
c     iedgpt = pointer to next edge on a scan line
c     ies    = true if have the last span on a scan line
c     ify    = Y resolution
c     ipt    = polygon number
c     iseg   = segment block array (equivalenced with rseg)
c     isegbc = temporary pointer - ususally points back
c     isegbg = pointer to first active segment in a span list
c     isegco = number of active edges in X-sort list
c     isegnt = pointer to next (after current span) active seg in X-sort
c     isegst = pointer to first active segment in X-sort list
c     isegtm = temporary segment pointer
c     ivbl   = 0 if visible segment to be displayed is background
c     iy     = scan line number
c     length = segment block size
c     nogrey = used to update segments to next scan line
c     polyth = true if incoming edge belongs to a segment that exists
c     prvseg = true if there are active segments in previous scan line
c     rrange = right slope of a span (used for antialiasing)
c     rseg   = segment block array (equivalenced with iseg)
c     saml   = left edge of visible span
c     samr   = right edge of visible span
c     shbl   = starting value for blue color component
c     shbr   = ending value for blue color component
c     shgl   = starting value for green color component
c     shgr   = ending value for green color component
c     shrl   = starting value for red color component
c     shrr   = ending value for red color component c     spanl  = left boundary of span
c     spanr  = right boundary of span
c     step   = smallest span size
c     xleft  = left edge X coordinate of visible segment
c     xright = right edge X coordinate of visible segment
c
c****************************************************************
c
      common /bucky/ ibucky
      common /csgkey/ ikey,ikeyno,noprim
      common /edgblk/ ipt,icoll,idely,x1,x2,z1,z2,s1,s2,iedgpt,cl,
     lc2,shared,igthrz,icol2,itra1,itra2,iprim
      common /neyes/ ifx,ify,delint
      common /free/ iseg
      common /pixbuf/ jbuf,psc,pdx1,pdx2,ibl,xbb,xlenb
      common /qfnrio/ contrs,idvice,ibad,shoshr,lblspc
      common /shover/ ies,ivbl,color,xleft,xright,shrl,shrr,saml,
     lsamr,rxvalu,rrange,lsterr,iy,icon,shbl,shbr,shgl,shgr
      dimension ibucky(1024),iseg(475006),rseg(475006)
      dimension izpt1(50),izptr(50),inout1(100,0:50),inoutr(100,0:50)
      dimension izptrst(10,50),inoutst(10,100,0:50),rspan(10)
      dimension ikey(100,3)
      dimension psc(3),lookup(12)
      logical ies,lsterr,shoshr,jbuf,contrs,ibad
      logical found,polyth,prvseg,forw,backw,bgdprv,inlog,allzero
      logical havelf,havert,term,first,passit,fillrt
      equivalence (iseg(1),rseg(1))
      data lookup/0,1,1,1,0,0,1,0,0,0,0,1/
```

```
c
c   initialization
c
      if(ibad) then
         call errmsg(9,0)
         return
      end if
      nogrey=25
      length=29
      step=.1
      shift=step*step
      i=0
      ibad=.false.
      prvseg=.false.
      isegst=0
c
c   get the right amount of words for a segment block
c
      call lstset(length)
c
c------------------------------------------------------------
c   loop through each scan line
c
      do 620 iy=ify-1,0,-1
c
c   initialize pixel buffer variables
c
      jbuf=.false.
```

Mar 18 22:05 1986   hidden.f Page 3

```
      pdx1=0.
      pdx2=0.
      xbb=0.
      xlenb=0.
      psc(1)=0.
      psc(2)=0.
      psc(3)=0.
c
c------------------------------------------------------------
c   update all segments from previous scan line
c
      if (prvseg) then
         isegtm=isegst
         do 20 j=1,isegco
            do 10 k=7,nogrey,2
               jk=isegtm+k
               rseg(jk)=rseg(jk)+rseg(jk+1)
10          continue
            iseg(isegtm+5)=iseg(isegtm+5)+1
            iseg(isegtm+6)=iseg(isegtm+6)+1
            isegtm=iseg(isegtm+1)
20       continue
c
c------------------------------------------------------------
c   clean up segment block if both edges have ended
c   (first find the first segment that hasn't ended-
c    then search thru rest)
c
         itemp=isegco
         isegtm=isegst
         do 30 j=1,itemp
            if ((iseg(isegtm+5).eq.0).and.(iseg(isegtm+6).eq.0)) then
               isegco=isegco-1
               isegst=iseg(isegtm+1)
               call retblk(isegtm)
               if (isegst.ne.0) iseg(isegst)=0
            else
               go to 40
            end if
            isegtm=isegst
30       continue
40       continue
         if (isegco.eq.0) then
            prvseg=.false.
         else if (isegco.gt.1) then
            itemp=isegco
            isegtm=iseg(isegst+1)
            isegbc=isegst
            do 50 j=1,itemp-1
               if ((iseg(isegtm+5).eq.0).and.(iseg(isegtm+6).eq.0)) then
                  isegco=isegco-1
                  iseg(isegbc+1)=iseg(isegtm+1)
                  if (iseg(isegtm+1).ne.0) iseg(iseg(isegtm+1))=isegbc
                  isegtm2=iseg(isegtm+1)
                  call retblk(isegtm)
                  isegtm=isegtm2
```

```
              else
                 isegbc=isegtm
                 isegtm=iseg(isegtm+1)
              end if
  50       continue
        end if
     end if
c
c------------------------------------------------------------------
c  check and modify X-sort list to see if updates require switching
c     segments - search thru list: if one is found in wrong place,
c     modify pointers and search backward until correct location is
c     found; then insert by rearranging pointers; continue forward
c     thru list until another segment is out of place or end of list
c     [isegtm & isegbc are the forward and backward test pointers]
c     (sorry it's messy, but no do whiles in Fortran)
c
c  first handle special case if there are only two segment blocks
c     and they need switching
c
        if (isegco.eq.2) then
           isegtm=iseg(isegst+1)
           if (rseg(isegst+7).gt.rseg(isegtm+7)) then
              iseg(isegst)=isegtm
              iseg(isegst+1)=0
              iseg(isegtm)=0
              iseg(isegtm+1)=isegst
              isegst=isegtm
           end if
        else if (isegco.gt.2) then
           isegtm=iseg(isegst+1)
           isegbc=isegst
c
c  loop to continue forward
c
  60       continue
           forw=rseg(isegtm+7).ge.rseg(isegbc+7)
           if (forw) then
c
c  jump out if come to end of list - all done
c
              if (iseg(isegtm+1).eq.0) then
                 go to 80
c
c  move pointers forward and continue in forward loop
c
              else
                 isegtm=iseg(isegtm+1)
                 isegbc=iseg(isegbc+1)
                 go to 60
              end if
c
c  segment out of place - disconnect pointers and free isegfr
c     initialize backward movement by moving pointers back one
c     check if already hit front of list
c
```

```
           else
              iseg(isegbc+1)=iseg(isegtm+1)
              if (iseg(isegtm+1).ne.0) iseg(iseg(isegtm+1))=isegbc
              isegfr=isegtm
              isegbc=iseg(isegbc)
              isegtm=iseg(isegtm)
              if (isegbc.eq.0) then
                 iseg(isegst)=isegfr
                 iseg(isegfr+1)=isegst
                 iseg(isegfr)=0
                 isegst=isegfr
                 isegbc=isegtm
                 isegtm=iseg(isegtm+1)
                 go to 60
              end if
c
c  loop to continue backward
c
  70          continue
              backw=rseg(isegfr+7).lt.rseg(isegbc+7)
              if (backw) then
c
c  hit front of list - isegfr goes in front of isegst - place it in with
c     pointers and move test pointers forward and go to forward loop
c
                 if (iseg(isegbc).eq.0) then
                    iseg(isegst)=isegfr
```

```
                  iseg(isegfr+1)=isegst
                  iseg(isegfr)=0
                  isegst=isegfr
                  isegtm=iseg(isegtm+1)
                  isegbc=iseg(isegbc+1)
                  go to 60
c
c     move pointers backward and continue in backward loop
c
                else
                  isegbc=iseg(isegbc)
                  isegtm=iseg(isegtm)
                  go to 70
                end if
c
c     found location for isegfr - insert and move test pointers forward
c     and get back into forward loop
c
              else
                iseg(isegbc+1)=isegfr
                iseg(isegtm)=isegfr
                iseg(isegfr)=isegbc
                iseg(isegfr+1)=isegtm
                isegtm=iseg(isegtm+1)
                if (isegtm.eq.0) go to 80
                isegbc=iseg(isegfr+1)
                go to 60
              end if
            end if Mar 18 22:05 1986  hidden.f Page 6

80       continue
          end if
c
c-------------------------------------------------------------------
c     get pointer to first edge for this scan line
c
c     if there are no previous segment blocks and there is an edge: unpack
c     first edge, get a segment block and load up first block (assume it
c     is a left edge)
c
c     (unpack will not have found anything if only horizontal edges remain)
c
          iedgpt=ibucky(iy+1)
          if ((iedgpt.ne.0).and.(.not.prvseg)) then
            call unpack(found)
            if(found) then
              call getblk(i)
              if(ibad) return
c
c     store edge data in segment block left
c
c     seg(i)=previous segment pointer in X-sort list
c     seg(i+1)=next segment in X-sort list
c     seg(i+2)=polygon number
c     seg(i+3)=next segment in active span list
c     seg(i+4)=primitive number
c     seg(i+5)=negative of the number of scan lines
c         the left edge is active
c     seg(i+6)=negative of the number of scan lines
c         the right edge is active
c     seg(i+7)=X of left edge       seg(i+8)=Xslope of left edge
c     seg(i+9)=X of right edge      seg(i+10)=Xslope of right edge
c     seg(i+11)=Z of left edge      seg(i+12)=Zslope of left edge
c     seg(i+13)=Z of right edge     seg(i+14)=Zslope of right edge
c     seg(i+15)=red of left edge    seg(i+16)=red slope of left edge
c     seg(i+17)=red of right edge   seg(i+18)=red slope of right edge
c     seg(i+19)=blue of left edge   seg(i+20)=blue slope of left edge
c     seg(i+21)=blue of right edge  seg(i+22)=blue slope of right edge
c     seg(i+23)=green of left edge  seg(i+24)=green slope of left edge
c     seg(i+25)=green of right edge seg(i+26)=green slope of right edge
c     seg(i+27)=Z of left span      seg(i+28)=Z of right span
c
              sr1=float(mod(icol1,256))
              sb1=float(mod(icol1/256,256))
              sg1=float(mod(icol1/65536,256))
              sr2=float(mod(icol2,256))
              sb2=float(mod(icol2/256,256))
              sg2=float(mod(icol2/65536,256))
              iseg(i)=0
              iseg(i+1)=0
              iseg(i+2)=ipt
              iseg(i+3)=0
              iseg(i+4)=iprim
              iseg(i+5)=-idely
              iseg(i+6)=-1
              rseg(i+9)=0.
```

```
                    rseg(i+8)=(x1-x2)/float(iseg(i+5))
                    rseg(i+7)=x1+rseg(i+8)*.5
                    rseg(i+12)=(z1-z2)/float(iseg(i+5))
                    rseg(i+11)=z1+rseg(i+12)*.5
                    a = float(iseg(i+5))*255.
                    rseg(i+16) = (sr1-sr2)/a
                    rseg(i+20) = (sb1-sb2)/a
                    rseg(i+24) = (sg1-sg2)/a
                    rseg(i+15) = (sr1/255.)+rseg(i+16)*.5
                    rseg(i+19) = (sb1/255.)+rseg(i+20)*.5
                    rseg(i+23) = (sg1/255.)+rseg(i+24)*.5
c
c    initialize the starting pointer and seg block counter
c       and we now have a segment that will carry over
c
                    isegst=i
                    isegco=1
                    prvseg=.true.
               end if
          end if
c
c------------------------------------------------------------------------
c   loop to bring in new edges
c
     90   continue
          if(iedgpt.ne.0) then
             call unpack(found)
             if(found) then
                sr1=float(mod(icol1,256))
                sb1=float(mod(icol1/256,256))
                sg1=float(mod(icol1/65536,256))
                sr2=float(mod(icol2,256))
                sb2=float(mod(icol2/256,256))
                sg2=float(mod(icol2/65536,256))
c
c------------------------------------------------------------------------
c   search list to see if poly no. exists in one of the seg blocks
c
                isegtm=isegst
                do 100 j=1,isegco
                   if (ipt.eq.iseg(isegtm+2)) then
                      polyth=.true.
                      go to 110
                   end if
                   isegtm=iseg(isegtm+1)
    100         continue
                polyth=.false.
    110         continue
c
c    if it exists - check to see if it needs to replace one that may
c       be ending
c
                if (polyth) then
                   if (iseg(isegtm+6).eq.0) then
                      iseg(isegtm+6)=-idely
                      rseg(isegtm+10)=(x1-x2)/float(iseg(isegtm+6))
```

```
                      rseg(isegtm+9)=x1+rseg(isegtm+10)*.5
                      rseg(isegtm+14)=(z1-z2)/float(iseg(isegtm+6))
                      rseg(isegtm+13)=z1+rseg(isegtm+14)*.5
                      a = float(iseg(isegtm+6))*255.
                      rseg(isegtm+18) = (sr1-sr2)/a
                      rseg(isegtm+22) = (sb1-sb2)/a
                      rseg(isegtm+26) = (sg1-sg2)/a
                      rseg(isegtm+17) = (sr1/255.)+rseg(isegtm+18)*.5
                      rseg(isegtm+21) = (sb1/255.)+rseg(isegtm+22)*.5
                      rseg(isegtm+25) = (sg1/255.)+rseg(isegtm+26)*.5
                   else if (iseg(isegtm+5).eq.0) then
                      iseg(isegtm+5)=-idely
                      rseg(isegtm+8)=(x1-x2)/float(iseg(isegtm+5))
                      rseg(isegtm+7)=x1+rseg(isegtm+8)*.5
                      rseg(isegtm+12)=(z1-z2)/float(iseg(isegtm+5))
                      rseg(isegtm+11)=z1+rseg(isegtm+12)*.5
                      a = float(iseg(isegtm+5))*255.
                      rseg(isegtm+16) = (sr1-sr2)/a
                      rseg(isegtm+20) = (sb1-sb2)/a
                      rseg(isegtm+24) = (sg1-sg2)/a
                      rseg(isegtm+15) = (sr1/255.)+rseg(isegtm+16)*.5
                      rseg(isegtm+19) = (sb1/255.)+rseg(isegtm+20)*.5
                      rseg(isegtm+23) = (sg1/255.)+rseg(isegtm+24)*.5
c
c   when left side is replaced - new left side is now different and
c      needs to be refitted in X-sort list
c
```

```
                    if (isegco.ge.2) then
c
c   see if edge needs to be moved left
c
                    if (isegtm.ne.isegst) then
                       iseglf=iseg(isegtm)
                       if (rseg(isegtm+7).lt.rseg(iseglf+7)) then
                          iseg(iseglf+1)=iseg(isegtm+1)
                          if (iseg(isegtm+1).ne.0)
   1                         iseg(iseg(isegtm+1))=iseglf
                          iseglf=iseg(iseglf)
c
c   loop to continue searching left
c
 120                   continue
                       if (iseglf.eq.0) then
                          iseg(isegst)=isegtm
                          iseg(isegst+1)=0
                          iseg(isegtm)=0
                          iseg(isegtm+1)=isegst
                          isegst=isegtm
                          go to 140
                       else if (rseg(isegtm+7).ge.rseg(iseglf+7)) then
                          iseg(iseg(iseglf+1))=isegtm
                          iseg(isegtm+1)=iseg(iseglf+1)
                          iseg(iseglf+1)=isegtm
                          iseg(isegtm)=iseglf
                          go to 140
                       else
```

Mar 18 22:05 1986 hidden.f Page 9

```
                          iseglf=iseg(iseglf)
                          go to 120
                       end if
                    end if
                 end if
c
c   check if it needs to move right
c
                 if (iseg(isegtm+1).ne.0) then
                    isegrt=iseg(isegtm+1)
                    if (rseg(isegtm+7).gt.rseg(isegrt+7)) then
                       isegbc=iseg(isegtm)
                       if (isegbc.eq.0) then
                          isegst=isegrt
                       else
                          iseg(isegbc+1)=isegrt
                       end if
                       iseg(isegrt)=isegbc
                       isegrto=isegrt
                       isegrt=iseg(isegrt+1)
c
c   loop to continue searching right
c
 130                   continue
                       if (isegrt.eq.0) then
                          iseg(isegtm)=isegrto
                          iseg(isegtm+1)=0
                          iseg(isegrto+1)=isegtm
                          go to 140
                       else if (rseg(isegtm+7).le.rseg(isegrt+7)) then
                          iseg(isegrto+1)=isegtm
                          iseg(isegtm+1)=isegrt
                          iseg(isegrt)=isegtm
                          iseg(isegtm)=isegrto
                          go to 140
                       else
                          isegrto=isegrt
                          isegrt=iseg(isegrt+1)
                          go to 130
                       end if
                    end if
                 end if
              end if
 140          continue
c
c   if poly no. exists and it doesn't replace a terminating edge then
c      it needs to finish a seg block - find which is left edge by
c      finding both left and right X values for next scan line
c
              else
                 dxdy=(x1-x2)/float(-idely)
                 xtemp=x1+dxdy*.5
                 if (abs(xtemp-rseg(isegtm+7)).lt.0.000001) then
                    xrnext=xtemp + dxdy
                    xlnext=rseg(isegtm+7)+rseg(isegtm+8)
                    fillrt=(xrnext.ge.xlnext)
```

Mar 18 22:05 1986  hidden.f Page 10

```fortran
              else
                 fillrt=(xtemp.gt.rseg(isegtm+7))
              end if
c
c  fill up right part of segment block
c
              if (fillrt) then
                 iseg(isegtm+6) =-idely
                 rseg(isegtm+9) =xtemp
                 rseg(isegtm+10)=dxdy
                 rseg(isegtm+14)=(z1-z2)/float(iseg(isegtm+6))
                 rseg(isegtm+13)=z1+rseg(isegtm+14)*.5
                 a = float(iseg(isegtm+6))*255.
                 rseg(isegtm+18) = (sr1-sr2)/a
                 rseg(isegtm+22) = (sb1-sb2)/a
                 rseg(isegtm+26) = (sg1-sg2)/a
                 rseg(isegtm+17) = (sr1/255.)+rseg(isegtm+18)*.5
                 rseg(isegtm+21) = (sb1/255.)+rseg(isegtm+22)*.5
                 rseg(isegtm+25) = (sg1/255.)+rseg(isegtm+26)*.5
c
c  move left stuff to right, fill in left
c
              else
                 iseg(isegtm+6)=iseg(isegtm+5)
                 rseg(isegtm+10)=rseg(isegtm+8)
                 rseg(isegtm+9)=rseg(isegtm+7)
                 rseg(isegtm+14)=rseg(isegtm+12)
                 rseg(isegtm+13)=rseg(isegtm+11)
                 rseg(isegtm+18) = rseg(isegtm+16)
                 rseg(isegtm+22) = rseg(isegtm+20)
                 rseg(isegtm+26) = rseg(isegtm+24)
                 rseg(isegtm+17) = rseg(isegtm+15)
                 rseg(isegtm+21) = rseg(isegtm+19)
                 rseg(isegtm+25) = rseg(isegtm+23)
                 iseg(isegtm+5)=-idely
                 rseg(isegtm+7)=xtemp
                 rseg(isegtm+8)=dxdy
                 rseg(isegtm+12)=(z1-z2)/float(iseg(isegtm+5))
                 rseg(isegtm+11)=z1+rseg(isegtm+12)*.5
                 a = float(iseg(isegtm+5))*255.
                 rseg(isegtm+16) = (sr1-sr2)/a
                 rseg(isegtm+20) = (sb1-sb2)/a
                 rseg(isegtm+24) = (sg1-sg2)/a
                 rseg(isegtm+15) = (sr1/255.)+rseg(isegtm+16)*.5
                 rseg(isegtm+19) = (sb1/255.)+rseg(isegtm+20)*.5
                 rseg(isegtm+23) = (sg1/255.)+rseg(isegtm+24)*.5
c
c  find new position in X-sort: 1st make sure it is not the first seg
c    block or in front of it, 2nd check if it should be moved at all -
c    if so, disconnect and rearrange pointers and search back to
c    where it fits and update the pointers where it belongs
c
              if (isegst.ne.isegtm) then
                 xnew=rseg(isegtm+7)
                 isegbc=iseg(isegtm)
                 if (xnew.lt.rseg(isegst+7)) then
```

Mar 18 22:05 1986  hidden.f Page 11

```fortran
                    iseg(isegbc+1)=iseg(isegtm+1)
                    if (iseg(isegtm+1).ne.0)
     1                 iseg(iseg(isegtm+1))=isegbc
                    iseg(isegtm)=0
                    iseg(isegtm+1)=isegst
                    iseg(isegst)=isegtm
                    isegst=isegtm
                 else
                    if (xnew.lt.rseg(isegbc+7)) then
                       iseg(isegbc+1)=iseg(isegtm+1)
                       if (iseg(isegtm+1).ne.0)
     1                    iseg(iseg(isegtm+1))=isegbc
                       isegbc=iseg(isegbc)
                       do 150 j=1,isegco-2
                          if (xnew.ge.rseg(isegbc+7)) then
                             isegbc2=iseg(isegbc+1)
                             iseg(isegbc+1)=isegtm
                             iseg(isegtm)=isegbc
                             iseg(isegbc2)=isegtm
                             iseg(isegtm+1)=isegbc2
                             go to 160
                          end if
                          isegbc=iseg(isegbc)
 150                   continue
 160                continue
                    end if
                 end if
```

```
                    end if
                  end if
                end if
c
c---------------------------------------------------------------
c  poly no. doesn't exist - create new block (assume its a left edge)
c
              else
                call getblk(i)
                if(ibad) return
                iseg(i)=0
                iseg(i+2)=ipt
                iseg(i+3)=0
                iseg(i+4)=iprim
                iseg(i+5)=-idely
                iseg(i+6)=-1
                rseg(i+9)=0.
                rseg(i+8)=(x1-x2)/float(iseg(i+5))
                rseg(i+7)=x1+rseg(i+8)*.5
                rseg(i+12)=(z1-z2)/float(iseg(i+5))
                rseg(i+11)=z1+rseg(i+12)*.5
                a = float(iseg(i+5))*255.
                rseg(i+16) = (sr1-sr2)/a
                rseg(i+20) = (sb1-sb2)/a
                rseg(i+24) = (sg1-sg2)/a
                rseg(i+15) = (sr1/255.)+rseg(i+16)*.5
                rseg(i+19) = (sb1/255.)+rseg(i+20)*.5
                rseg(i+23) = (sg1/255.)+rseg(i+24)*.5
                isegco=isegco+1
```

Mar 18 22:05 1986  hidden.f Page 12

```
c
c  find its correct location in X-sort list
c  (doubly linked)
c
                if (rseg(i+7).lt.rseg(isegst+7)) then
                  iseg(isegst)=i
                  iseg(i+1)=isegst
                  isegst=i
                  iseg(i)=0
                else
                  isegtm=iseg(isegst+1)
                  isegbc=isegst
                  do 170 j=1,isegco-2
                    if (rseg(i+7).lt.rseg(isegtm+7)) then
                      iseg(i+1)=isegtm
                      iseg(i)=isegbc
                      iseg(isegbc+1)=i
                      iseg(isegtm)=i
                      go to 180
                    end if
                    isegbc=isegtm
                    isegtm=iseg(isegtm+1)
170               continue
                  iseg(i)=isegbc
                  iseg(isegbc+1)=i
                  iseg(i+1)=0
180             continue
                end if
              end if
c
c  go back to start of loop to get more edges
c
              go to 90
            end if
          end if if (isegst.ne.0) then
            isegzz=isegst
            do 181 j=1,isegco
              if (isegzz.le.0) then
                go to 182
              else
                xzl=rseg(isegzz+7)
                xzr=rseg(isegzz+9)
                isegzz=iseg(isegzz+1)
              end if
181         continue
182         continue
          end if c
c---------------------------------------------------------------
c  create spans
c
          bgdprv=.false.
          ies=.false.
```

```
              havelf=.false.
              havert=.false.
              first=.true.
              irspan=0
              iskipc=0
c
c     first check to see if there is at least one large enough
c
              isegbg=isegst
              jc=0
              do 190 j=1,isegco
                 spanl=rseg(isegbg+7)+step
                 spanr=rseg(isegbg+9)
                 if (spanr.gt.spanl) go to 200
                 jc=jc+1
                 isegbg=iseg(isegbg+1)
 190          continue
 200          continue
c
c     if no segments on this line output background
c
              if (isegbg.eq.0) then
                 ivbl=0
                 ies=.true.
                 saml=0.0
                 samr=0.0
                 rrange=0.0
                 call show
              else
c
c     get first span and make first active pointer list
c
                 isegnt=iseg(isegbg+1)
                 isegbc=isegbg
                 do 210 j=1,isegco-jc-1
                    if (rseg(isegnt+7).le.spanl) then
                       if (rseg(isegnt+9).gt.spanl) then
                          iseg(isegbc+3)=isegnt
                          if (rseg(isegnt+9).lt.spanr) spanr=rseg(isegnt+9)
                          isegbc=isegnt
                       end if
                       isegnt=iseg(isegnt+1)
                    else
                       if (rseg(isegnt+7).lt.spanr) spanr=rseg(isegnt+7)
                       go to 220
                    end if
 210             continue
 220             continue
c
c     set up to send background if left span is past left edge of viewport
c
                 if ((spanl-step).gt.0) then
                    spanlo=0.0
                    bgdprv=.true.
                 end if
c c     go down operate on this first span (Z order - CSG)
c
                 go to 270
c
c     loop to continue making spans
c
 230             continue
                 spanl=spanr+step
c
c     remove segments from active list if they have ended
c        1st: find first one that hasn't ended
c
 240             continue
                 if (rseg(isegbg+9).lt.spanl) then
                    isegtm=isegbg
                    isegbg=iseg(isegbg+3)
                    iseg(isegtm+3)=0
                    if (isegbg.ne.0) go to 240
                 end if
c
c        2nd: loop thru active ones and take them from list if they've ended
c
                 if (isegbg.ne.0) then
                    isegbc=isegbg
                    isegtm=iseg(isegbg+3)
                    spanr=rseg(isegbg+9)
 250                continue
```

```
            if (isegtm.ne.0) then
              if (rseg(isegtm+9).lt.spanl) then
                iseg(isegbc+3)=iseg(isegtm+3)
                itemp=isegtm
                isegtm=iseg(isegtm+3)
                iseg(itemp+3)=0
              else
                if (rseg(isegtm+9).lt.spanr) spanr=rseg(isegtm+9)
                isegbc=isegtm
                isegtm=iseg(isegtm+3)
              end if
              go to 250
            end if
          end if
c
c  no more spans
c
          if ((isegbg.eq.0).and.(isegnt.eq.0)) then
            ies=.true.
          else
c
c  if no active ones left, next segment starts a new span
c
            if (isegbg.eq.0) then
              spanl=rseg(isegnt+7)+step
              spanr=rseg(isegnt+9)
              isegbg=isegnt
              isegbc=isegbg
              isegnt=iseg(isegbg+1)
```

Mar 18 22:05 1986  hidden.f Page 15

```
            end if
c
c  loop to find all active segments in the span
c
 260        continue
            if (isegnt.ne.0) then
              if (rseg(isegnt+7).le.spanl) then
                iseg(isegbc+3)=isegnt
                if (rseg(isegnt+9).lt.spanr) spanr=rseg(isegnt+9)
                isegbc=isegnt
                isegnt=iseg(isegnt+1)
                go to 260
              else
                if (rseg(isegnt+7).lt.spanr) spanr=rseg(isegnt+7)
              end if
            end if
          end if
 270      continue
          if (.not.ies) then
c
c  operate on this span (Z order - CSG)
c  first check if span is large enough
c  calculate all Z values for each span boundary for each active seg
c
            xlclip=spanl+shift
            xrclip=spanr-shift
            if (xlclip.ge.xrclip) then
              inoutl((noprim+ikeyno),0)=-1
              inoutr((noprim+ikeyno),0)=-1
              iskipc=iskipc+1
            else
              isegtm=isegbg
 280          continue
              if (isegtm.ne.0) then
                if (isegtm.lt.0) stop 'isegtm .lt. 0'
                delx=rseg(isegtm+7)-rseg(isegtm+9)
                if (abs(delx).lt.0.000001) then
                  rseg(isegtm+27)=rseg(isegtm+13)
                  rseg(isegtm+28)=rseg(isegtm+13)
                else
                  delz=rseg(isegtm+11)-rseg(isegtm+13)
                  rseg(isegtm+27)=((xlclip-rseg(isegtm+9))*delz)/delx
     1                           +rseg(isegtm+13)
                  rseg(isegtm+28)=((xrclip-rseg(isegtm+9))*delz)/delx
     1                           +rseg(isegtm+13)
                end if
                isegtm=iseg(isegtm+3)
                go to 280
              end if
c
c  create Z pointer arrays for each side of the span
c
              if (.not.(havert.or.havelf)) then
                isegtm=isegbg
                issc=0
 290            continue
```

```
                    if (isegtm.ne.0) then
                       issc=issc+1
                       izptl(issc)=isegtm
                       izptr(issc)=isegtm
                       isegtm=iseg(isegtm+3)
                       go to 290
                    end if
                 end if
c
c    sort (linear selection with exchange) each Z pointer array
c    if z values are the same, sort by polygon number - that way if two
c      polygons are the same, they won't cross in the Z sort list
c
                 do 310 j=1,issc-1
                    kminl=j
                    kminr=j
                    do 300 k=j+1,issc
                       zkl=rseg(izptl(k)+27)
                       zkml=rseg(izptl(kminl)+27)
                       zkr=rseg(izptr(k)+28)
                       zkmr=rseg(izptr(kminr)+28)
                       if (abs(zkl-zkml).lt.0.000001) then
                          if(iseg(izptl(k)+2).lt.iseg(izptl(kminl)+2)) kminl=k
                       else
                          if (zkl.lt.zkml) kminl=k
                       end if
                       if (abs(zkr-zkmr).lt.0.000001) then
                          if(iseg(izptr(k)+2).lt.iseg(izptr(kminr)+2)) kminr=k
                       else
                          if (zkr.lt.zkmr) kminr=k
                       end if
300                 continue
                    if (j.ne.kminl) then
                       itemp=izptl(j)
                       izptl(j)=izptl(kminl)
                       izptl(kminl)=itemp
                    end if
                    if (j.ne.kminr) then
                       itemp=izptr(j)
                       izptr(j)=izptr(kminr)
                       izptr(kminr)=itemp
                    end if
310              continue
c
c    initialize inout lists and find out which primitives are in each span
c
                 if (.not.(havert.or.havelf)) then
                    do 320 j=1,noprim
                       inoutl(j,0)=-1
                       inoutr(j,0)=-1
320                 continue
                    isegtm=isegbg
330                 continue
                    if (isegtm.ne.0) then
                       ipr=iseg(isegtm+4)
                       inoutl(ipr,0)=inoutl(ipr,0)+1
                       inoutr(ipr,0)=inoutr(ipr,0)+1
                       isegtm=iseg(isegtm+3)
                       go to 330
                    end if
                 end if
c
c    create in-out list for each primitive involved (left & right sides)
c
                 do 360 j=1,noprim
                    if (inoutl(j,0).ge.0) then
                       if (.not.havelf) then
                          inlog=.false.
                          do 340 k=1,issc-1
                             if (iseg(izptl(k)+4).eq.j) then
                                if (inlog) then
                                   inoutl(j,k)=0
                                   inlog=.false.
                                else
                                   inoutl(j,k)=1
                                   inlog=.true.
                                end if
                             else if (k.eq.1) then
                                inoutl(j,k)=0
                             else
                                inoutl(j,k)=inoutl(j,k-1)
                             end if
```

```
340           continue
              end if
              if (.not.havert) then
                inlog=.false.
                do 350 k=1,issc-1
                  if (iseg(izptr(k)+4).eq.j) then
                    if (inlog) then
                      inoutr(j,k)=0
                      inlog=.false.
                    else
                      inoutr(j,k)=1
                      inlog=.true.
                    end if
                  else if (k.eq.1) then
                    inoutr(j,k)=0
                  else
                    inoutr(j,k)=inoutr(j,k-1)
                  end if
350             continue
              end if
            end if
360       continue
c
c  combine in-out lists according to key
c     take advantage of all cases when one is empty
c
          do 430 j=1,ikeyno
            icl=ikey(j,1)
            icr=ikey(j,2)
            iop=ikey(j,3)
```

Mar 18 22:05 1986  hidden.f Page 18

```
            jj=noprim+j
            if (.not.havelf) then
              if ((inoutl(icl,0).eq.-1).and.(inoutl(icr,0).eq.-1))
     1          then
                inoutl(jj,0)=-1
              else if (((iop.ne.1).and.(inoutl(icl,0).eq.-1)).or.
     1          ((iop.eq.3).and.(inoutl(icr,0).eq.-1))) then
                inoutl(jj,0)=-1
              else if ((iop.lt.3).and.(inoutl(icr,0).eq.-1)) then
                do 370 k=0,issc-1
                  inoutl(jj,k)=inoutl(icl,k)
370             continue
              else if ((iop.eq.1).and.(inoutl(icl,0).eq.-1)) then
                do 380 k=0,issc-1
                  inoutl(jj,k)=inoutl(icr,k)
380             continue
              else
                allzero=.true.
                do 390 k=1,issc-1
                  inoutl(jj,k)=lookup(2*inoutl(icl,k)+inoutl(icr,k)
     1                               +4*iop-3)
                  if (inoutl(jj,k).ne.0) allzero=.false.
390             continue
                if (allzero) then
                  inoutl(jj,0)=-1
                else
                  inoutl(jj,0)=0
                end if
              end if
            end if
            if (.not.havert) then
              if ((inoutr(icl,0).eq.-1).and.(inoutr(icr,0).eq.-1))
     1          then
                inoutr(jj,0)=-1
              else if (((iop.ne.1).and.(inoutr(icl,0).eq.-1)).or.
     1          ((iop.eq.3).and.(inoutr(icr,0).eq.-1))) then
                inoutr(jj,0)=-1
              else if ((iop.lt.3).and.(inoutr(icr,0).eq.-1)) then
                do 400 k=0,issc-1
                  inoutr(jj,k)=inoutr(icl,k)
400             continue
              else if ((iop.eq.1).and.(inoutr(icl,0).eq.-1)) then
                do 410 k=0,issc-1
                  inoutr(jj,k)=inoutr(icr,k)
410             continue
              else
                allzero=.true.
                do 420 k=1,issc-1
                  inoutr(jj,k)=lookup(2*inoutr(icl,k)+inoutr(icr,k)
     1                               +4*iop-3)
                  if (inoutr(jj,k).ne.0) allzero=.false.
420             continue
                if (allzero) then
                  inoutr(jj,0)=-1
                else
                  inoutr(jj,0)=0
```

```
                      end if
                    end if
                  end if
430           continue
                end if
c
c   found no visible segments in the span
c
              if ((inoutl(jj,0).eq.-1).and.(inoutr(jj,0).eq.-1)) then
                if (irspan.gt.0) then
                  do 440 j=1,issc
                    izptr(j)=izptrst(irspan,j)
440               continue
                  if (inoutst(irspan,jj,0).eq.-1) then
                    inoutr(jj,0)=-1
                  else
                    do 450 j=0,issc-1
                      inoutr(jj,j)=inoutst(irspan,jj,j)
450                 continue
                  end if
                  spanl=spanr+step
                  spanr=rspan(irspan)
                  irspan=irspan-1
                  havert=.true.
                  havelf=.false.
                  go to 270
                else
                  havert=.false.
                  go to 230
                end if
              end if
c
c   find out where first visible segment for each side of the span
c
              if (.not.havelf) then
                if (inoutl(jj,0).ne.-1) then
                  do 460 j=1,issc-1
                    if (inoutl(jj,j).eq.1) then
                      inoutl(jj,0)=j
                      go to 470
                    end if
460               continue
                  inoutl(jj,0)=-1
470             continue
                end if
              end if
              if (.not.havert) then
                if (inoutr(jj,0).ne.-1) then
                  do 480 j=1,issc-1
                    if (inoutr(jj,j).eq.1) then
                      inoutr(jj,0)=j
                      go to 490
                    end if
480               continue
                  inoutr(jj,0)=-1
490             continue
                end if
              end if
```

```
              end if
            end if
c
c   find if there is a visible segment accross span
c
              term=.false.
              if ((inoutl(jj,0).eq.inoutr(jj,0)).and.
     1           (izptl(inoutl(jj,0)).eq.izptr(inoutr(jj,0)))) then
                term=.true.
                do 510 j=inoutl(jj,0)-1,1,-1
                  term=.false.
                  isegtm1=izptl(j)
                  do 500 k=(inoutr(jj,0)-1),1,-1
                    isegtm2=izptr(k)
                    if (isegtm1.eq.isegtm2) term=.true.
500               continue
                  if (.not.term) go to 520
510             continue
              end if
520           continue
c
c   process visible segment
c
              if (term) then
                if (first) then
                  pspanl=spanl-step
                  pspanr=spanr
```

```
                isegprv=izptl(inoutl(jj,0))
                iskipc=0
                first=.false.
             else
                if ((isegprv.eq.izptl(inoutl(jj,0))).and.
 1                 (pspanr.ge.spanl-2*step-3*shift)) then
                   pspanr=spanr
                else
                   if ((bgdprv).and.
 1                    ((pspanl-spanlo).le.(2*step+3*shift))) then
                      bgdprv=.false.
                      pspanl=spanlo
                   end if
                   if (bgdprv) then
                      saml=spanlo
                      samr=pspanl
                      ivbl=0
                      if (rseg(isegprv+7).gt.pspanl-step-3*shift) then
                         rrange=rseg(isegprv+8)
                      else
                         rrange=0.0
                      end if
                      call show
                   end if
                   bgdprv=.false.
                   saml=pspanl
                   if (pspanr.ge.spanl-(iskipc+1)*step-3*shift) then
                      pspanr=spanl-step
                   end if
```

Mar 18 22:05 1986  hidden.f Page 21

```
                   samr=pspanr
                   ivbl=1
                   if (rseg(isegprv+9).lt.pspanr+step+3*shift) then
                      rrange=rseg(isegprv+10)
                   else if (rseg(izptl(inoutl(jj,0))+7).gt.
 1                       spanl-(iskipc+1)*step-3*shift) then
                      rrange=rseg(izptl(inoutl(jj,0))+8)
                   else
                      rrange=0
                   end if
                   xleft=rseg(isegprv+7)
                   xright=rseg(isegprv+9)
                   shrl = rseg(isegprv+15)
                   shrr = rseg(isegprv+17)
                   shbl = rseg(isegprv+19)
                   shbr = rseg(isegprv+21)
                   shgl = rseg(isegprv+23)
                   shgr = rseg(isegprv+25)
                   call show
                   if (pspanr.lt.spanl-(skipc+1)*step-3*shift) then
                      bgdprv=.true.
                      spanlo=pspanr
                   end if
                   pspanl=spanl-step
                   pspanr=spanr
                   isegprv=izptl(inoutl(jj,0))
                   iskipc=0
                end if
             end if
             if (irspan.gt.0) then
                do 530 j=1,issc
                   izptr(j)=izptrst(irspan,j)
530             continue
                if (inoutst(irspan,jj,0).eq.-1) then
                   inoutr(jj,0)=-1
                else
                   do 540 j=0,issc-1
                      inoutr(jj,j)=inoutst(irspan,jj,j)
540                continue
                end if
                spanl=spanr+step
                spanr=rspan(irspan)
                irspan=irspan-1
                havert=.true.
                havelf=.false.
                go to 270
             else
                havert=.false.
                go to 230
             end if
c
c     there is an intersection to be calculated, first save right span info
c
             else
                irspan=irspan+1
                rspan(irspan)=spanr
```

```
                            havelf=.true.
                            havert=.false.
                            do 550 j=1,issc
                               izptrst(irspan,j)=izptr(j)
550                         continue
                            if (inoutr(jj,0).eq.-1) then
                               inoutst(irspan,jj,0)=-1
                            else
                               do 560 j=0,issc-1
                                  inoutst(irspan,jj,j)=inoutr(jj,j)
560                            continue
                            end if
c
c   find intersection point
c
                            if ((inoutr(jj,0).eq.-1).or.((inoutl(jj,0).ne.-1).and.
     1                         (inoutl(jj,0).le.inoutr(jj,0)))) then
                               isegvb=izptl(inoutl(jj,0))
                               zal=rseg(isegvb+27)
                               zar=rseg(isegvb+28)
                               ic=1
                               passit=.false.
570                            continue
                               isegtm=izptr(ic)
                               if (isegvb.eq.isegtm) then
                                  passit=.true.
                                  ic=ic+1
                                  go to 570
                               else
                                  if((inoutr(jj,0).ne.-1).and.(ic.eq.inoutr(jj,0))) then
                                     zcl=rseg(isegtm+27)
                                     zcr=rseg(isegtm+28)
                                     xipt=(xlclip*(zar-zcr)-xrclip*(zal-zcl))/
     1                                    (zcl-zal-zcr+zar)
                                  else
                                     inlog=.false.
                                     do 580 j=(inoutl(jj,0)-1),1,-1
                                        isegft=izptl(j)
                                        if (isegft.eq.isegtm) inlog=.true.
580                                  continue
                                     if (((.not.passit).and.(.not.inlog)).or.
     1                                   (passit.and.inlog)) then
                                        zcl=rseg(isegtm+27)
                                        zcr=rseg(isegtm+28)
                                        divi=zcl-zal-zcr+zar
                                        if (abs(divi).lt.0.000001) then
                                           ic=ic+1
                                           go to 570
                                        else
                                           xipt=(xlclip*(zar-zcr)-xrclip*(zal-zcl))/divi
                                        end if
                                     else
                                        ic=ic+1
                                        go to 570
                                     end if
                                  end if
```

```
                               end if
                            else
                               isegvb=izptr(inoutr(jj,0))
                               zal=rseg(isegvb+27)
                               zar=rseg(isegvb+28)
                               ic=1
                               passit=.false.
590                            continue
c        if (ic.gt.4) stop ' ic .gt. 4'
                               isegtm=izptl(ic)
                               if (isegvb.eq.isegtm) then
                                  passit=.true.
                                  ic=ic+1
                                  go to 590
                               else
                                  if((inoutl(jj,0).ne.-1).and.(ic.eq.inoutl(jj,0))) then
                                     zcl=rseg(isegtm+27)
                                     zcr=rseg(isegtm+28)
                                     xipt=(xlclip*(zar-zcr)-xrclip*(zal-zcl))/
     1                                    (zcl-zal-zcr+zar)
                                  else
                                     inlog=.false.
                                     do 600 j=(inoutr(jj,0)-1),1,-1
                                        isegft=izptr(j)
                                        if (isegft.eq.isegtm) inlog=.true.
600                                  continue
                                     if (((.not.passit).and.(.not.inlog)).or.
```

```
1                    (passit.and.inlog)) then
                   zcl=rseg(isegtm+27)
                   zcr=rseg(isegtm+28)
                   divi=zcl-zal-zcr+zar
                   if (abs(divi).lt.0.000001) then
                      ic=ic+1
                      go to 590
                   else
                      xipt=(xlclip*(zar-zcr)-xrclip*(zal-zcl))/divi
                   end if
                 else
                    ic=ic+1
                    go to 590
                 end if
               end if
             end if
           end if
           spanr=xipt
           go to 270
         end if
       end if
c
c  output last span in buffer (if one was ever loaded)
c
       if (first) then
         saml=0.0
         samr=0.0
         ivbl=0
         rrange=0.0
```

Mar 18 22:05 1986  hidden.f Page 24

```
       else
         if ((bgdprv).and.((pspanl-spanlo).le.
1           ((iskipc+1)*step+3*shift))) then
           bgdprv=.false.
           pspanl=spanlo
         end if
         if (bgdprv) then
           saml=spanlo
           samr=pspanl
           ivbl=0
           if (rseg(isegprv+7).gt.pspanl-step-3*shift) then
             rrange=rseg(isegprv+8)
           else
             rrange=0.0
           end if
           ies=.false.
           call show
           ies=.true.
         end if
         saml=pspanl
         if (pspanr.ge.spanl-(iskipc+1)*step-3*shift) then
           pspanr=spanl-step
         end if
         samr=pspanr
         ivbl=1
         if (rseg(isegprv+9).lt.pspanr+step+3*shift) then
           rrange=rseg(isegprv+10)
         else
           rrange=0.0
         end if
         xleft=rseg(isegprv+7)
         xright=rseg(isegprv+9)
         shrl = rseg(isegprv+15)
         shrr = rseg(isegprv+17)
         shbl = rseg(isegprv+19)
         shbr = rseg(isegprv+21)
         shgl = rseg(isegprv+23)
         shgr = rseg(isegprv+25)
       end if
       call show
c
c  all active segments from the last span become inactive before the
c    start of the next scan line
c
       if (isegbg.ne.0) then
         isegbc=isegbg
         isegnt=iseg(isegbg+3)
610      continue
         iseg(isegbc+3)=0
         if (isegnt.ne.0) then
           isegbc=isegnt
           isegnt=iseg(isegnt+3)
           go to 610
         end if
       end if
     end if
```

```
c
c  end of scan line do loop
c
  620 continue
c----------------------------------------------------------------
c
      return
      end Feb 18 21:18 1986  inthid.f Page 1 subroutine inthid
c
c****************************************************************
c
c  subroutine inthid - initializes Watkins hidden parameters
c
c****************************************************************
c
c  subroutine called by
c      main
c
c****************************************************************
.c
c  variables used
c      contrs  = if .true., contours exist
c      cube    = cube root of maximum number of colors being used
c      cube2   = variable cube squared
c      delint  = light intensity range
c      goon    = logical for devices who do not flood background
c      ibad    = error parameter
c      ic      = color flag: 1 = color, 2 = black and white
c      idvice  = 8 for continuous tone, -8 for line mode
c      ipb     = background color
c      iph     = high intensity
c      ipl     = low intensity
c      len     = size of free
c      lutmax  = maximum number of relative lut addresses
c      nnum    = .true. if node numbering enabled
c      num     = .true. if either node or polygon numbering enabled
c      pnum    = .true. if polygon numbering enabled
c      xcube   = factor that converts intensities that range from 0 to
c                255 to 0 to cube-1 (max. no. of intensities available)
c
c****************************************************************
c
      common/core/   ifrest,len,ifrept
      common/intens/ iph,ipl,ipb,inotu
      common/ipro/   ic
      common/lexsr1/ rerr,gerr,berr,cube,cube2,xcube,lutmax,intlin
      common/neyes/  ifx,ify,delint
      common/qforio/ contrs,idvice,ibad,shoshr,lblspc
c
      logical contrs,ibad,shoshr
c
c  set size of free storage
c
      len = 475006
c
c  initializations for Watkins hidden
c
      ibad=.false.
      contrs=.false.
c
      ipl=0
      iph=255
      delint=iph-ipl Feb 18 21:18 1986  inthid.f Page 2 ifx=639
      ify=512
      idvice=8
      lutmax=4096
      ic=1
c
c  initialize color cube division variables
c
      icube=lutmax**(1/3.)+0.05
      cube=float(icube)
      xcube=(cube-1.)/255.
      cube2=cube*cube
c
      return
      end
```

Feb 18 21:15 1986 lstset.f Page 1

```
      subroutine lstset(n)
c
c*****************************************************************
c
c  subroutine lstset - set block size and links segments
c
c*****************************************************************
c
c  subroutine called by
c     hidden = determines visible segments
c
c*****************************************************************
c
c  variables used
c     ifree  = free storage
c     ifrept = pointer to block of data in free
c     ifrest = pointer to next available location in free
c     len    = size of free
c     n      = block size
c
c*****************************************************************
c
c  variable dimension information for subroutine lstset
c  (7) maxfre = maximum size of free storage
c               dimension ifree(maxfre)
c
c*****************************************************************
c
      common/core/ifrest,len,ifrept
      common/free/ifree
      dimension ifree(475006)
c
      ifrept=0
      k=len-n+1
c
c     return if no room left for segment blocks
c
      if(k.lt.ifrest)return
      ifrept=ifrest
c
c     set pointers through the remainder of the free list
c     linking the segment blocks together
c
      do 10 i=ifrest,k,n
         m=i
         ifree(i)=0
   10 ifree(i+1)=i+n
c
c     set the last pointer to zero indicating end of segments
c
      ifree(m+1)=0
      return
      end
c
```

Mar 11 22:26 1986 outseg.f Page 1

```
      subroutine outseg (txx1,txx2,sx1,sx2,dxx1,dxx2)
c
c*****************************************************************
c
c  subroutine outseg - outputs segments, including some pixel
c                      buffering if shadows or transparency invoked
c
c*****************************************************************
c
c  subroutine called by
c     show   = evaluates shading info for visible segments
c
c*****************************************************************
c
c  subprograms called
c     aalias = buffers segment information for anti-aliasing
c     srl    = shaded raster line output routine
c
c*****************************************************************
c
c  variables used
c     antial = logical flag for anti-aliasing
c     dx1    = slope of left end of buffered segment
c     dx2    = slope of right end of buffered segment
c     dxx1   = slope of left end of segment
c     dxx2   = slope of right end of segment
c     ixres  = screen x resolution
c     iy     = scan line
c     jbuf   = .true. if a sub-pixel segment is in the pixel buffer
```

```
c       pdx1   = dx1 for sub-pixel segment
c       pdx2   = dx2 for sub-pixel segment
c       psc    = array containing averaged color values for pixel
c       s1     = beginning color values of buffered segment
c       s2     = ending color values of buffered segment
c       sd     = left end color values of previous segment
c       tx1    = beginning x of buffered segment
c       tx2    = ending x of buffered segment
c       txx1   = beginning x of segment
c       txx2   = ending x of segment
c       xlen   = length of segment
c       xlenb  = length of sub-pixel segment
c
c*****************************************************************
c
        common/canti/ antial
        common/neyes/ ixres,iyres,delint
        common/pixbuf/ jbuf,psc,pdx1,pdx2,ib1,xbb,xlenb
        common/segbuf/ s1,s2,tx1,tx2,dx1,dx2,itb1,isb1
        common/shower/ ies,ivb1,color,xleft,xright,shr1,shrr,saml,
       lsamr,rxvalu,rrange,lsterr,iy,icon,shb1,shbr,shgl,shgr
        dimension s1(3),s2(3),psc(3),sx1(3),sx2(3),sd(3),ssc(3)
        logical antial
        logical ies,lsterr,jbuf,one,buffed
        save sd
c
        one=.true.

Mar 11 22:26 1986  outseg.f Page 2 buffed=.false.
c
c*****************************************************************
c      segment bufering - this portion buffers each segment, and compares
c      colors so that many consecutive segments of the same color can be
c      made into one long segment before being sent to srl or aalias.
c*****************************************************************
c
c      if the first segment of the scan line simply buffer it and return
c
        xlena=txx2-txx1
        xlenc=tx2-tx1
        if(txx1.le.0) then
           do 10 i=1,3
              s1(i)= sx1(i)
              s2(i)= sx2(i)
  10       continue
           dx1= dxx1
           dx2= dxx2
           tx1= txx1
           tx2= txx2
           isb1= ivb1
           if(txx2.lt.ixres) return
c
c      are beginning color intensities of present segment equal
c      to ending color intensities of buffered segment?
c
        elseif(abs(sx1(1)-s2(1)).lt.0.01.and.abs(sx1(2)-s2(2)).lt.0.01
     *       .and.abs(sx1(3)-s2(3)).lt.0.01) then
           reint= sx2(1)-((sx2(1)-s1(1))*(txx2-txx1)/(txx2-tx1))
           grint= sx2(2)-((sx2(2)-s1(2))*(txx2-txx1)/(txx2-tx1))
           blint= sx2(3)-((sx2(3)-s1(3))*(txx2-txx1)/(txx2-tx1))
c
c         if linear color variation of both segments are approximately
c         the same add present segment to buffered segment and return
c
           if(abs(reint-sx1(1)).le.2.0.and.abs(grint-sx1(2)).le.2.0.and.
     *        abs(blint-sx1(3)).le.2.0) then
              do 20 i=1,3
                 s2(i)= sx2(i)
  20          continue
              dx2= dxx2
              tx2= txx2
              isb1= ivb1
              if(tx2.lt.ixres) return
c
c         or if the present segment is less than a pixel long, add it to
c         the buffered segment and return
c
           elseif(xlena.lt.1.0) then
              do 21 i=1,3
                 sx2(i)=s2(i)
  21          continue
              dx2=dxx2
              tx2=txx2
              isb1=ivb1
```

Mar 11 22:26 1986 outseg.f Page 3

```
              if(tx2.lt.ixres) return
c
c       or if the buffered segment is less than a pixel long, add the
c       present segment to it and return
c
          elseif(xlenc.lt.1.0) then
              do 22 i=1,3
                  s1(i)=sx1(i)
                  s2(i)=sx2(i)
22            continue
              dx2=dxx2
              tx2=txx2
              isb1=ivb1
              if(tx2.lt.ixres) return
          endif
       endif
c
c       send buffered segment on to be processed.
c
30     continue
       itb1=ivb1
       ivb1=isb1
       xlen=tx2-tx1
c
c****************************************************************
c       pixel buffering - this portion processes any sub-pixel segments
c       that are not the same color as either the preceeding or
c       following segment.
c****************************************************************
c
c       if this is the first segment of the scan line and is at least
c       one pixel output it, otherwise buffer it
c
       if(tx1.le.0) then
          sd(1)=s2(1)
          sd(2)=s2(2)
          sd(3)=s2(3)
          if(xlen.ge.1) then
            if(antial) then
              call aalias(tx1,s1,dx1,tx2,s2,dx2,iy+1)
            else
              call sr1(tx1,s1(1),s1(3),s1(2),tx2,s2(1),s2(3),s2(2),iy+1)
            endif
          else
            xlenb=xlen
            psc(1)= (s1(1)+s2(1))/2
            psc(2)= (s1(2)+s2(2))/2
            psc(3)= (s1(3)+s2(3))/2
            pdx1= dx1
            pdx2= dx2
            ib1= ivb1
            xbb= tx1
            jbuf= .true.
          endif
c
c       else this isnt the first segment of the scan line
```

Mar 11 22:26 1986 outseg.f Page 4

```
c
       else
c
c          is there something in the pixel buffer?
c
          if(jbuf) then
c
c             if the sub-pixel segment crosses a pixel boundary
c             (integer value), determine the color for one pixel using
c             colors of the sub-pixel segment and previous segment
c
              xlef=int(xbb)
              xrite=xlef+1
              if(xlef.lt.int(tx1)) then
c
c                adjust color of sub-pixel segment
c
                 pcnt=xrite-xbb
                 ssc(1)=psc(1)*pcnt
                 ssc(2)=psc(2)*pcnt
                 ssc(3)=psc(3)*pcnt
                 pdx2=0
c
c                add appropriate percentage of previous segment color
c                and send out the one-pixel segment
c
```

```
            pcnt=xbb-xlef
            ssc(1)=ssc(1)+sd(1)*pcnt
            ssc(2)=ssc(2)+sd(2)*pcnt
            ssc(3)=ssc(3)+sd(3)*pcnt
            sd(1)=psc(1)
            sd(2)=psc(2)
            sd(3)=psc(3)
            if(ibl.eq.0.and.ivbl.ne.0) ibl=ivbl
            jvbl= ivbl
            ivbl= ibl
            if(antial) then
               call aalias(xlef,ssc,pdx1,xrite,ssc,pdx2,iy+1)
            else
               call srl(xlef,ssc(1),ssc(3),ssc(2),xrite,ssc(1),
     *                 ssc(3),ssc(2),iy+1)
            endif
            ivbl=jvbl
c
c           if remaining portion of sub-pixel segment + buffered segment
c           is at least one pixel long, find average color of next pixel
c
            if((tx2-xrite).ge.1) then
               xlef=xrite
               xrite=xrite+1
c
c              adjust color of sub-pixel segment
c
               pcnt=tx1-xlef
               ssc(1)=psc(1)*pcnt
               ssc(2)=psc(2)*pcnt
```

```
               ssc(3)=psc(3)*pcnt
               pdx2=dx1
c
c              add appropriate percentage of buffered segment color
c              and send out the one-pixel segment
c
               pcnt=xrite-tx1
               ssc(1)=ssc(1)+sl(1)*pcnt
               ssc(2)=ssc(2)+sl(2)*pcnt
               ssc(3)=ssc(3)+sl(3)*pcnt
               sd(1)=ssc(1)
               sd(2)=ssc(2)
               sd(3)=ssc(3)
               if(ibl.eq.0.and.ivbl.ne.0) ibl=ivbl
               jvbl=ivbl
               ivbl=ibl
               if(antial) then
                  call aalias(xlef,ssc,pdx1,xrite,ssc,pdx2,iy+1)
               else
                  call srl(xlef,ssc(1),ssc(3),ssc(2),xrite,ssc(1),
     *                    ssc(3),ssc(2),iy+1)
               endif
            else
               xlef=xrite
               do 35 i=1,3
  35              sl(i)=psc(i)
            endif
c
c           if sub-pixel segment is within pixel boundaries find colors for
c           one pixel from colors of previous segment, sub-pixel segment, and
c           buffered segment
c
         elseif (int(tx2).ge.xrite) then
c
c           adjust color of sub-pixel segment
c
            pcnt=tx1-xbb
            ssc(1)=psc(1)*pcnt
            ssc(2)=psc(2)*pcnt
            ssc(3)=psc(3)*pcnt
c
c           add appropriate percentage of buffered segment color
c
            pcnt=xrite-tx1
            ssc(1)=ssc(1)+sl(1)*pcnt
            ssc(2)=ssc(2)+sl(2)*pcnt
            ssc(3)=ssc(3)+sl(3)*pcnt
            pdx2=dx1
c
c           add appropriate percentage of previous segment color and
c           send out one-pixel segment
c
            pcnt=xbb-xlef
            ssc(1)=ssc(1)+sd(1)*pcnt
            ssc(2)=ssc(2)+sd(2)*pcnt
            ssc(3)=ssc(3)+sd(3)*pcnt
```

Mar 11 22:26 1986  outseg.f Page 6

```fortran
            sd(1)=ssc(1)
            sd(2)=ssc(2)
            sd(3)=ssc(3)
            if(ibl.eq.0.and.ivbl.ne.0) ibl=ivbl
            jvbl=ivbl
            ivbl=ibl
            if(antial) then
               call aalias(xlef,ssc,pdx1,xrite,ssc,pdx2,iy+1)
            else
               call srl(xlef,ssc(1),ssc(3),ssc(2),xrite,ssc(1),
     *                 ssc(3),ssc(2),iy+1)
            endif
c
c        else if length of sub-pixel segment + buffered segment doesn't
c        exceed a pixel boundary (integer value), update the pixel buffer
c
         else
            ylen=xlen+xlenb
            yy1=xlen/ylen
            yy2=xlenb/ylen
            psc(1)=yy1*(s1(1)+s2(1))/2+psc(1)*yy2
            psc(2)=yy1*(s1(2)+s2(2))/2+psc(2)*yy2
            psc(3)=yy1*(s1(3)+s2(3))/2+psc(3)*yy2
            xlenb=ylen
            pdx2=dx2
            if(ibl.eq.0.and.ivbl.ne.0) ibl=ivbl
            buffed=.true.
         endif
c
c     if the remaining portion of buffered segment is at
c     least one pixel long, save the right end colors and
c     output it
c
         if((tx2-xrite).ge.1.and..not.buffed) then
c
c        find color intensities at left end
c
            do 40 i=1,3
               s1(i)=s1(i)+(s2(i)-s1(i))*(xrite-tx1)/(tx2-tx1)
40          continue
            sd(1)=s2(1)
            sd(2)=s2(2)
            sd(3)=s2(3)
            if(antial) then
               call aalias(xrite,s1,pdx2,tx2,s2,dx2,iy+1)
            else
               call srl(xrite,s1(1),s1(3),s1(2),tx2,s2(1),s2(3),
     *                 s2(2),iy+1)
            endif
            jbuf=.false.
c
c        else save the remaining portion of the buffered segment in
c        the pixel buffer
c
         elseif(.not.buffed) then
            xbb=xrite
```

Mar 11 22:26 1986  outseg.f Page 7

```fortran
            xlen=tx2-xbb
            psc(1)=(s1(1)+s2(1))/2
            psc(2)=(s1(2)+s2(2))/2
            psc(3)=(s1(3)+s2(3))/2
            pdx1=0
            pdx2=dx2
c
c        if this is the last segment of the scan line, output it
c
            if(tx2.ge.ixres)then
               sd(1)=s2(1)
               sd(2)=s2(2)
               sd(3)=s2(3)
               if(antial) then
                  call aalias(xrite,s1,pdx2,tx2,s2,dx2,iy+1)
               else
                  call srl(xrite,s1(1),s1(3),s1(2),tx2,s2(1),
     *                    s2(3),s2(2),iy+1)
               endif
            endif
         endif
         buffed=.false.
c
c     this is all segments other than the first when nothing is
c     buffered
c
      else
```

```
c
c          if long enough or the last segment of the scan line, simply
c          output it
c
           if(xlen.gt.1.or.tx2.ge.ixres) then
              sd(1)=s2(1)
              sd(2)=s2(2)
              sd(3)=s2(3)
              if(antial) then
                 call aalias(tx1,s1,dx1,tx2,s2,dx2,iy+1)
              else
                 call srl(tx1,s1(1),s1(3),s1(2),tx2,s2(1),s2(3),
     *                    s2(2),iy+1)
              endif
c
c          if length of less than 1 pixel, save in pixel buffer
c
           else
              xlenb=xlen
              psc(1)= (s1(1)+s2(1))/2
              psc(2)= (s1(2)+s2(2))/2
              psc(3)= (s1(3)+s2(3))/2
              pdx1=dx1
              pdx2=dx2
              jbuf=.true.
              xbb=tx1
              ibl=ivbl
           endif
         endif
```

Mar 11 22:26 1986 outseg.f Page 8

```
         endif
c
c     if segment just output was not the last segment of the scan line
c     update the segment buffer
c
      if(tx2.lt.ixres) then
         ivbl=itbl
         do 99 i=1,3
            s1(i)= sx1(i)
            s2(i)= sx2(i)
  99     continue
         dx1= dxx1
         dx2= dxx2
         tx1= txx1
         tx2= txx2
         isbl= ivbl
         if((tx2.ge.ixres).and.(one)) then
            one=.false.
            jbuf=.false.
            go to 30
         endif
      endif
      return
      end
```

Feb 19 23:33 1986 packer.f Page 1

```
      subroutine packer(iyt,idy,ix1,ix2,iz1,iz2,icol1,icol2,ip,iprim)
c
c***************************************************************
c
c  subroutine packer - receives data through the argument list and
c          packs it into a storage block inside free. If the edge is a
c          horizontal, then it will be stored on the previous scan line.
c
c***************************************************************
c
c  subprograms called
c      getvar - gets variable length block of free storage
c
c***************************************************************
c
c  variables used
c     ibad    = error parameter
c     ibucky  = bucket sort order
c     icol1   = color value at end one, or node number one
c     icol2   = color value at end two, or node number two
c     idy     = slope value
c     ifree   = free storage
c     ify     = number of scan lines
c     ip      = polygon number belonging to edge
c     ipt     = address to edge information
c     iy      = scan line number
c     moffs   = transparency offset
c     numwrd  = required storage for edge information
c
```

```
c****************************************************************
c
c  packed info in ifree
c     ifree(iedge)   = ix1(11),idy(10)
c     ifree(iedge+1) = iz1(15),iz2(15)
c     ifree(iedge+2) = ix2(11),nextedge(19)
c     ifree(iedge+3) = icol1(24)
c     ifree(iedge+4) = icol2(24)
c     ifree(iedge+5) = iprim(10),ip(15)
c
c****************************************************************
c
      common/bucky/ibucky
      common/neyes/ ifx,ify,delint
      common/free/ifree
      common/qforic/contrs,idvice,ibad,shoshr,lblspc
      dimension ibucky(1024),ifree(475006),rfree(475006)
      equivalence (ifree(1),rfree(1))
      logical contrs,ibad,shoshr
c
c  change iy if this is a horizontal edge
c
      iy=iyt
      if(idy.eq.0) iy=iy+1
      if(iy.gt.ify) iy=ify
      ipt=ibucky(iy)
c
```

Feb 19 23:33 1986  packer.f  Page 2

```
      numwrd=6
c
c  get enough free for edge block
c
      call getvar(ipt,numwrd)
      if(ibad) return
c
c  xbeg(11), delta y(10)
c
      ifree(ipt)=ix1*1024+idy
c
c  zbeg(15), zend(15)
c
      ifree(ipt+1)=iz1*32768+iz2
c
c  xend(11), next edge(19)
c
      ifree(ipt+2)=ix2*524288+ibucky(iy)
c
c  color begin(24) and color end(24)
c
      ifree(ipt+3)=icol1
      ifree(ipt+4)=icol2
c
c  primitive number(10), polygon number(15)
c
      ifree(ipt+5)=iprim*32768+ip
c
      ibucky(iy)=ipt
c
      return
      end
```

Feb 18 21:17 1986  retblk.f  Page 1

```
      subroutine retblk(index)
c
c*****************************************************************c
c                                                                 c
c  subroutine retblk - returns fixed length block to free storage c
c                                                                 c
c*****************************************************************c
c                                                                 c
c  subroutine called by                                           c
c     hidden = determines visible segments                        c
c                                                                 c
c*****************************************************************c
c                                                                 c
c  variables used                                                 c
c     ifree  = free storage                                       c
c     ifrept = pointer to block of data in free                   c
c     index  = location of storage                                c
c                                                                 c
c*****************************************************************c
c                                                                 c
c  variable dimension information for subroutine retblk           c
c  (7) maxfre = maximum size of free storage                      c
c               dimension ifree(maxfre)                           c
c                                                                 c
c*****************************************************************c
```

```
c
      common/core/ifrest,len,ifrept
      common/free/ifree
      dimension ifree(475006)
c
      ifree(index)=0
      ifree(index+1)=ifrept
      ifrept=index
      return
      end
```

Dec 21 22:16 1985  show.f Page 1

```
      subroutine show
c
c*****************************************************************
c
c  subroutine show - evaluates shading information for
c     visible segments
c
c*****************************************************************
c
c  subroutine called by
c     hidden = determines visible segments
c
c*****************************************************************
c
c  subprograms called
c     outseg = outputs segments
c
c*****************************************************************
c
c  variables used
c     delint = light intensity range
c     endb   = end value for blue
c     endg   = end value for green
c     endr   = end value for red
c     ibackg = background color
c     ies    = logical parameter for end of scan line
c     itenlo = low intensity
c     ixres  = x resolution
c     iy     = scan line number
c     saml   = left edge of span being output
c     samr   = right edge of span being output
c     shbl   = starting value for blue color component
c     shbr   = ending value for blue color component
c     shgl   = starting value for green color component
c     shgr   = ending value for green color component
c     shrl   = starting value for red color component
c     shrr   = ending value for red color component
c     stb    = starting value for blue color component at left edge
c               of visible segment
c     stg    = starting value for green color component at left edge
c               of visible segment
c     str    = starting value for red color component at left edge
c               of visible segment
c     xleft  = left edge x coordinate of visible segment
c     xright = right edge x coordinate of visible segment
c
c*****************************************************************
c
      common/prv/ dx2prv
      common/neyes/ ixres,iyres,delint
      common/intens/itenhi,itenlo,ibackg,ifx
      common/shover/ies,ivbl,color,xleft,xright,shrl,shrr,saml,samr
     1,rxvalu,rrange,lsterr,iy,icon,shbl,shbr,shgl,shgr
      logical ies,lsterr
      dimension s1(3),s2(3)
      equivalence (s1(1),str),(s1(2),stg),(s1(3),stb)
```

Dec 21 22:16 1985  show.f Page 2

```
      equivalence (s2(1),endr),(s2(2),endg),(s2(3),endb)
c
      if(samr.gt.ixres) samr=ixres
c
c     go home if end of scan line reached
c
   10 if(saml.ge.ixres) return
      if(saml.ge.samr) go to 60
c
c
      if(ivbl.ne.0) go to 20
      str=float(mod(ibackg,256))
      stb=float(mod(ibackg/256,256))
      stg=float(mod(ibackg/65536,256))
      endr = str
      endb = stb
      endg = stg
      go to 50
```

```
   20 rr = 0.
      rb = 0.
      rg = 0.
      if ( xright.eq.xleft ) go to 30
      x = xright-xleft
      rr = (shrr-shrl)/x
      rb = (shbr-shbl)/x
      rg = (shgr-shgl)/x
c
c*********** color*************
c
c     evaluate the start and end intensities
c
   30 x = saml-xleft
      rtenlo = itenlo
      str = (x*rr+shrl)*delint+rtenlo
      stb = (x*rb+shbl)*delint+rtenlo
      stg = (x*rg+shgl)*delint+rtenlo
      x = samr-xleft
      endr = (x*rr+shrl)*delint+rtenlo
      endb = (x*rb+shbl)*delint+rtenlo
      endg = (x*rg+shgl)*delint+rtenlo
c
c     output the segment
c
   50 fuzz=rrange
      if(saml.eq.0.0) dx2prv=0.0
      if(samr.ge.ixres) fuzz=0.0
      dx2p=dx2prv
      call outseg(saml,samr,s1,s2,dx2p,fuzz)
      dx2prv=fuzz
c
c     go home if this is not the end of the scan line
c
   60 if(.not.ies) return
      ivbl=0
      saml=samr
      samr=ixres
```

Dec 21 22:16 1985  shov.f Page 3

```
      go to 10
      end
```

Jan 29 00:26 1986  solset.f Page 1

```
      subroutine solset
c
c*****************************************************************
c
c  subroutine solset initializes output for Solidview
c
c*****************************************************************
c
c  subroutine called by
c     main
c
c*****************************************************************
c
c  variables used:
c     solid = true if output is through Solidview
c     kxmax = maximum X screen resolution
c     kymax = maximum Y screen resolution
c     kzmax = maximum Z screen resolution
c
c*****************************************************************
c
      common /devi/ input,output
      common /enter/ n1,n2,key,xnum,k1,k2
      common /text0/ nchar
c
      common /hidm/   solid
      common /line/   sview,tekt,linec
      common /solres/ kxmax,kymax,kzmax,kxmin,kymin,kzmin
      common /view/ nxl,nxr,nyb,nyt,zf,zb,ivf,vmat
      dimension vmat(4,4)
      dimension key(10),xnum(40),iwrd(12)
      character*1 iwrd
      logical solid,sview,tekt
      integer output
      data iwrd/'Y','#','#','#', 'S','O','L','I', 'T','E','K','T'/
      n=12
c
c  prompt for line drawing option
c
      write(output,100)
      n1=1
      n2=0
```

```fortran
        call readin(ivrd,n)
        lit=(key(1)+3)/4
        if (lit.eq.1) then
          write(output,110)
          call readin(ivrd,n)
          lit=(key(1)+3)/4
          if (lit.eq.2) then
            tekt=.false.
            sview=.true.
          else if (lit.eq.3) then
            sview=.false.
            tekt=.true.
          end if
        else
```

Jan 29 00:26 1986 solset.f Page 2

```fortran
          sview=.false.
          tekt=.false.
        end if
c
c  Solidview initializations
c
        kxmax=639
        kymax=511
        kzmax=4095
        solid=.true.
c
c  re-initialize viewport
c
        nxl=64
        nxr=575
        nyb=511
        nyt=0
        call scalef
c
 100    format('<Line drawing output?> ',$)
 110    format('<SOLIdview or TEKTronix> ',$)
        return
        end
```

Feb 19 23:35 1986 unpack.f Page 1

```fortran
        subroutine unpack(found)
c
c***********************************************************************
c
c  subroutine unpack - unpacks data from storage for use by hidden
c
c***********************************************************************
c
c  subroutine called by
c      hidden = determines visible segments
c
c***********************************************************************
c
c  variables used
c      icol1  = color value or node number at end one
c      icol2  = color value or node number at end two
c      idely  = number of scan lines edge is active
c      iedgpt = edge pointer
c      ifree  = free storage
c      iprim  = primitive number
c      ipt    = polygon number
c      s1,s2  = beginning and ending intensity values for segment
c      x1,x2  = beginning and ending x coordinate values for segment
c      z1,z2  = beginning and ending z coordinate values for segment
c
c***********************************************************************
c
c  variable dimension information for subroutine unpack
c  (7) maxfre = maximum size of free storage
c               dimension ifree(maxfre)
c
c***********************************************************************
c
c  packed info in ifree
c      ifree(iedge)   = ix1(11),idy(10)
c      ifree(iedge+1) = iz1(15),iz2(15)
c      ifree(iedge+2) = ix2(11),nextedge(19)
c      ifree(iedge+3) = icol1(24)
c      ifree(iedge+4) = icol2(24)
c      ifree(iedge+5) = iprim(10),ipt(15)
c
c***********************************************************************
c
        common/edgblk/ipt,icol1,idely,x1,x2,z1,z2,s1,s2,iedgpt,c1,c2,
     1 ishared,igthrz,icol2,itra1,itra2,iprim
```

```
      common/free/ifree
      dimension ifree(475006),rfree(475006)
      equivalence (ifree(1),rfree(1))
      logical found
c
c  get delta Y value
c
  10  continue
      idely=mod(ifree(iedgpt),1024)
c
      if(idely.le.0) then
```

Feb 19 23:35 1986  unpack.f Page 2

```
c
c  get next edge block (we won't do anything with an edge when idely=0)
c
         iedgpt=mod(ifree(iedgpt+2),524288)
c
c  if we ran off the end of the list - return, else try again
c
         if(iedgpt.le.0) then
            found=.false.
            return
         else
            go to 10
         end if
c
c  found a positive delta Y - unload edge from free
c
      else
         found=.true.
c
c  get Z begin and Z end - make them real
c
         z1=float(ifree(iedgpt+1)/32768)
         z2=float(mod(ifree(iedgpt+1),32768))
c
c  get X begin and X end - make them real
c
         x1=float(ifree(iedgpt)/1024)
         x2=float(ifroe(iedgpt+2)/524288)
c
c  get primitive and polygon number
c
         iprim=ifree(iedgpt+5)/32768
         ipt=mod(ifree(iedgpt+5),32768)
c
c  get the color of this edge
c
         icol1=ifree(iedgpt+3)
         icol2=ifree(iedgpt+4)
c
c  get pointer to next edge on scan line
c
         iedgpt=mod(ifree(iedgpt+2),524288)
      end if
c
      return
      end
```

Jan 24 18:25 1986  scalef.f Page 1

```
      subroutine scalef
c
c************************************************************************
c
c  subroutine scalef - makes the scale factors for perspective trans-
c                      formation and conversion to screen coordinates
c
c************************************************************************
c
c  subroutine called by
c     initv - initializes viewing parameters
c     window - controls the selection of 3D viewing parameters
c
c************************************************************************
c
c  variables used
c     aax = horizontal aperature angle
c     aay = vertical aperature angle
c     kzmax = maximum Z screen resolution
c     nxl = X screen coordinate of left side of viewport
c     nxr = X screen coordinate of right side of viewport
c     nyb = Y screen coordinate of bottom of viewport
c     nyt = Y screen coordinate of top of viewport
c     xc1 = X coordinate of lower left window corner
c     xc2 = X coordinate of upper right window corner
```

```
c       yc1 = Y coordinate of lower left window corner
c       yc2 = Y coordinate of upper right window corner
c       zf  = front clipping plane
c       zb  = back clipping plane
c
c*******************************************************************
c
        common /view/ nxl,nxr,nyb,nyt,zf,zb,ivf,vmat
        common /wind/ xe,ye,ze,xa,ya,za,xc1,yc1,xc2,yc2,aax,aay
        common /scalf/ sf0,sf1,sf2,sf3,sf4,sf5,sf6,sf7,sf8,sf9,sf10,sf11
        common /solres/ kxmax,kymax,kzmax,kxmin,kymin,kzmin
        dimension vmat(4,4)
        data pi/3.141592654/
c
        ax=(aax*pi)/180.0
        ay=(aay*pi)/180.0
        sf0=(1.0-(zf/zb))
        sf1=sin(ax)/cos(ax)
        sf2=sin(ay)/cos(ay)
        sf3=real(kzmax)/(zb-zf)
        sf4=(nxr-nxl)/(xc2-xc1)
        sf5=(nyt-nyb)/(yc2-yc1)
        sf6=nxl-(xc1*sf4)
        sf7=nyb-(yc1*sf5)
        sf8=(nxr-nxl)/2.0
        sf9=(nyt-nyb)/2.0
        sf10=nxl+sf8
        sf11=nyb+sf9
c
        return
        end Dec  3 18:12 1985  setbgd.f Page 1 subroutine setbgd
c
c*******************************************************************
c
c  subroutine setbgd - sets the background color
c
c*******************************************************************
c
c  subroutine called by
c     color - controls definition of the light and color parameters
c
c*******************************************************************
c
c  subroutines called
c     dslvt - Lexidata library routine for writing to lookup table
c
c*******************************************************************
c
c  variables used
c     bgr,bgg,bgb = RGB components of the background color
c
c*******************************************************************
c
        common /bgrdc/ bgr,bgg,bgb
c
c  write to location 0 of 12 bit Lexidata lookup table
c
        lutmax=4096
        ir=lutmax
        ig=2*lutmax
        ib=3*lutmax
        intr=nint(255*bgr)
        intg=nint(255*bgg)
        intb=nint(255*bgb)
        call dslvt(ir,1,intr)
        call dslvt(ig,1,intg)
        call dslvt(ib,1,intb)
c
        return
        end Feb 19 20:10 1986  subadp.f Page 1 subroutine subadp(iprim,nlim,ntord)
c
c*******************************************************************
c
c  subroutine subadp - performs the adaptive subdivision
c
c*******************************************************************
c
c  subroutine called by
c     prim - processes each primitive
```

```
c
c*****************************************************************
c
c  subroutines called
c     appdef - applies deformation to a node
c     cnorm  - calculates triangle normals
c     ortsc  - calculates orthogonal projection screen coordinates
c     persc  - calculates perspective screen coordinates
c     subdiv - subdivides a triangular element
c     subtes - tests if a triangle needs subdivision
c
c*****************************************************************
c
c  variables used
c     iprim  = kind of primitive number
c     isubst = stack containing all triangles to be subdivided
c     itopst = top of isubst
c     ittest = triangle being tested if it needs to be subdivided
c     lastel = last element
c     lastno = last node
c     mtri   = list of elements that need modification after subdivision
c     mtric  = number in mtri list
c     nlim   = number of transf. & deform. in ntord
c     ntord  = transformation and deformation order
c     subd   = true is subtes found it needed to be subdivided
c
c*****************************************************************
c
      common /latest/ lastel,lastno
      common /ntriar/ itriar,rnodes,node,trind
      common /stack/  lstack,inst,itoppo
      common /tranar/ tran,lastt
      common /view/   nxl,nxr,nyb,nyt,zf,zb,ivf,vmat
      dimension vmat(4,4)
      dimension tran(4,4,12)
      dimension ntord(20),isubst(8000),mtri(8000),lstack(4000,2)
      dimension itriar(8000,10),rnodes(8000,9),node(8000,13),
     1 trind(8000,3)
      logical subd
c
c  all initial triangles go on subdivision stack
c
      do 10 i=1,lastel
        isubst(i)=i
   10 continue
      itopst=lastel Feb 19 20:10 1986  subadp.f Page 2 c
c  operate on stack until it is empty
c
   20 continue
      ittest=isubst(itopst)
      itopst=itopst-1
c
c  loop until ittest passses suddivision test
c
   30 continue
      call subtes(subd,ittest)
      if (subd) then
        lstnoo=lastno
        lstelo=lastel
        call subdiv(ittest,iprim)
c
c  pass all new nodes thru deformations & transformations
c
        do 50 i=lstnoo+1,lastno
          do 40 j=1,nlim
            num=ntord(j)
            if (num.gt.0) then
              rx=rnodes(i,1)
              ry=rnodes(i,2)
              rz=rnodes(i,3)
              rnodes(i,1)=tran(1,1,num)*rx+tran(2,1,num)*ry
     1                   +tran(3,1,num)*rz+tran(4,1,num)
              rnodes(i,2)=tran(1,2,num)*rx+tran(2,2,num)*ry
     1                   +tran(3,2,num)*rz+tran(4,2,num)
              rnodes(i,3)=tran(1,3,num)*rx+tran(2,3,num)*ry
     1                   +tran(3,3,num)*rz+tran(4,3,num)
            else
              call appdef(rnodes(i,1),rnodes(i,2),rnodes(i,3),num)
            end if
   40     continue
   50   continue
c
c  convert to screen space all new nodes
c
        if (ivf.eq.0) then
```

```
              do 60 i=lstnoo+1,lastno
                call ortsc(rnodes(i,1),rnodes(i,2),rnodes(i,3),node(i,11),
     1                     node(i,12),node(i,13))
   60         continue
            else
              do 70 i=lstnoo+1,lastno
                call persc(rnodes(i,1),rnodes(i,2),rnodes(i,3),node(i,11),
     1                     node(i,12),node(i,13))
   70         continue
            end if
c
c   get list of all new triangles and altered ones during subdivision
c
            mtri(1)=ittest
            mtri(2)=itoppo
            mtric=2
```

Feb 19 20:10 1986  subadp.f Page 3

```
            do 80 i=lstelo+1,lastel
              mtric=mtric+1
              mtri(mtric)=i
   80       continue
            do 90 i=1,inst
              if (istack(i,1).ne.-1) then
                mtric=mtric+1
                mtri(mtric)=istack(i,1)
              end if
              if (istack(i,2).ne.-1) then
                mtric=mtric+1
                mtri(mtric)=istack(i,2)
              end if
   90       continue
c
c   find all triangle normals and delta X and Y screen coord.
c     for all the new or modified ones
c
            do 100 j=1,mtric
              i=mtri(j)
              call cnorm(i)
              is1x=abs(node(itriar(i,1),11)-node(itriar(i,2),11))
              is2x=abs(node(itriar(i,2),11)-node(itriar(i,3),11))
              is3x=abs(node(itriar(i,3),11)-node(itriar(i,1),11))
              itriar(i,9)=max(is1x,is2x,is3x)
              is1y=abs(node(itriar(i,1),12)-node(itriar(i,2),12))
              is2y=abs(node(itriar(i,2),12)-node(itriar(i,3),12))
              is3y=abs(node(itriar(i,3),12)-node(itriar(i,1),12))
              itriar(i,10)=max(is1y,is2y,is3y)
  100       continue
c
c   push all new triangles on the stack
c
            do 110 i=lstelo+1,lastel
              itopst=itopst+1
              isubst(itopst)=i
  110       continue
c
c   stop loop if ittest passes test
c
          else
            go to 120
          end if
          go to 30
  120   continue
c
c   continue operating on stack if not empty
c
        if (itopst.ne.0) go to 20
c
        return
        end
```

Feb 25 19:26 1986  subch.f Page 1

```
      subroutine subch
c
c***************************************************************
c
c  subroutine subch - controls selection of adaptive subdivision factors
c
c***************************************************************
c
c  subroutine called by
c     main
c
c***************************************************************
c
c  subroutines called
c     readin - analyzes user input
c
c***************************************************************
```

```
c
c   variables used
c      facn  = normal factor - minimum cosine between two normals
c      isfac = screen factor - largest difference in pixels
c      minsub = minimum number of subdivisions (a neg. value - it
c               is the absolute number of subdivisions)
c
c*******************************************************************
c
      common /devi/ input,output
      common /enter/ n1,n2,key,xnum,k1,k2
      common /text0/ nchar
c
      common /adapt/ facn,isfac,minsub
      character*1 ivrd
      dimension key(10),xnum(40),ivrd(28)
      integer output
      data ivrd/'M','I','N','I',   'F','I','X','#',  'S','C','R','E',
     1'N','O','R','M',  'E','X','I','T',  'L','S','#','#',
     2'H','E','L','P'/
      n=28
c
c   prompt for subd option
c
   10 continue
      write(output,310)
      n1=1
      n2=0
      call readin(ivrd,n)
      if(nchar.eq.0) go to 290
      lit=(key(1)+3)/4
c
c   lit=1  mini       lit=2  fix      lit=3  scre      lit=4  norm
c   lit=5  exit       lit=6  inqu (ls) lit=7 help
c
      goto(20,40,60,80,299,100,120),lit
      go to 290
c
c   minimum option
c
   20 continue
      write(output,320)
      n1=0
      n2=1
      call readin(ivrd,n)
      if (nchar.ne.0) then
         if ((xnum(1).ge.0.0).and.(xnum(1).lt.20.0))
     1         minsub=nint(xnum(1))
      end if
      go to 290
c
c   fix option
c
   40 continue
      write(output,330)
      n1=0
      n2=1
      call readin(ivrd,n)
      if(nchar.ne.0) then
         if ((xnum(1).ge.0.0).and.(xnum(1).lt.20.0))
     1         minsub=-nint(xnum(1))
      end if
      go to 290
c
c   screen option
c
   60 continue
      write(output,340)
      n1=0
      n2=1
      call readin(ivrd,n)
      if(nchar.ne.0) then
         if ((xnum(1).gt.0.0).and.(xnum(1).lt.640.0))
     1         isfac=nint(xnum(1))
      end if
      go to 290
c
c   normal option
c
   80 continue
      write(output,350)
      n1=0
      n2=1
      call readin(ivrd,n)
      if(nchar.ne.0) then
         if ((xnum(1).ge.-1.0).and.(xnum(1).le.1.0)) facn=xnum(1)
      end if
      go to 290
```

```
c
c  inquire (ls) option
c
  100  continue
       if (minsub.lt.0) then
          write(output,360) abs(minsub)
       else
```

Feb 25 19:26 1986  subch.f Page 3

```
          write(output,370) minsub,facn,isfac
       end if
       go to 290
c
c  help option
c
  120  continue
       write(output,380)
c
  290  continue
       go to 10
c
c  exit option
c
  299  continue
c
  310  format('<CSG>SUBD> ',$)
  320  format('<Enter minimum number of subdivisions> ',$)
  330  format('<Enter fixed number of sudivisions> ',$)
  340  format('<Enter maximum delta screen space> ',$)
  350  format('<Enter minimum cosine value (0.0 - 1.0)> ',$)
  360  format('<',i2,' Subdivisions are fixed for each primitive>')
  370  format('<A minimum of ',i2,' subdivisions with',/,
     1         '    a minimum cosine factor of ',f7.4,' and',/,
     2         '    a maximum delta srceen space of ',i3,' pixels>')
  380  format('<Available commands:',/,
     1'     EXIT - Exit SUBD level.',/,
     2'     FIX  - Fix the number of subdivisions,',/,
     3'     LS   - List all adaptive subdivison parameters,',/,
     4'     MINI - Set minimum number of subdivisions,',/,
     5'     NORM - Set minimum difference in cosine between ',/,
     6'            normals of the triangle and its neighbors,',/,
     7'     SCRE - Set maximum delta screen space for each triangle>')
c
       return
       end
```

Feb 19 20:11 1986  subdiv.f Page 1

```
       subroutine subdiv(ntrit,iprim)
c
c*****************************************************************
c
c  subroutine subdiv - recursively subdivides triangle ntrit
c
c*****************************************************************
c
c  subroutine called by
c      prim - processes a primitive
c
c*****************************************************************
c
c  subprograms called
c      break = branches to the primitive routine that subdivides two
c              triangles into four
c
c*****************************************************************
c
c  variables used
c      inst   = number in stack
c      iprim  = primitive number
c      istack = stack containing triangles to be subdivided
c      itriar = array of triangle information
c      lastel = last triangle made
c      ntri   = triangle to be subdivided
c      ntrit  = input triangle to be subdivided
c
c*****************************************************************
c
       common /latest/ lastel,lastno
       common /ntriar/ itriar,rnodes,node,trind
       common /stack/  istack,inst,itoppo
       dimension itriar(8000,10),rnodes(8000,9),node(8000,13),
     1 trind(8000,3)
       dimension istack(4000,2)
c
       ntri=ntrit
       inst=0
   10  continue
```

```
c
c    if ntri and ntri's neighbor to the long side don't have common long
c    side edges then subdivide ntri's neighbor.  recursion is simulated
c    by keeping a stack of triangles to be subdivided.
c
        if (itriar(itriar(ntri,5),5).ne.ntri) then
           inst=inst+1
           istack(inst,2)=ntri
c
c    after subdivision of a neighbor, keep track of which one is to be
c    subdivided again (reconstructed one or the new one)
c
           if (itriar(itriar(ntri,5),4).eq.ntri) then
              istack(inst,1)=itriar(ntri,5)
           else
              istack(inst,1)=-1
```

```
           end if
           ntri=itriar(ntri,5)
           go to 10
        else
c
c    found two adjacent long sides - subdivide and empty the stack
c
           itoppo=itriar(ntri,5)
           call break(itoppo,ntri,iprim)
           do 20 i=inst,1,-1
              ndum1=istack(i,1)
              ndum2=istack(i,2)
              call break(ndum1,ndum2,iprim)
  20       continue
        end if
c
        return
        end
```

```
        subroutine subtes(subd,it)
c
c**************************************************************
c
c    subroutine subtes - tests if a triangle needs to be subdivided
c
c**************************************************************
c
c    subroutine called by
c
c
c**************************************************************
c
c    variables used
c       it    = triangle to be subdivided
c       subd  = true if it needs to be subdivided
c       facn  = normal factor - minimum cosine between two normals
c       isfac = screen factor - largest difference in pixels
c
c**************************************************************
c
        common /adapt/ facn,isfac,minsub
        common /neyes/ ifx,ify,delint
        common /ntriar/ itriar,rnodes,node,trind
        dimension itriar(8000,10),rnodes(8000,9),node(8000,13),
     1  trind(8000,3)
        logical subd
c
c    test screen factor
c
        if (ify.eq.1024) then
           ifac=isfac*2
        else
           ifac=isfac
        end if
        if ((itriar(it,9).gt.ifac).or.(itriar(it,10).gt.ifac)) then
           subd=.true.
           return
        end if
c
c    test normal with neighbors
c       if neighbor is an edge - dot product = 1
c
        if ((itriar(it,7).eq.1).or.(itriar(it,7).eq.4)) then
           d1=1.0
        else
           d1=abs(trind(it,1)*trind(itriar(it,4),1)+
     1     trind(it,2)*trind(itriar(it,4),2)+
     2     trind(it,3)*trind(itriar(it,4),3))
```

```
      end if
      if (d1.ge.facn) then
        if (itriar(it,7).eq.2) then
          d2=1.0
        else
          d2=abs(trind(it,1)*trind(itriar(it,5),1)+
     1         trind(it,2)*trind(itriar(it,5),2)+
```

Feb 19 22:18 1986  subtes.f Page 2

```
     2         trind(it,3)*trind(itriar(it,5),3))
        end if
        if (d2.ge.facn) then
          if ((itriar(it,7).eq.3).or.(itriar(it,7).eq.4)) then
            d3=1.0
          else
            d3=abs(trind(it,1)*trind(itriar(it,6),1)+
     1           trind(it,2)*trind(itriar(it,6),2)+
     2           trind(it,3)*trind(itriar(it,6),3))
          end if
          if (d3.ge.facn) then
            subd=.false.
            return
          end if
        end if
      end if
      subd=.true.
c
      return
      end
```

Nov 22 21:21 1985  tconc.f Page 1

```
      subroutine tconc(itord,ibeg,iend,itrno)
c
c*****************************************************************
c
c  subroutine tconc - concatenates transformations as specified by the
c                     ibeg and iend pointers in the itord list
c
c
c*****************************************************************
c
c  subroutine called by
c     tdord - finds the order of the deformations and transformations
c
c*****************************************************************
c
c  variables used
c     itord = array containing order of deformations and transformations
c     ibeg  = first transformation in itord array to be concatenated
c     iend  = last transformation in itord array to be concatenated
c     itrno = transformation number to hold concatenated matrix
c
c*****************************************************************
c
      common /tranar/ tran,lastt
      dimension tran(4,4,12)
      dimension itord(20),tmat(4,4),tmast(4,4)
c
c  concatenating - use tmast as the accumulator and tmat as dummy
c
      do 20 i=1,4
        do 10 j=1,4
          tmast(i,j)=tran(i,j,itord(ibeg))
   10   continue
   20 continue
c
      do 100 l=ibeg+1,iend
        do 40 i=1,4
          do 30 j=1,4
            tmat(i,j)=0.0
   30     continue
   40   continue
c
        do 70 i=1,4
          do 60 j=1,4
            do 50 k=1,4
              tmat(i,j)=tmat(i,j)+tmast(i,k)*tran(k,j,itord(l))
   50       continue
   60     continue
   70   continue
c
        do 90 i=1,4
          do 80 j=1,4
            tmast(i,j)=tmat(i,j)
   80     continue
   90   continue
  100 continue
c
```

Nov 22 21:21 1985 tconc.f Page 2

```
      do 120 i=1,4
        do 110 j=1,4
          tran(i,j,itrno)=tmast(i,j)
110     continue
120   continue
c
      return
      end
```

Feb 15 21:03 1986 tdord.f Page 1

```
      subroutine tdord(iptr,itree,itop,ntord,nlim)
c
c***********************************************************************
c
c  subroutine tdord - finds the order of deformations and
c                     transformations (combines consecutive transformations)
c
c***********************************************************************
c
c  subroutine called by
c     prim - controls the processings of a primitive
c
c***********************************************************************
c
c  subroutine called
c     tconc - concatenates trnaformations
c
c***********************************************************************
c
c  variables used
c     iptr  = pointer to tnode of primitive to be processed
c     itree = stack containing tree path from a primitive to the head
c     itop  = top of itree stack
c     itord = order of transformations and deformations
c     lastt = last transformation in the transformation array
c     ntord = updated order of transformations and deformations
c     nlim  = size of order array
c     tnode = array containing all the nodal info of the CSG tree
c
c***********************************************************************
c
      common /tnodes/ tnode,nend,nhead
      common /tranar/ tran,lastt
      integer tnode(118)
      dimension itree(10,2)
      dimension tran(4,4,12)
      dimension ntord(20),itord(20)
c
c  add defs and trans on primitive to itord list
c
      k=0
      do 10 i=1,tnode(iptr+3)
        k=k+1
        itord(k)=tnode(iptr+3+i)
10    continue
c
c  traverse up the tree (itree stack) and add each def and tran to list
c
      do 30 i=itop,1,-1
        do 20 j=1,tnode(itree(i,1)+4)
          k=k+1
          itord(k)=tnode(itree(i,1)+4+j)
20      continue
30    continue
c
c  tack viewing transformation (to eye coord.) at the end
```

Feb 15 21:03 1986 tdord.f Page 2

```
c
      itord(k+1)=lastt
      ilim=k+1
c
c  redo itord list - combine consecutive transformations
c       k keeps track of current itord element
c       l keeps track of current ntord element
c
      k=1
      l=1
      itempt=0
c
c  do while k is less than or equal to ilim
c
40    continue
      if (k.le.ilim) then
        if (itord(k).lt.0) then
c
c  found a deformation
```

```
c
              ntord(l)=itord(k)
              k=k+1
            else
              if ((k+1.gt.ilim).or.(itord(k+1).lt.0)) then
c
c   if this is the last one or the next one is a deformation
c
                ntord(l)=itord(k)
                k=k+1
              else
c
c   find a streak of transformations
c
                ibeg=k
                do 50 i=ibeg+1,ilim
                  if (itord(i).lt.0) then
                    iend=i-1
                    go to 60
                  end if
50              continue
                iend=ilim
60              continue
                itempt=itempt+1
                itrno=lastt+itempt
c
c   concatenate trans ibeg thru iend and put it in tran as no. itrno
c
                call tconc(itord,ibeg,iend,itrno)
                ntord(l)=itrno
                k=iend+1
              end if
            end if
            l=l+1
            go to 40
          end if
c
```

```
c   end do while
c
      nlim=l-1
c
      return
      end
```

```
      subroutine tree
c
c*****************************************************************
c
c   subroutine tree - traverses the tree and controls the processing of
c                     the nodes
c
c*****************************************************************
c
c   subroutine called by
c      main
c
c*****************************************************************
c
c   subroutines called
c      up   -
c      down -
c      prim - processes each primitive
c
c*****************************************************************
c
c   variables used
c      itree = stack containing tree path from a primitive to the head
c      nend  = end of tnode
c      nhead = pointer to head node in tnode
c      tnode = array containing all the nodal info of the CSG tree
c
c*****************************************************************
c
      common /csgkey/ ikey,ikeyno,noprim
      common /tnodes/ tnode,nend,nhead
      integer tnode(118)
      dimension itree(10,2),ikey(100,3)
      logical headup,fin
c
      noprim=0
c
c   initialize stack
c
      itree(1,1)=nhead
      itree(1,2)=0
      itop=1
      headup=.true.
```

```
            fin=.false.
c
c   check if head node is a primitive
c
            if (tnode(nhead).lt.0) then
              noprim=1
              call prim(nhead,itree,0)
            else
c
c   do while not fin
c
   10       continue
                if (headup) then
```

```
                    call up(itree,itop,headup)
                else
                    call down(itree,itop,headup,fin)
                end if
                if (.not.fin) go to 10
            end if
c
            return
            end
c
            subroutine up(itree,itop,headup)
            common /csgkey/ ikey,ikeyno,noprim
            common /tnodes/ tnode,nend,nhead
            integer tnode(118)
            dimension itree(10,2),ikey(100,3)
            logical headup
c
   10       continue
                ichild=tnode(itree(itop,1)+itree(itop,2)+2)
                if (tnode(ichild).lt.0) then
                    noprim=noprim+1
                    call prim(ichild,itree,itop)
                    headup=.false.
                    return
                else
                    itop=itop+1
                    itree(itop,1)=ichild
                    itree(itop,2)=0
                end if
            go to 10
            end
c
            subroutine down(itree,itop,headup,fin)
            dimension itree(10,2)
            logical headup,fin
c
   10       continue
                if (itree(itop,2).eq.1) then
                    if (itop.eq.1) then
                        fin=.true.
                        return
                    else
                        itop=itop-1
                        go to 10
                    end if
                else
                    itree(itop,2)=1
                    headup=.true.
                    return
                end if
            end
```

```
        subroutine tree2
c
c*******************************************************************
c
c   subroutine tree2 - traverses the tree and sets up order for combining
c                      primitives for solving the visible CSG problem
c
c*******************************************************************
c
c   subroutine called by
c
c
c*******************************************************************
c
c   subroutines called
c       up2   -
c       down2 -
c
c*******************************************************************
c
c   variables used
c       itree = stack containing tree path from a primitive to the head
c       nend  = end of tnode
c       nhead = pointer to head node in tnode
c       tnode = array containing all the nodal info of the CSG tree
```

```
      common /csgkey/ ikey,ikeyno,noprim
      common /tnodes/ tnode,nend,nhead
      integer tnode(118)
      dimension itree(10,4),ikey(100,3)
      logical headup,fin
c
c  initialize stack
c
      itree(1,1)=nhead
      itree(1,2)=0
      itop=1
      headup=.true.
      fin=.false.
      ikeyno=0
      iprimco=0
c
c  check if head node is a primitive
c
      if (tnode(nhead).lt.0) then
         return
      else
c
c  do while not fin
c
  10     continue
         if (headup) then
            call up2(itree,itop,headup,iprimco)
         else
```

Feb 14 17:04 1986  tree2.f Page 2

```
            call down2(itree,itop,headup,fin)
         end if
         if (.not.fin) go to 10
      end if
c
      return
      end
c
      subroutine up2(itree,itop,headup,iprimco)
      common /tnodes/ tnode,nend,nhead
      integer tnode(118)
      dimension itree(10,4)
      logical headup
c
  10  continue
      ichild=tnode(itree(itop,1)+itree(itop,2)+2)
      if (tnode(ichild).lt.0) then
         iprimco=iprimco+1
         itree(itop,itree(itop,2)+3)=iprimco
         headup=.false.
         return
      else
         itop=itop+1
         itree(itop,1)=ichild
         itree(itop,2)=0
      end if
      go to 10
      end
c
      subroutine down2(itree,itop,headup,fin)
      common /csgkey/ ikey,ikeyno,noprim
      common /tnodes/ tnode,nend,nhead
      dimension itree(10,4),ikey(100,3)
      integer tnode(118)
      logical headup,fin
c
  10  continue
      if (itree(itop,2).eq.1) then
         ikeyno=ikeyno+1
         ikey(ikeyno,1)=itree(itop,3)
         ikey(ikeyno,2)=itree(itop,4)
         ikey(ikeyno,3)=tnode(itree(itop,1)+1)
         if (itop.eq.1) then
            fin=.true.
            return
         else
            itop=itop-1
            itree(itop,itree(itop,2)+3)=ikeyno+noprim
            go to 10
         end if
      else
         itree(itop,2)=1
         headup=.true.
         return
      end if
      end
```

```
      subroutine viewtr
c
c*********************************************************************
c
c  subroutine viewtr - creates the viewing matrix that converts world to
c                      eye coordinates
c
c*********************************************************************
c
c  subroutine called by
c     initv  - initializes the viewing parameters
c     window - interactive routine that controls 3D viewing options
c
c*********************************************************************
c
c    variables:
c       xa,ya,za = look at location
c       xe,ye,ze = look from location
c       vmat = viewing matrix
c
c*********************************************************************
c
      common /view/ nxl,nxr,nyb,nyt,zf,zb,ivf,vmat
      common /wind/ xe,ye,ze,xa,ya,za,xc1,yc1,xc2,yc2,aax,aay
      dimension vmat(4,4)
c
      x=xe-xa
      y=ye-ya
      z=ze-za
      t=sqrt(x**2+z**2)
      w=sqrt(t**2+y**2)
      zot=1.
      xot=0.
      if(t.gt.0.001.or.t.lt.-0.001)then
         zot=z/t
         xot=x/t
      end if
      tow=1.
      yow=0.
      if(w.gt.0.001.or.w.lt.-0.001)then
         tow=t/w
         yow=y/w
      end if
c
      vmat(1,1)=zot
      vmat(1,2)=-xot*yow
      vmat(1,3)=-xot*tow
      vmat(1,4)=0.0
      vmat(2,1)=0.0
      vmat(2,2)=tow
      vmat(2,3)=-yow
      vmat(2,4)=0.0
      vmat(3,1)=-xot
      vmat(3,2)=-zot*yow
      vmat(3,3)=-zot*tow
      vmat(3,4)=0.0 vmat(4,1)=-xe*zot+ze*xot
      vmat(4,2)=-ye*tow+(xot*xe-ze*zot)*yow
      vmat(4,3)=ye*yow+(xot*xe-ze*zot)*tow
      vmat(4,4)=1.0
c
      return
      end subroutine window
c
c*********************************************************************
c
c  subroutine window - controls the windowing and viewport parameters
c
c*********************************************************************
c
c  subroutine called by
c     main
c
c*********************************************************************
c
c  subroutines called
c     inqv   - prints out 3D viewing parameters
c     scalef - sets factors for perspective transformation and screen
c              conversion
c     viewtr - creates the world to eye viewing matrix
c     readin - analyzes user input
c
c*********************************************************************
```

```
c
c   variables used
c     xa,ya,za = look from position
c     xe,ye,ze = look at position
c     aax = horizontal aperature angle
c     aay = vertical aperature angle
c     ivf = 0 for orthogonal; = 1 for perspective projection
c     nxl = X screen coordinate of left side of viewport
c     nxr = X screen coordinate of right side of viewport
c     nyb = Y screen coordinate of bottom of viewport
c     nyt = Y screen coordinate of top of viewport
c     xc1 = X coordinate of lower left window corner
c     xc2 = X coordinate of upper right window corner
c     yc1 = Y coordinate of lower left window corner
c     yc2 = Y coordinate of upper right window corner
c     zf  = front clipping plane
c     zb  = back clipping plane
c
c*****************************************************************
c
      common /devi/ input,output
      common /enter/ n1,n2,key,xnum,k1,k2
      common /text0/ nchar
c
      common /hidm/   solid
      common /neyes/  ifx,ify,delint
      common /solres/ kxmax,kymax,kzmax,kxmin,kymin,kzmin
      common /tranar/ tran,lastt
      common /view/ nxl,nxr,nyb,nyt,zf,zb,ivf,vmat
      common /wind/ xe,ye,ze,xa,ya,za,xc1,yc1,xc2,yc2,aax,aay
      character*1 iwrd
      dimension tran(4,4,12)
      dimension key(10),xnum(40),iwrd(40),vmat(4,4)
      logical solid
      integer output
```

Feb 16 01:21 1986 window.f Page 2

```
      data iwrd/'W','I','N','D',  'V','I','E','W',  'L','S','#','#',
     1'P','E','R','S', 'L','O','O','K', 'A','P','E','R',
     2'E','X','I','T', 'H','E','L','P', 'P','O','R','T',
     3'Y','#','#','#'/
      n=40
c
c   prompt for viewing option
c
   10 continue
      write(output,310)
      n1=1
      n2=0
      call readin(iwrd,n)
      if(nchar.eq.0) go to 290
      lit=(key(1)+3)/4
c
c   lit=1  wind     lit=2  view     lit=3  inqu (ls) lit=4  pers
c   lit=5  look     lit=6  aper     lit=7  exit      lit=8  help
c   lit=9  port
c
      goto(20,60,100,120,140,160,299,180,200),lit
      go to 290
c
c   window option
c
   20 continue
      if(ivf.eq.1)then
         write(output,355)
         go to 290
      end if
      write(output,320)
      n1=0
      n2=1
      call readin(iwrd,n)
      if(nchar.ne.0) then
         xc1=xnum(1)
         yc1=xnum(2)
         xc2=xnum(3)
         yc2=xnum(4)
         if(xc2.le.xc1)then
            xc1=-100.
            xc2=100.
         end if
         if(yc2.le.yc1) then
            yc1=-100.
            yc2=100.
         end if
      end if
      write(output,345)
      call readin(iwrd,n)
      if(nchar.ne.0) then
```

```
      zf=xnum(1)
      zb=xnum(2)
      if(zf.le.0.) zf=0.5
      if(zb.le.zf) zb=400.0
    end if
```

```
      go to 290
c
c  view option
c
  60  continue
      write(output,330)
      n1=0
      n2=1
      call readin(ivrd,n)
      if(nchar.ne.0) then
        nxl=xnum(1)
        nyb=xnum(2)
        nxr=xnum(3)
        nyt=xnum(4)
      end if
      go to 290
c
c  inqu (ls) option
c
 100  continue
      call inqv
      go to 290
c
c  pers option
c
 120  continue
      write(output,350)
      n1=1
      n2=0
      call readin(ivrd,n)
      lit=(key(1)+3)/4
      if(lit.eq.10) then
        if(ivf.ne.1)then
          ivf=1
          write(output,355)
          go to 160
        end if
      else
        if(ivf.ne.0) then
          ivf=0
          write(output,358)
          go to 20
        end if
      end if
      go to 290
c
c  look option
c
 140  continue
      write(output,360)
      n1=0
      n2=1
      call readin(ivrd,n)
      if(nchar.ne.0) then
        xe=xnum(1)
        ye=xnum(2)
```

```
        ze=xnum(3)
        xa=xnum(4)
        ya=xnum(5)
        za=xnum(6)
c       if(xa.eq.xe) xa=0.
c       if(ya.eq.ye) ya=0.
c       if(za.eq.ze) za=0.
c       dwx=abs(xe-xa)
c       dwy=abs(ye-ya)
c       dwz=abs(ze-za)
c       if(dwx.lt.0.001) xe=0.
c       if(dwy.lt.0.001) ye=0.
c       if(dwz.lt.0.001) ze=200.
        call viewtr
        do 150 i=1,4
          do 150 j=1,4
            tran(i,j,lastt)=vmat(i,j)
 150    continue
      end if
      go to 290
c
c  aper option
```

```
c
 160  continue
      if(ivf.eq.0) then
         write(output,358)
         go to 290
      end if
      write(output,370)
      n1=0
      n2=1
      call readin(iwrd,n)
      if(nchar.ne.0) then
         aax=xnum(1)
         aay=xnum(2)
         if(aax.le.0) aax=26.56
         if(aay.le.0) aay=aax
      end if
      write(output,345)
      call readin(iwrd,n)
      if(nchar.ne.0) then
         zf=xnum(1)
         zb=xnum(2)
         if(zf.le.0.) zf=0.5
         if(zb.le.zf) zb=99999.99
      end if
      go to 290
c
c  help option
c
 180  continue
      write(output,380)
      go to 290
c
c  port option
c
```

```
 200  continue
      write(output,390)
      n1=1
      n2=0
      call readin(iwrd,n)
      lit=(key(1)+3)/4
      if(lit.eq.10) then
         write(output,391)
         n1=0
         n2=1
         call readin(iwrd,n)
         lo=nint(xnum(1))
         if ((lo.ge.1).and.(lo.le.4)) then
c
c  for 4 viewports
c
            if (.not.solid) then
               if (lo.eq.1) then
                  lo=3
               else if (lo.eq.2) then
                  lo=4
               else if (lo.eq.3) then
                  lo=1
               else if (lo.eq.4) then
                  lo=2
               end if
            end if
            if (ify.eq.1024) then
               kxmaxa=1279
               kymaxa=1023
            else
               kxmaxa=639
               kymaxa=511
            end if
            inx=(kxmaxa+1)/2
            iny=(kymaxa+1)/2
            if(lo.eq.1) then
               kxmin=0
               kymin=0
               kxmax=inx-1
               kymax=iny-1
            else if(lo.eq.2) then
               kxmin=inx
               kymin=0
               kxmax=kxmaxa
               kymax=iny-1
            else if(lo.eq.3) then
               kxmin=0
               kymin=iny
```

```
          kxmax=inx-1
          kymax=kymaxa
       else if(lo.eq.4) then
          kxmin=inx
          kymin=iny
          kxmax=kxmaxa
          kymax=kymaxa
```

Feb 16 01:21 1986  window.f Page 6

```
             end if
             if (ify.eq.1024) then
                nxl=kxmin+64
                nxr=kxmax-64
             else
                nxl=kxmin+32
                nxr=kxmax-32
             end if
             nyt=kymin
             nyb=kymax
           end if
        else
           kxmin=0
           kymin=0
           if (ify.eq.1024) then
              kxmax=1279
              kymax=1023
              nxl=128
              nxr=1151
           else
              kxmax=639
              kymax=511
              nxl=64
              nxr=575
           end if
           nyt=kymin
           nyb=kymax
        end if
        if (.not.solid) then
           itemp=nyb
           nyb=nyt
           nyt=itemp
        end if
c
 290  continue
      go to 10
c
c  exit option - call scalef to set scale factors for perspective
c     transformations and screen conversion
c
 299  continue
      call scalef
c
 310  format('<CSG>WIND> ',$)
 320  format('<Enter corner coords: lower left (X,Y), upper right ',
     1'(X,Y)> ',$)
 330  format('<Enter screen space corner coords:',/,' lower left (X,Y),'
     1,' upper right (X,Y)> ',$)
 345  format('<Enter Z min and Z max clipping planes> ',$)
 350  format('<Perspective projection?> ',$)
 355  format('<Perspective projection set>')
 358  format('<Orthogonal projection set>')
 360  format('<Enter "look from" coord.,and "look at" coord.(X,Y,Z)',
     1'> ',$)
 370  format('<Enter angles of aperature: vert. angle, horiz. angle',
     1'> ',$)
```

Feb 16 01:21 1986  window.f Page 7

```
 380  format('<Available commands:',/,
     1'    APER - Set aperature angle & Z min max (perspective),',/,
     2'    EXIT - Exit WIND level,',/,
     3'    LOOK - Set look from and look at,',/,
     4'    LS   - List all viewing parameters,',/,
     5'    PERS - Set perspective viewing (toggle),',/,
     6'    PORT - Set full or four viewports,',/,
     7'    VIEW - Set viewport size (screen space),',/,
     8'    WIND - Set window parameters & Z min max (orthogonal)>')
 390  format('<Four viewports?> ',$)
 391  format('<Enter quadrant number | 1  2 |',/,
     1  '                        | 3  4 |> ',$)
c
      return
      end
```

I claim:

1. A method of using a computer graphic system for changing the shape of a geometric model using a free-form deformation, said method comprising the steps of:

inputting to a CPU and storing geometric data defining an undeformed model in reference to a global coordinate system;

inputting to said CPU and storing a local coordinate system which defines a region of said model to be deformed;

said CPU defining in response to a user command a grid of control points for controlling deformation of that portion of said model within said region;

specifying at a user terminal a deformation to be applied to a portion of the model in said region by displacing one of said control points relative to one other control point of said grid;

said CPU retrieving said geometric data and transforming said retrieved data so that it is expressed in terms of said local coordinate system;

said CPU identifying which portion of said retrieved geometric data is within said region;

said CPU determining and storing a deformed position of the retrieved geometric data within said region by applying a deformation function to said transformed geometric data identified as within said region, where said deformation function is a trivariate vector rational polynomial for mapping said retrieved geometric data from said local coordinate system into said global coordinate system, and where each said displaced control point is a coefficient of said polynomial; and said CPU displaying said model as changed according to the deformation specified by each said displaced control point.

2. A method as defined in claim 1 wherein said model is a solid geometric model, and wherein said method further comprises the step of said CPU classifying a plurality of points within said global coordinate system to determine and store which of said points are on the surface of said solid model as changed, which of said points are outside of said solid model as changed and which of said points are inside said solid model as changed.

3. A method as defined in claim 2 wherein said method further comprises the step of said CPU storing the displaced position of each said displaced control point of said grid, and wherein said step of classifying said plurality of points within said global coordinate system is preceded by the steps of:

said CPU retrieving the displaced control points and the undisplaced control points of said grid; and for each said point of the global coordinate system that is to be classified, said CPU performing the steps of:

determining whether the point is within a convex hull defined by the control points retrieved for said grid;

if the point is within said convex hull, determining the coordinates of the point in reference to said local coordinate system;

determining whether the point is within said region; and if the point is within said region, expressing the point in reference to the global coordinate system.

4. A method as defined in claim 1 wherein said geometric data defines a solid model and wherein said method further comprises the steps of:

inputting to said CPU and storing additional geometric data defining other solid models; and further changing the shape of said displayed model by said CPU using Boolean logic to combine said displayed model with one or more of said other models.

5. A method as defined in claim 1 further comprising the step of applying hierarchal deformations to said model.

6. A method as defined in claim 5 wherein said step of applying hierarchal deformations comprises the steps of:

inputting to said CPU and storing a second local coordinate system which defines a second region of said model that is to be deformed, said second region including said first region;

said CPU defining in response to a user command a second grid of control points for controlling deformation of that portion of said model within said second region;

specifying at said user terminal a second deformation to be applied to said portion of the model in said second region by displacing in response to a user command one of said control points of said second grid relative to one other control point of said second grid;

said CPU retrieving the geometric data for said changed model and transforming the geometric data for the changed model so that it is expressed in terms of said second local coordinate system;

said CPU identifying which portion of the transformed geometric data for the changed model is within said second region;

said CPU determining a deformed position for the geometric data for the changed model by applying said deformation function to the transformed geometric data of the changed model that is within said second region; and displaying the model as changed a second time according to said second deformation specified by the displaced control points of said second grid.

7. A method of using a computer graphic system for changing the shape of a solid geometric model using free-form deformation, said method comprising the steps of:

inputting to a CPU and storing geometric data that defines a solid undeformed model in reference to a global coordinate system;

inputting to said CPU and storing a local coordinate system which defines a region of said solid model to be deformed;

said CPU defining in response to a user command a grid of control points form controlling deformation of that portion of said solid model within said region;

specifying at a user terminal a deformation to be applied to said portion of the model in said region by displacing a plurality of said control points relative to one other control point of said grid in response to a user command;

said CPU retrieving said geometric data and transforming said retrieved geometric data so that it is expressed in terms of said local coordinate system;

said CPU determining which portion of said transformed geometric data is within said region to be deformed;

said CPU determining a deformed position for said transformed geometric data within said region in accordance with the deformation specified by said displaced control points, wherein said step of determining said deformed position comprises the step of applying a deformation function to said transformed geometric data, where said deformation function is a trivariate victor rational polynomial for mapping said transformed geometric data from said local coordinate system into said global coordinate system, and where said displaced control points are coefficients of said polynomial;

said CPU classifying a plurality of data points within said global coordinate system to determine and store which of said data points are on the surface of said solid model as deformed, which of said data points are outside of said solid model as deformed, and which of said data points are inside said solid model as deformed; and said CPU displaying said solid model as changed according to the deformation specified by said displaced control points.

8. A method of using a computer graphic system as defined in claim 7 wherein said step of defining said grid of control points comprises the step of defining a plane in each local coordinate direction.

9. A method of using a computer graphic system as defined in claim 7 wherein said method further comprises the step of said CPU storing the displaced position of each said displaced control point of said grid, and wherein said step of classifying said plurality of points within said global coordinate system is preceded by the steps of:

said CPU retrieving the displaced control points and the undisplaced control points of said grid; and for each said point of the global coordinate system that is to be classified, said CPU performing the steps of:

determining whether the point is within a convex hull defined by the control points retrieved for said grid;

if the point is within said convex hull, determining the coordinates of the point in reference to said local coordinate system;

determining whether the point is within said region; and if the point is within said region, expressing the point in reference to the global coordinate system.

10. A method of using a computer graphic system as defined in claim 7 wherein said geometric data defines a solid model and wherein said method further comprises the steps of:

inputting to said CPU and storing additional geometric data defining other solid models; and further changing the shape of said displayed model by said CPU using Boolean logic to combine said displayed model with one or more of said other models.

11. A method of using a computer graphic system as defined in claim 7 further comprising the step of applying hierarchal deformations to said solid model.

12. A method using a computer graphic system as defined in claim 11 wherein said step of applying hierarchal deformation comprises the steps of:

inputting to said CPU and storing a second local coordinate system which defines a second region of said solid model that is to be deformed, said second region including said first region;

said CPU defining in response to a user command a second grid of control points for controlling deformation of that portion of said solid model within said second region;

specifying at said user terminal a second deformation to be applied to said portion of the solid model in said second region by displacing in response to a user command one of said control points of said second grid relative to one other control point of said second grid;

said CPU retrieving the geometric data for said changed solid model and transforming the geometric data for the changed solid model so that it is expressed in terms of said second local coordinate system;

said CPU identifying which portion of the transformed geometric data for the changed solid model is within said second region;

said CPU determining the deformed position for the geometric data for the changed solid model by applying said deformation function to the transformed geometric data of the changed solid model that is within said second region; and displaying the model as changed a second time according to said second deformation specified by the displaced control points of said second grid.

13. A method of using a computer graphic system for changing the shape of a geometric model using a free-form deformation, said method comprising the steps of:

(a) inputting to a CPU and storing a geometric model that is comprised of a plurality of data points defined in reference to a global coordinate system;

(b) inputting to said CPU and storing a local coordinate system which defines a region of said model that is to be deformed;

(c) said CPU defining in response to a user command a plane in each local coordinate direction so as to establish a grid of control points within said local coordinate system;

(d) specifying at a user terminal and inputting to said CPU a deformation to be applied to a portion of the shape of said model situated within said region, wherein said step of specifying said deformation comprises the step of displacing a plurality of said control points of said grid relative to one other control point of said grid in response to a user command;

(e) said CPU retrieving said data points and for each data point said CPU automatically performing the steps comprised of:

(f) determining the coordinates of the data point in reference to said local coordinate system;

(g) determining whether the local coordinates for the data point are within said region;

(h) determining a deformed position of the data point as specified by the displaced control points of said grid, wherein said step of determining said deforming position comprises the step of evaluating a deformation function at the data point, said deformation function comprising a trivariate vector rational polynomial for mapping the data point from said local coordinate system into said global coordinate system, and where said displaced control points are coefficients of said polynominal;

(i) repeating said steps (b) through (h) until all desired changes have been made to said model;

and (j) displaying the changed model.

14. A method of using a computer graphic system as defined in claim 13 wherein said geometric data defines a solid model and wherein said method further comprises the steps of:

inputting to said CPU and storing additional geometric data defining other solid models; and further changing the shape of said displayed model by said CPU using Boolean logic to combine said displayed model with one or more of said other models.

15. A method of using a computer graphic system as defined in claim 14 further comprising the step of said CPU classifying a plurality of points within said global coordinate system to determine and store which of said points are on the surface of said solid model as changed, which of said points are outside of said solid model as changed and which of said points are inside said solid model as changed.

16. A method of using a computer graphic system as defined in claim 15 wherein said method further comprises the step of said CPU storing the displaced position of each said displaced control point of said grid, and wherein said step of classifying said plurality of points within said global coordinate system is preceded by the steps of:

said CPU retrieving the displaced control points and the undisplaced control points of said grid; and for each said point of the global coordinate system that is to be classified, said CPU performing the steps of:

determining whether the point is within a convex hull defined by the control points retrieved for said grid;

if the point is within said convex hull, determining the coordinates of the point in reference to said local coordinate system;

determining whether the point is within said region; and if the point is within said region, expressing the point in reference to the global coordinate system.

17. A method of using a computer graphic system for changing the shape of a solid geometric model using freeform deformation, said method comprising the steps of:

(a) inputting to a CPU and storing geometric data defining the solid undeformed model in reference to a global coordinate system;

(b) inputting to said CPU and storing a local coordinate system which defines a region of said solid model to be deformed;

(c) said CPU defining in response to a user command a grid of control points for controlling deformation of that portion of said solid model within said region;

(d) specifying at a user terminal a deformation to be applied to said portion of the model in said region by displacing in response to a user command a plurality of said control points relative to at least one other control point of said grid;

(e) said CPU retrieving said geometric data and transforming said retrieved geometric data so that it is expressed in terms of said local coordinate system;

(f) said CPU determining which portion of said transformed geometric data is within said region to be deformed;

(g) said CPU determining a deformed position for said transformed geometric data within said region in accordance with the deformation specified by said displaced control points, wherein said step of determining said deformed position comprises the step of applying a deformation function to said transformed geometric data, where said deformation function is any trivariate vector rational polynomial adapted for mapping said transformed geometric data from said local coordinate system into said global coordinate system, and where said displaced control points are coefficients of said polynomial;

(h) a system user and said CPU repeating steps (b) though (g) until all deformations have been made to said solid model to effect the desired change thereto;

(i) inputting to said CPU and storing additional geometric data defining other solid models;

(j) said CPU further changing the shape of said displayed model by said CPU using Boolean logic to combine said displayed model with one or more of said other models and storing the further changed shape of said solid model;

(k) said CPU classifying a plurality of points within said global coordinate system to determine and store which of said points are on the surface of said solid model as further changed, which of said points are outside of said solid model as further changed, and which of said points are inside solid model as further changed; and (l) said CPU displaying said model as further changed.

* * * * *

UNITED STATES PATENT AND TRADEMARK OFFICE
CERTIFICATE OF CORRECTION

PATENT NO. : 4,821,214

DATED : April 11, 1939

INVENTOR(S) : Thomas W. Sederberg

It is certified that error appears in the above-identified patent and that said Letters Patent is hereby corrected as shown below:

```
    Abstract, line  8, "affect" should be --effect--
    Column 2, line 11, "spacial" should be --spatial--
    Column 2, line 14, "in" should be --is--
    Column 2, line 21, "possessing" should be --processing--
    Column 9, line 50, "determiines" should be --determines--
    Column 12, line 35, "cuves" should be --curves--
    Column 12, lines 45-46, "approximately small volume"
should be --acceptably small volume--
    Column 190, line 54, "form" should be --for--
```

Signed and Sealed this

Seventeenth Day of April, 1990

*Attest:*

HARRY F. MANBECK, JR.

*Attesting Officer*    *Commissioner of Patents and Trademarks*